US006833844B1

(12) United States Patent
Shiota et al.

(10) Patent No.: US 6,833,844 B1
(45) Date of Patent: Dec. 21, 2004

(54) SYSTEM DISPLAY APPARATUS AND STORING MEDIUM

(75) Inventors: Makiko Shiota, Tokyo (JP); Yuko Tohyama, Tokyo (JP); Hiroyuki Yabe, Tokyo (JP); Masashi Hayamizu, Tokyo (JP); Yasuo Okuda, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/458,738

(22) Filed: Dec. 13, 1999

(30) Foreign Application Priority Data

Jun. 21, 1999 (JP) ............................................ 11-174135

(51) Int. Cl.[7] .......................... G01C 21/26; G01C 21/32; G09G 5/00; G08G 1/123

(52) U.S. Cl. ........................ 345/660; 345/736; 345/764; 345/800; 345/661; 345/668; 701/207; 701/208; 701/212; 701/214; 340/989; 340/990; 340/995

(58) Field of Search ................................. 345/734, 735, 345/736, 740, 747, 764, 784, 798, 799, 800, 801, 806–807, 815, 857–859, 660, 661–666, 668, 671, 684, 418, 55, 30; 701/207–209, 212–214, 225, 200–202; 340/989, 990, 995

(56) References Cited

U.S. PATENT DOCUMENTS

| 5,862,510 | A | * | 1/1999 | Saga et al. ................... 701/211 |
| 6,067,502 | A | * | 5/2000 | Hayashida et al. .......... 701/209 |
| 6,115,669 | A | * | 9/2000 | Watanabe et al. ........... 701/209 |
| 6,151,552 | A | * | 11/2000 | Koizumi et al. ............. 701/211 |
| 6,199,012 | B1 | * | 3/2001 | Hasegawa ................... 701/208 |

FOREIGN PATENT DOCUMENTS

| JP | 61-67180 | 4/1986 |
| JP | 3-224067 | 10/1991 |

* cited by examiner

Primary Examiner—Matthew C. Bella
Assistant Examiner—Wesner Sajous
(74) Attorney, Agent, or Firm—Foley & Lardner LLP

(57) ABSTRACT

A system display apparatus detects a display scale by which a distribution line system diagram fits in a display range from the relationship between coordinates of four points of a rectangle in which a distribution line system to be displayed falls and the display range of the screen, and displays the distribution line system to be displayed with an adequate size on a display section.

16 Claims, 56 Drawing Sheets

WINDOW

```
            START
              │
              ▼
┌─────────────────────────────────────┐ S121
│ OBTAIN INTERSECTION OF DISTRIBUTION LINE │
│ STRADDLING OVER WINDOW SCREEN WITH      │
│    SCREEN DISPLAY FRAME                 │
└─────────────────────────────────────┘
              │
              ▼
┌─────────────────────────────────────┐ S122
│       STORE CONNECTION SYMBOL           │
└─────────────────────────────────────┘
              │
              ▼
┌─────────────────────────────────────┐ S123
│ CALCULATE AND STORE CONNECTION SYMBOL   │
│ DISPLAY CO-ORDINATES TO DISPLAY SCREEN  │
└─────────────────────────────────────┘
              │
              ▼
┌─────────────────────────────────────┐ S124
│ CALCULATE AND STORE CONNECTION SYMBOL   │
│ DISPLAY CO-ORDINATES TO WINDOW SCREEN   │
└─────────────────────────────────────┘
              │
              ▼
             END
```

Fig.33

SCREEN DISPLAY POSITION 1 (X,Y)

| CONNECTION SYMBOL 1 | DISPLAY CHARACTER 1 | | WINDOW SCREEN DISPLAY POSITION 1 (X,Y) |
|---|---|---|---|
| ⋮ | ⋮ | ⋮ | ⋮ |
| CONNECTION SYMBOL n | DISPLAY CHARACTER 2 | | WINDOW SCREEN DISPLAY POSITION n (X,Y) |

SCREEN DISPLAY POSITION n (X,Y)

Fig.34

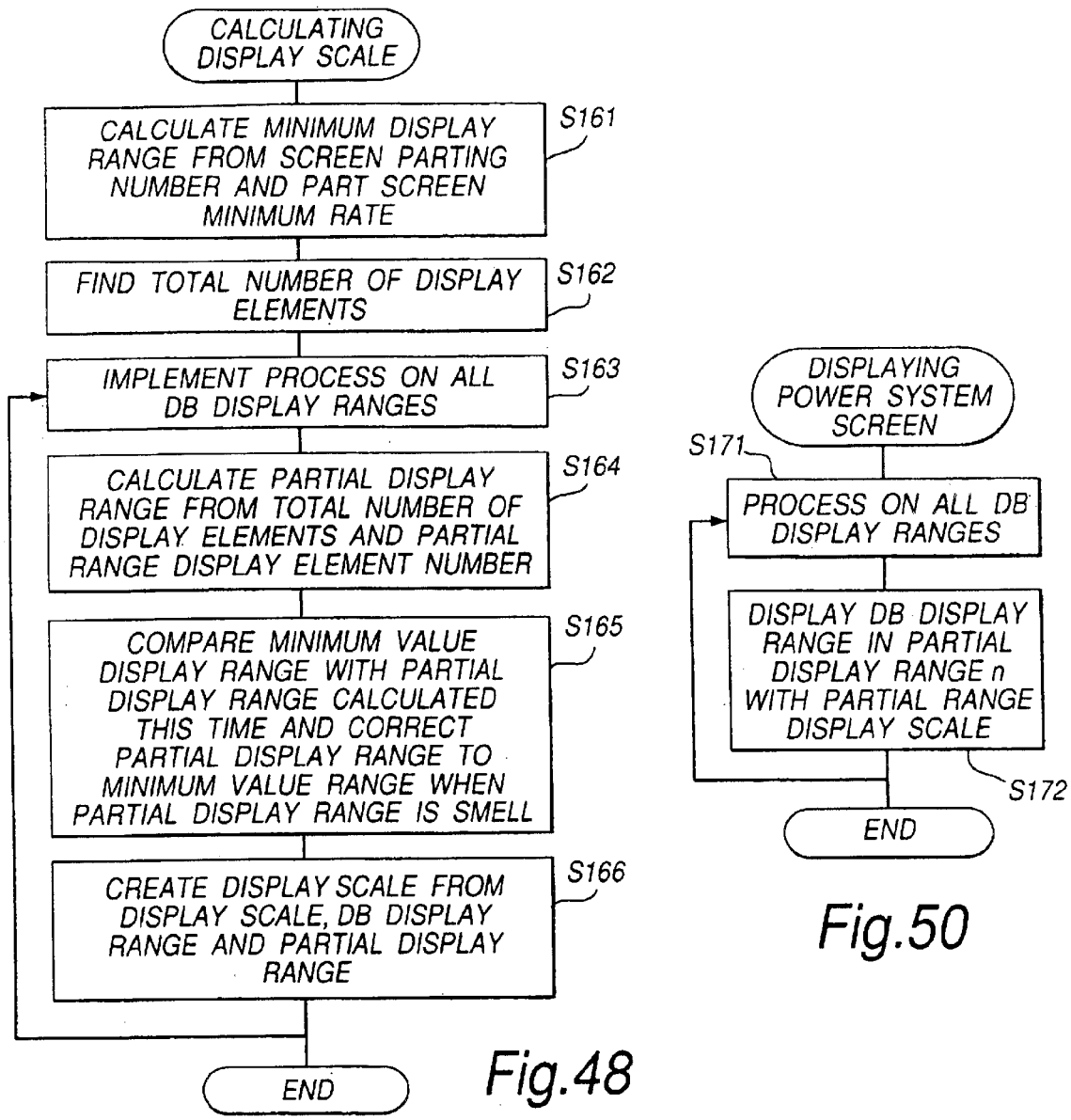

| DB DISPLAY RANGE 1 | PARTIAL DISPLAY RANGE 1 | PARTIAL RANGE DISPLAY SCALE 1 |
|---|---|---|
| ⋮ | ⋮ | ⋮ |
| DB DISPLAY RANGE $\eta$ | PARTIAL DISPLAY RANGE $\eta$ | PARTIAL RANGE DISPLAY SCALE $\eta$ |

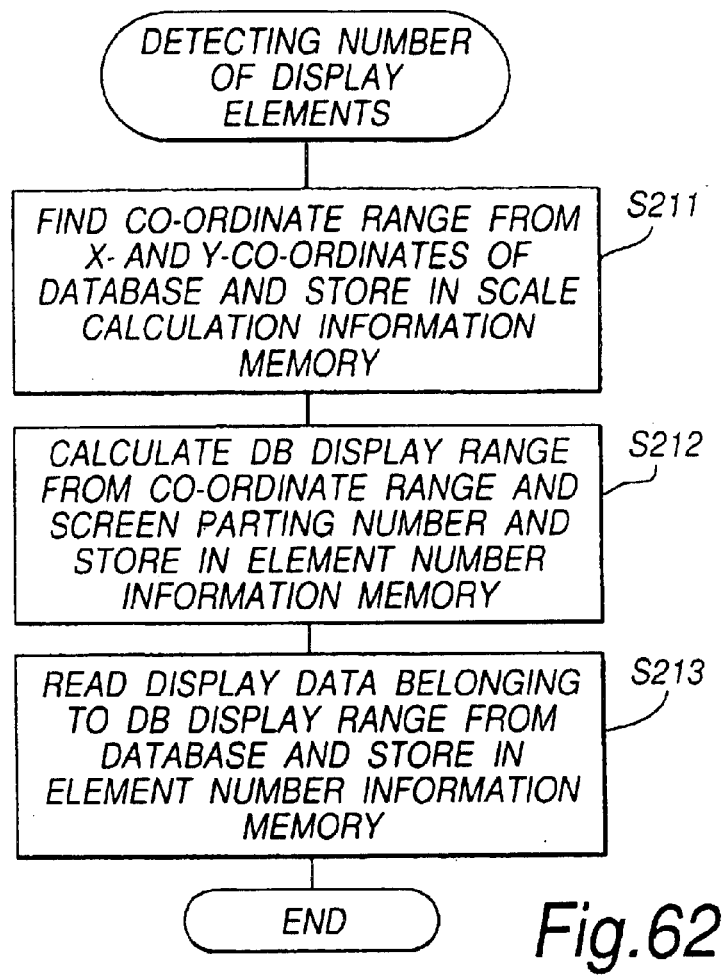
Fig.62
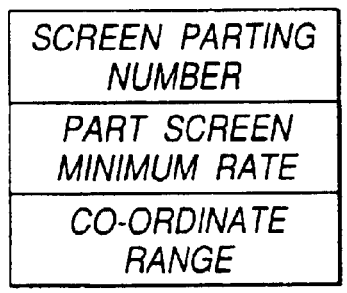
Fig.63
| DB DISPLAY RANGE 1 | PARTIAL RANGE DISPLAY ELEMENT NUMBER n |
|---|---|
| ⋮ | ⋮ |
| DB DISPLAY RANGE n | PARTIAL RANGE DISPLAY ELEMENT NUMBER n |
Fig.64

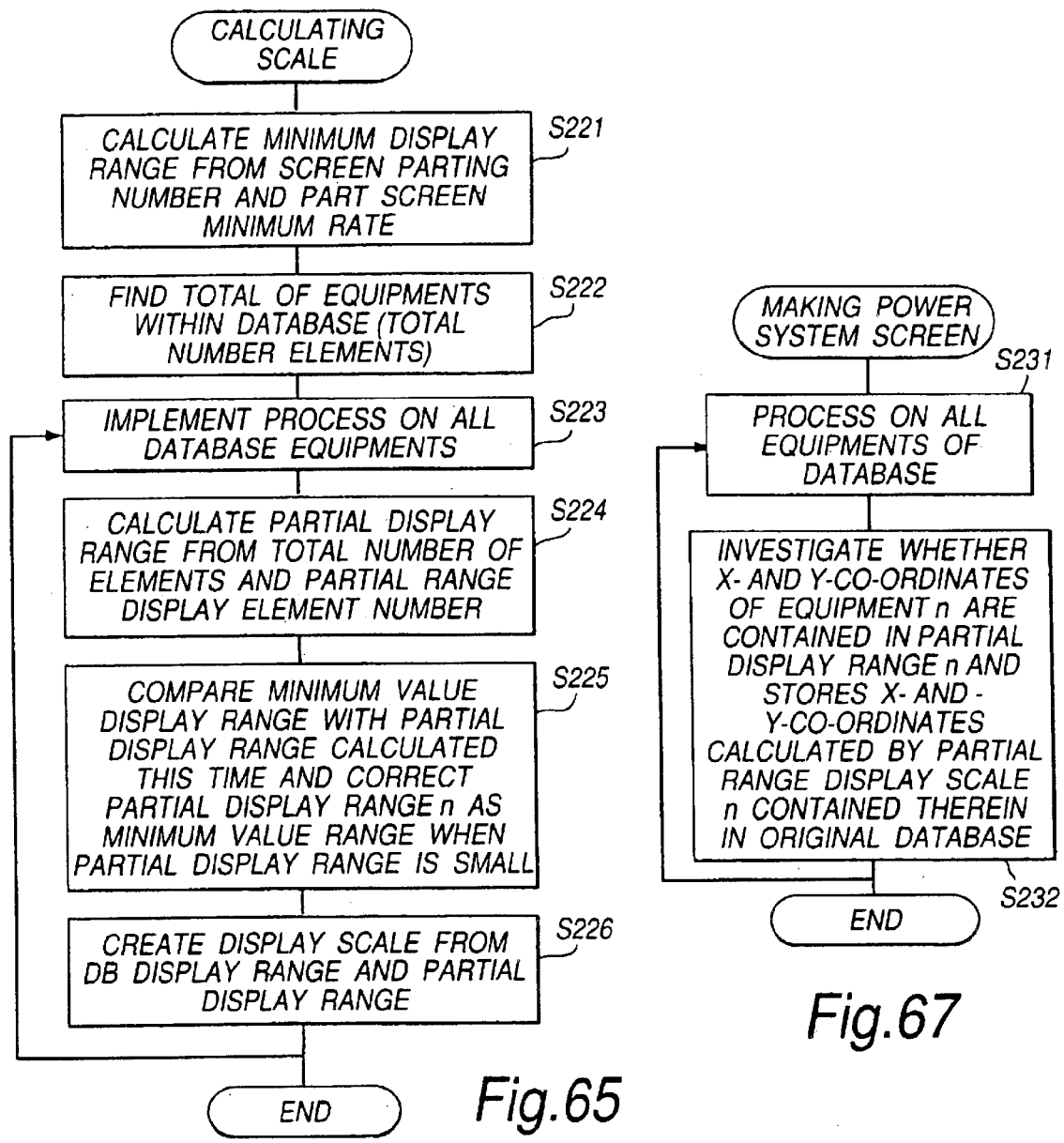

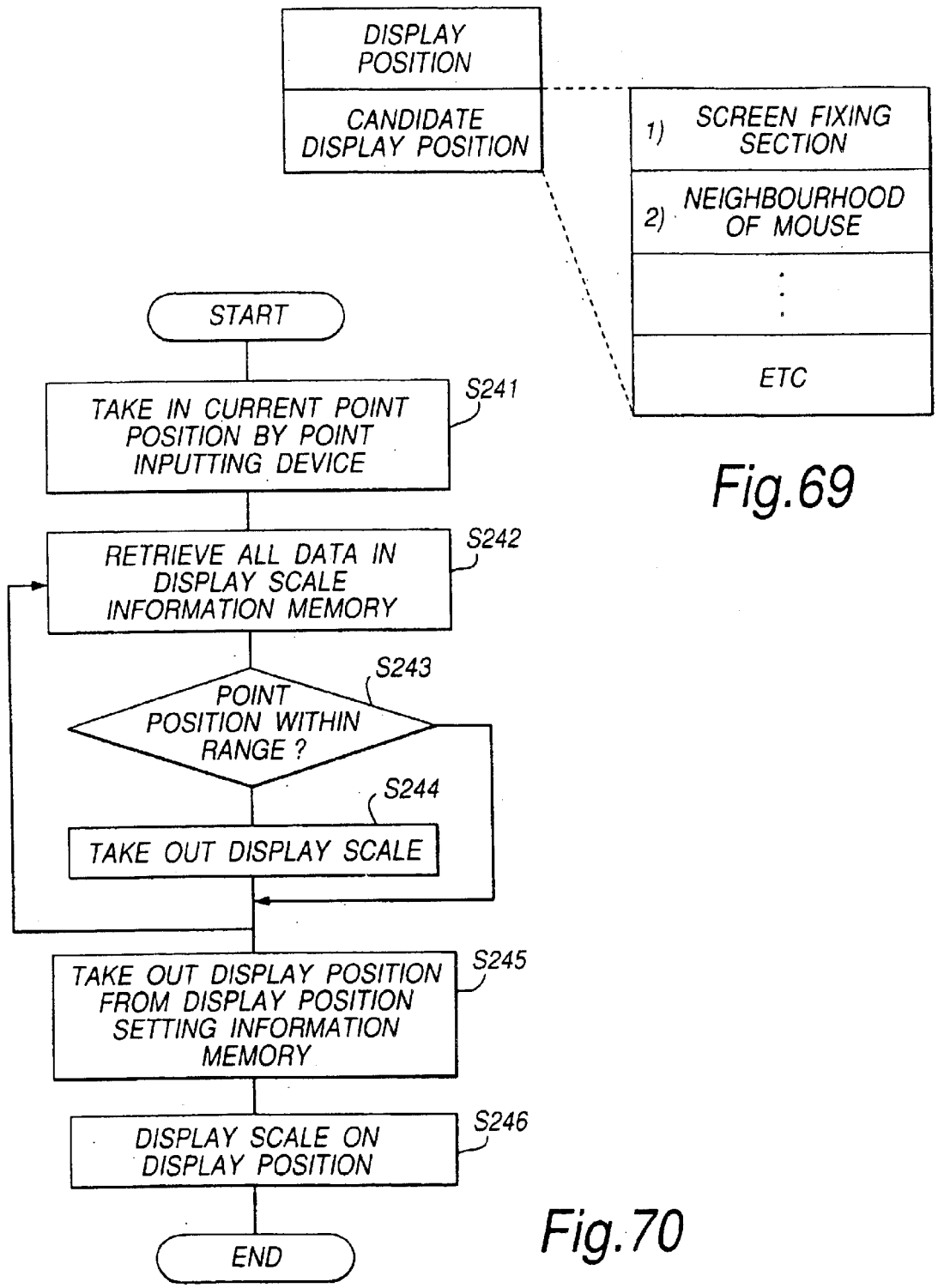

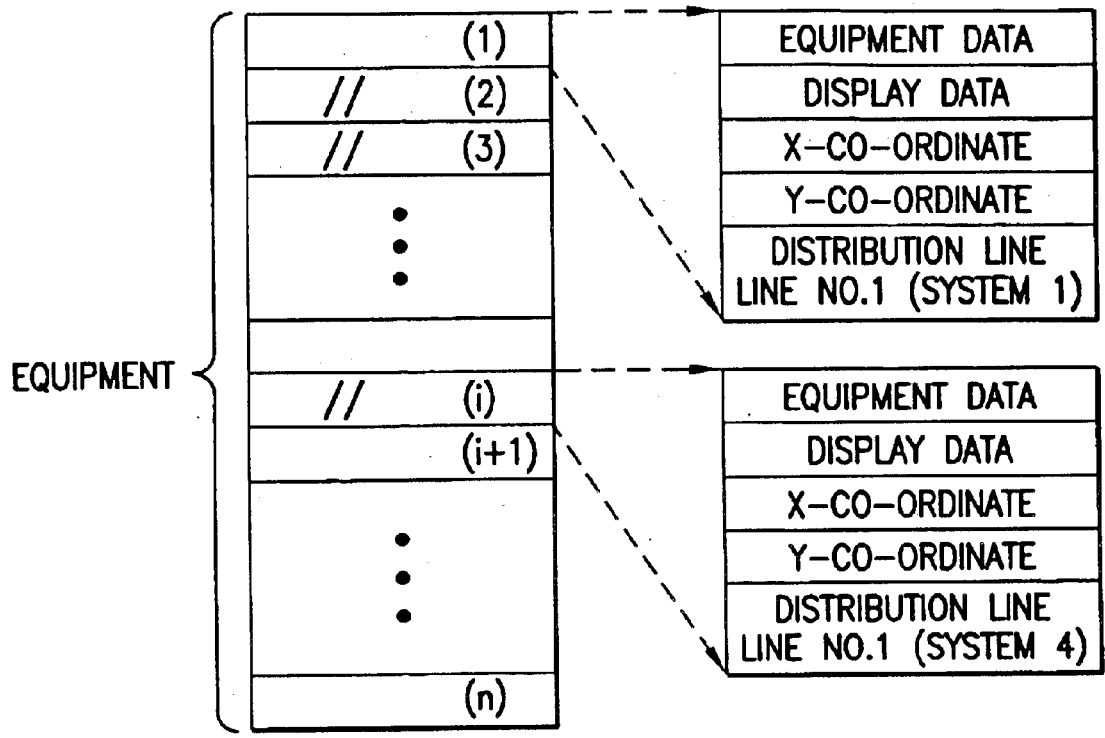
FIG.88
Prior Art
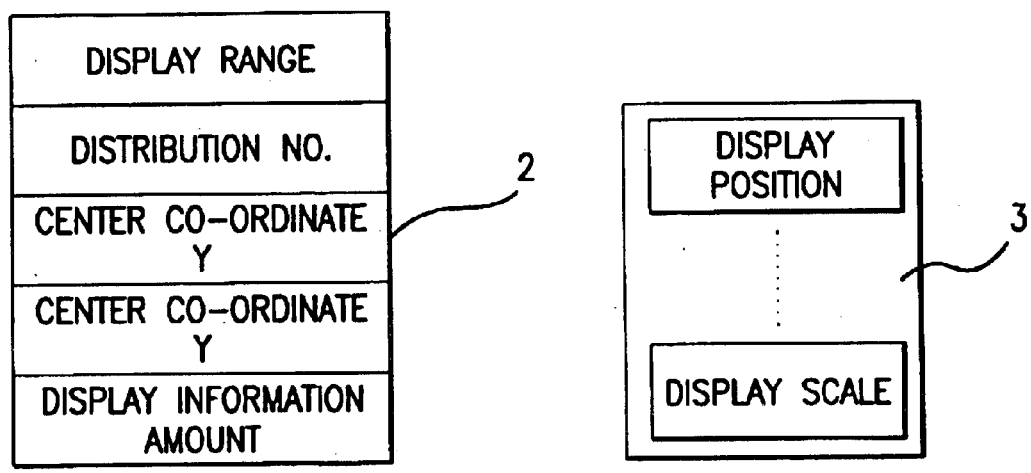
FIG.89
Prior Art
FIG.90
Prior Art

SYSTEM DISPLAY APPARATUS AND STORING MEDIUM

BACKGROUND OF THE INVENTION

1. Field of the Invention

The present invention relates to a system display apparatus, and a storing medium, for displaying a system diagram representing a state of connection of an equipment and displaying information provided in various systems including a power system.

2. Description of the Related Art

Generally a large-scale and complicated network is formed for a power system in an urban area, for example. Life in the urban area is closely dependent on the power system in a number of fields and when a fault, such as short-fault and ground-fault, occurs in the power system, the fault not only cripples the power supply but also causes a serious problem in that many urban life functions are shut down when no adequate measure is taken, and it is difficult to recover for a long time.

Then, a system monitoring and controlling system using a computer has been developed to monitor and control the power system network as described above and is operated to keep the safe operation of the power system and to take a quick recovery measure when the fault occurs.

The system monitoring and controlling system is provided with a system display apparatus for extracting and various displaying information on an equipment and various displaying information of the power system extending in the network by taking the geographical disposition into account by receiving a request to display information in the power system from an operator.

The system display apparatus has a database for storing information on a circuit breaker provided with an outlet of a substation, for example, on various equipments composing the power system including distribution lines such as power cables and switchgears provided on the way of the distribution lines and on system states including states of connection of the respective equipments.

Furthermore, the system display apparatus makes and displays a system diagram on a display section based on information stored in the database.

The operator can monitor and control the power system while referring to the system diagram displayed by the system display apparatus.

A region in which the power system is to be monitored and controlled by the system display apparatus is concentrated mostly in the urban area.

With the recent highly advanced urban area function and information society, a large number of various equipments in the power system are distributed across a geographically vast area. As a result, a large number of distribution lines are provided to cover the vast area while linking each other and having a tree-like extension.

There is also a regional difference for power demand and a large number of the equipment, such as the distribution lines and the switchgear, are provided with a close proximity geographically in the region where the power demand is large. Therefore, graphic data representing the large number of the equipment is displayed densely on a display screen of the power system in the region where the power demand is large.

Accordingly, as an area of the display screen is limited, it becomes unrecognizable and impractical when the power system in which the respective equipments and their neighboring equipments distributed in a wide range area are to be displayed on the display screen, as the neighboring equipments overlap each other.

It also takes a considerable time to retrieve a necessary equipment on the screen when the equipment to be controlled are distributed in the wide range.

Then, in order to eliminate such problems, the conventional system display apparatus has been arranged to improve the recognizability and the controllability by manipulating and increasing the magnification of the display screen to display a necessary part from the whole power system or to reduce the congestion of system information to make the necessary part readily visible (magnification manipulating method), by scrolling the screen by specifying an arbitrary direction of the distribution line which is branched like a tree and which is scrolled by using a operating tool, like a mouse, to display an intended scope or a required screen without changing the magnification (screen scrolling method) or by displaying minimum required information for suppressing system information in advance and by displaying the suppressed information when the operator inputs a command for releasing the suppression (information suppressing method).

The conventional system display apparatus will be explained below with reference to FIG. 87.

The system display apparatus comprises a database 1 (see FIG. 88) for storing information on an equipment [(1) the equipment such as a switchgear, (2) the equipment such as distribution lines at the connecting sections, (3) the equipment such as a substation], a screen display information memory 2 (see FIG. 89) for storing displaying information on a display range, a distribution line numbers, display center coordinates, display information amount and others related to display information, a display scale information memory 3 (see FIG. 90) for storing information on the scale of the display set by the operator per display range stored in the screen display information memory 2, power system screen displaying means 4 for executing predetermined processes in accordance to a procedure shown in FIG. 91 based on the display range in the screen display information memory 2 specified by the operator and a display section 5 for displaying the system diagram made by the power system screen displaying section 4.

The information on the respective equipment (1) stored in the database 1 include a equipment data prescribing detail information such as the name of the equipment, a capacity of the equipment and feed current, display information such as symbols of the equipment, coordinates where these equipments is provided, the distribution line number 1 (e.g., power system 1) and others as shown in FIG. 88.

Accordingly, in the display apparatus constructed as described above, the power system screen displaying section 4 calculates coordinates of a rectangular display range from the display range and display scale information centering on the display center coordinate as shown in FIG. 91 based on the display range within the screen display information memory 2 specified by the operator (S301), reads information on the respective equipments provided within the rectangular coordinate range from the database 1 (S302); reads symbols when the equipment within the coordinate range have symbols (S303), executes an editing process for connecting those equipments one after another to overwrite on the system diagram presently displayed on the display section 5 to display network information which is the system diagram as shown in FIG. 92 (S304).

In addition, the rectangular coordinate range show "X-coordinate and Y-coordinate" of the display area surrounded by 4 points shown in FIG. 25.

The following problems exist in the system display apparatus for displaying large-scale network information as described above.

At first, when the network information displayed on the display section 5 is congested, by the magnification manipulating method, the contents and status of the intended information by increasing the magnification of the display from the display screen an be confirmed easily.

When the magnification of the display at the beginning is 1/8000 (see FIG. 92a) and symbols and others are congested, for example, the operator manipulates the magnification of the pertinent area to 1/2000 (see FIG. 92b) to be readily recognizable for the operator.

However, when the display magnification is increased, the system display range becomes small accordingly and it becomes difficult for the operator to recognize different system information at once. Therefore, the operator is obliged to return from the display magnification again to the original magnification as necessary to recognize them.

Meanwhile, the screen scrolling method also requires obliged the operator to repeat the work of specifying the scrolling direction while confirming the direction in which the distribution line which is displayed on the display screen and which is branched like a tree is to be scrolled, in displaying the present display range, e.g., a display target 6 show in FIG. 92a, without changing the magnification.

Further, while the information suppressing method suppresses predetermined display information during the normal time and displays the suppressed information when the operator issues a command to release the suppression, it sends a large amount of information containing the suppressed information from a computer to the display screen in updating the CRT screen when the suppressed information is being displayed or in displaying an intended screen from the state when the screen is erased, and takes several seconds to several tens seconds from the beginning to the end in displaying the screen as compared to the case of displaying the information suppressed screen.

Further, as the screen in which the suppressed information is displayed is congested and is incomprehensible (see FIG. 93), the operator is obliged to conduct the same manipulation with the magnification manipulating method.

SUMMARY OF THE INVENTION

In view of the problems described above, it is an object of the present invention to provide a system display apparatus, and a storing medium, which improve the recognizability and controllability for the operator in displaying large-scale system information.

BRIEF DESCRIPTION OF THE DRAWINGS

A more complete appreciation of the invention and many of the attendant advantage thereof will be readily obtained and better understood by reference to the following detailed description when considered in connection with the accompanying drawings.

FIG. 33 is a flowchart for explaining an operation of connection symbol editing section shown in FIG. 32.

FIG. 34 is a table showing a structure of data array related to a position for displaying a window.

FIG. 48 is a flowchart for explaining an operation of the display scale calculating section shown in FIG. 42.

FIG. 49 is a table showing a data array structure of a display scale information memory shown in FIG. 42.

FIG. 50 is a flowchart for explaining an operation of power system screen displaying section shown in FIG. 42.

FIG. 62 is a flowchart for explaining an operation of display element number detecting section shown in FIG. 61.

FIG. 63 is a table showing a data array of a scale calculating information memory shown in FIG. 61.

FIG. 64 is a table showing a data array structure of an element number information memory shown in FIG. 61.

FIG. 65 is a flowchart for explaining an operation of a scale calculating section shown in FIG. 61.

FIG. 66 is a table showing a data array structure of a scale information memory shown in FIG. 61.

FIG. 67 is a flowchart for explaining an operation of power system screen creating section shown in FIG. 61.

FIG. 69 is a table showing a data array structure of a display position setting information memory shown in FIG. 68.

FIG. 70 is a flowchart for explaining an operation of magnification displaying section shown in FIG. 68.

FIG. 88 is a table showing a data array structure of database shown in FIG. 87.

FIG. 89 is a table showing a data array structure of a screen display information memory shown in FIG. 87.

FIG. 90 is a table showing a data array structure of a display scale information memory shown in FIG. 87.

DETAILED DESCRIPTION OF THE PREFERRED EMBODIMENT

Figure 1:
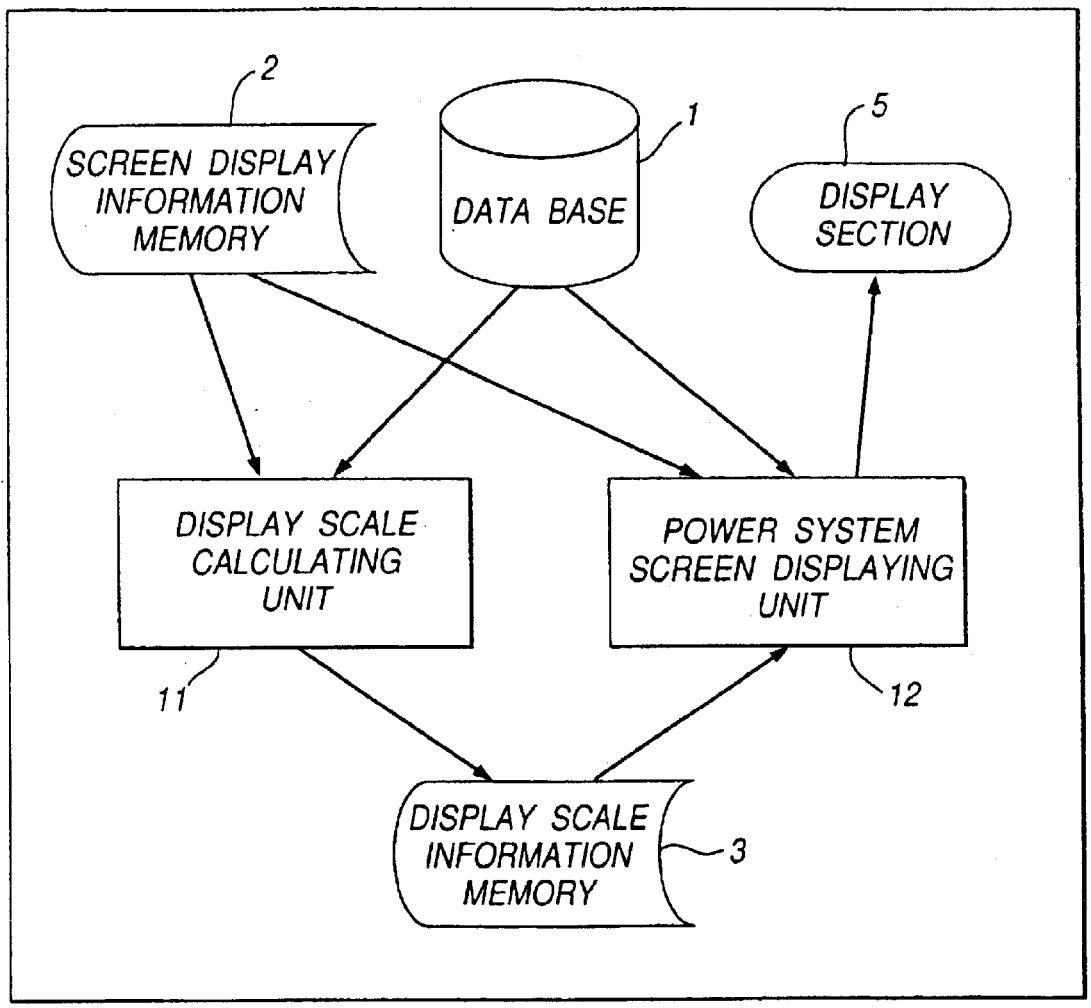
FIG. 1 is a block diagram showing a first embodiment of a system display apparatus and a storing medium according to the invention.

The present invention may be embodied in other specific forms without departing from the spirit or essential attributes therefore and, accordingly, reference should be made to the appended claims, rather than to the forgoing specification, as indicating the scope according to the invention. In addition, same or corresponding elements are labeled with the same reference numerals under each embodiment described below.

FIG. 1 is a block diagram showing a first embodiment of a system display apparatus and a storing medium according to the invention.

The system display apparatus comprises input section (not shown) such as a keyboard and a mouse for inputting various commands, a database 1 (see FIG. 88) for storing information on each equipment provided with the system (for, example, (1) such as a switchgear, (2) such as distribution lines at the connecting sections (3) such as a substation), a screen display information memory 2 (see FIG. 89) for storing information on a display range, a distribution line numbers, display center, display information amount, other information (except for information of the equipment) which related to the power system, a display scale calculating section 11 for calculating a scale in displaying a system diagram largely corresponding to the size of the display screen, a display scale information memory 3 for storing the scale calculated by the display scale calculating section 11 as a display scale in addition to the normal display scale, and a power system screen displaying section 12 for displaying the system diagram on a display section 5 by using the display scale calculated by the display scale calculating section 11.

The information on the respective equipments (1), (2) ... stored in the database 1 include equipment data prescribing detail information such as the name of the equipment, a capacity of the equipment and feed current, display information such as symbols of the equipment, information such as X-coordinate and Y-coordinate and distribution line number 1 (e.g., power system 1) and others related to the respective equipment as shown in FIG. 88, for example.

Next, the operation of the system described above will be explained with reference to FIG. 2.

When the operator inputs a command to display a distribution line (system diagram) to be displayed by the input section 11 after turning power on, the display scale calculating section 11 is operated at first and then the power system screen displaying section 12 is operated.

The display scale calculating section 11 execute a process for detecting coordinates of a rectangle in which the distribution line to be displayed is included and for calculating the display scale which allows the distribution line within the rectangle to be displayed on the display screen of the display section 5 in the maximum size.

The display scale calculating section 11 obtains the distribution line number from screen display information having a display range to be displayed from the screen display information memory 2 (S1), selects an equipment having a distribution line number coincident with the above-mentioned distribution line number from information on the equipment stored in the database 1 (S2, S3) and obtains and stores X- and Y-coordinates of the selected equipment (S4).

When the display scale calculating section 11 obtains the X- and Y-coordinates of the equipment, the display scale calculating section 11 compares and checks with the size-wise relationship among X-coordinates already obtained whether or the X-coordinate of the equipment is the minimum or the maximum among equipments so far having the same distribution line number(S5).

When the X-coordinate of the equipment elected is the minimum or the maximum, the display scale calculating section 11 stores its X-coordinate (S6).

Succeedingly, the similar process is done for the Y-coordinate of the selected equipment (S7, S8). The display scale calculating section 11 follows this series of processes for all equipments having the same distribution line number.

Figure 3:
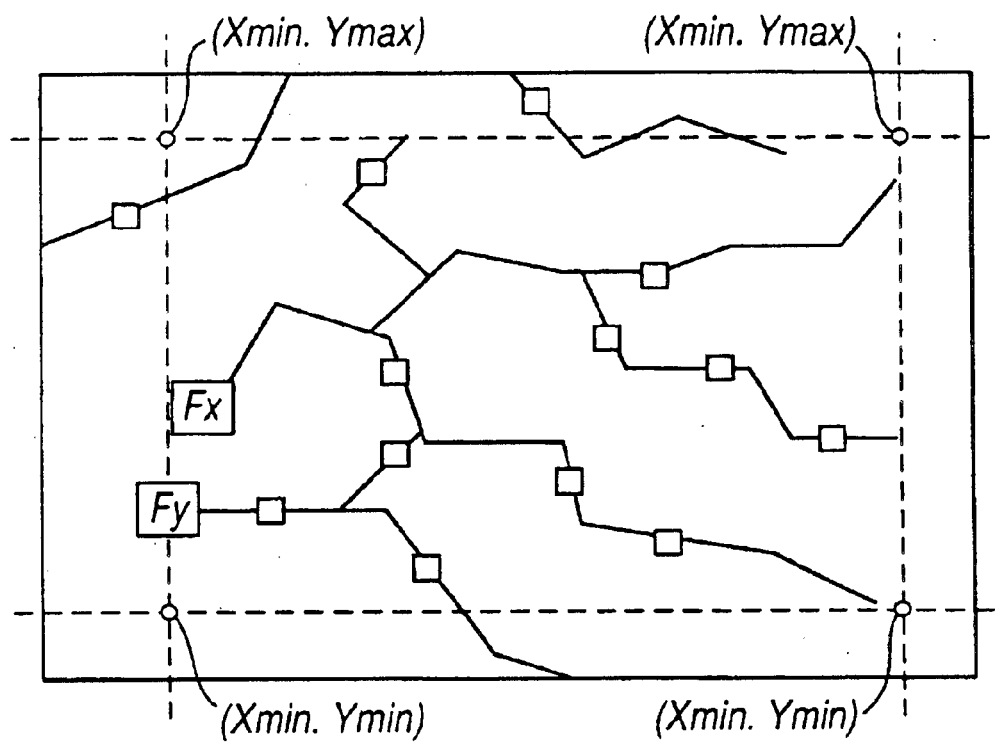
FIG. 3 is a power system diagram displayed on a screen by a conventional apparatus.

After that, the display scale calculating section 11 determines coordinates of four points of the rectangle shown in FIG. 3 by using the minimum (Xmin, Ymin) and the maximum (Xmax, Ymax) of the X- and Y-coordinates obtained from all equipments having the same distribution line number.

The display scale calculating section 11 calculates the scale from the coordinates of the four points and from the display range of the screen which can be known beforehand and stores the scale in the display scale information memory 3.

It is noted as for the scale calculating method that the scale in the X-direction is determined from X/(Xmax−Xmin) and that of the Y-direction from Y/(Ymax−Ymin), where the display range of the display section 5 is represented by X and Y (S9).

After detecting the scale in the X- and Y-directions, the display scale calculating section 11 compares the size of the scale in these X- and Y-directions (S10) and sets the smaller scale as the display scale and stores it in the display scale information memory 3 (S11).

Figure 4:
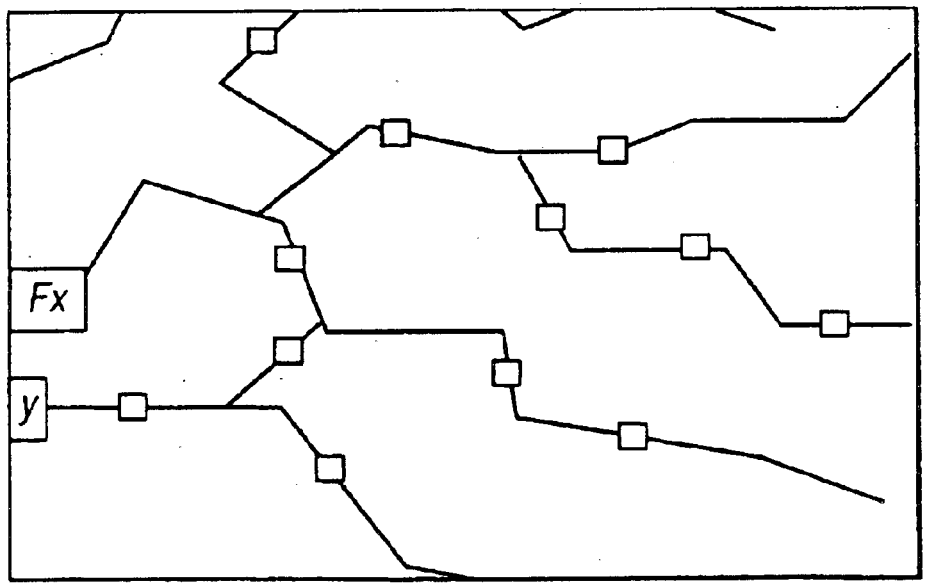
FIG. 4 is a power system diagram displayed on a screen according to the invention.

Next, the power system screen displaying section 12 is operated. The power system screen displaying section 12 selects information on the equipment related to the same distribution line number and displays a system diagram of distribution lines within a dot line frame shown in FIG. 3, as shown in FIG. 4, by using the display scale stored in the display scale information memory 3. In addition, the displaying method is the same as the conventional displaying method.

According to this embodiment, the system diagram of the whole distribution lines belonging to the specified distribution line number can be displayed automatically corresponding to the size of the display screen and the status of the whole equipment without changing the scale of the display screen every time can be confirmed easily.

Next, another embodiment of a system display apparatus according to the invention will be explained.

Figure 5:
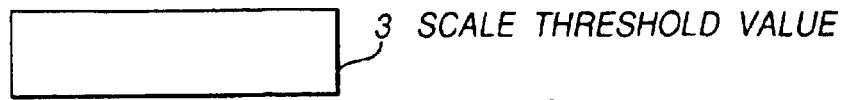
FIG. 5 is a diagram explaining a scale threshold value stored in a display scale information memory shown in FIG. 1.

While this system display apparatus has a structure similar to that shown in FIG. 1, it is different specifically in that a scale threshold value which is visible for an operator is set in advance in a display scale information memory 3 or the like as shown in FIG. 5, in addition to the scale calculating method by a display scale calculating section 11.

Figure 7:
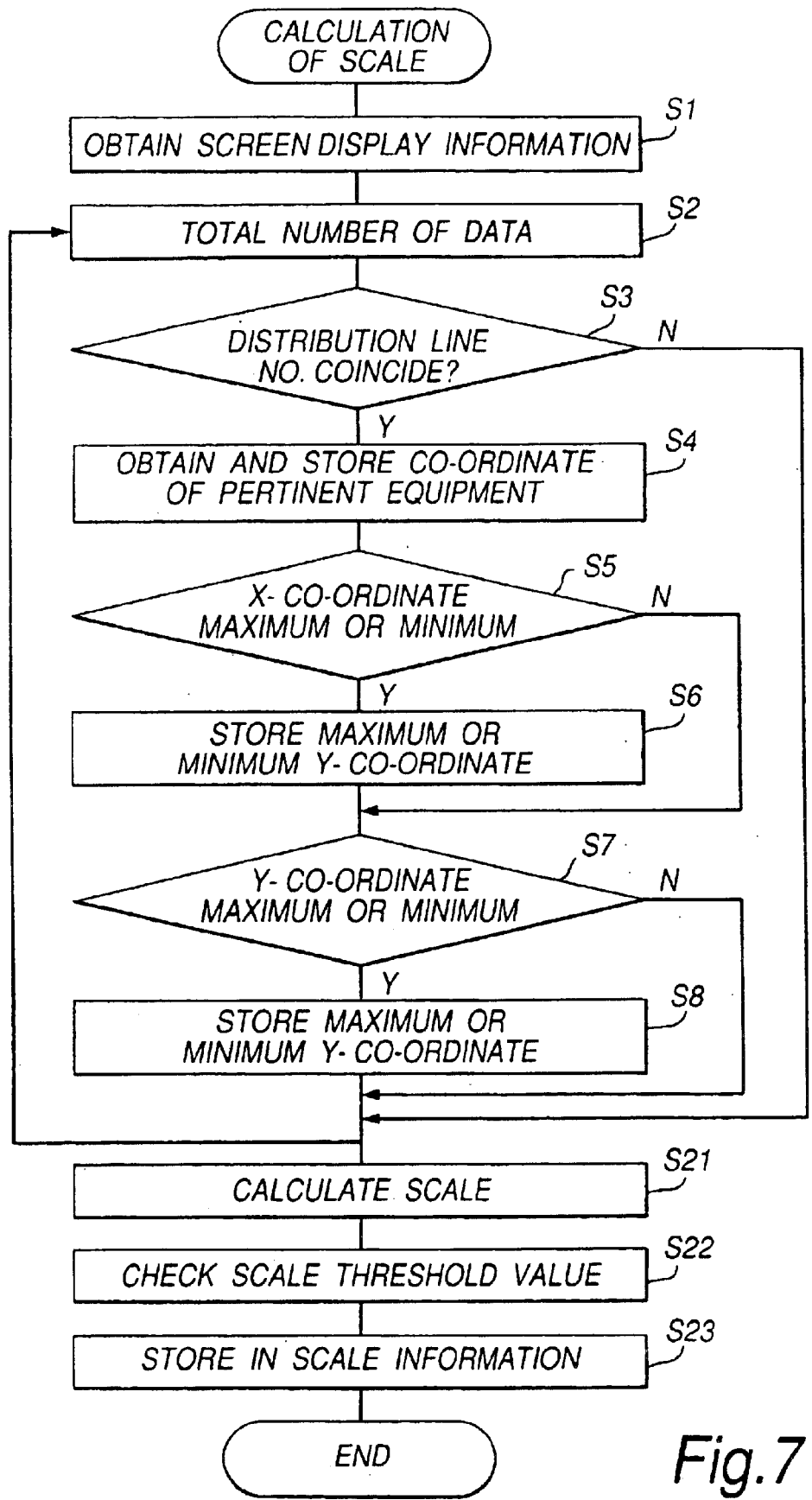
FIG. 7 is a flowchart for explaining an operation of a display scaling section shown in FIG. 1.

A scale calculating method in this embodiment will be explained with reference to FIG. 7. It is noted that because the processes in Steps S1 through S8 in FIG. 7 are the same as those shown in FIG. 2, those processes will only be denoted by the same Step numbers and an explanation thereof will be omitted here.

The explanation will be given below beginning from the scale calculating process in Step S21.

The scale is calculated from the coordinates of the four points shown in FIG. 3 and from the display range of the screen which can be known in advance through Steps S1 through S8. More particularly, the scale in the X-direction is calculated from X/(Xmax−Xmin) and the scale in the Y-direction is calculated from Y/(Ymax−Ymin) (S21), where the display range of the screen are represented by X and Y.

After detecting the scales in the X- and Y-directions as described above, it is checked whether or not the scales in the X- and Y-directions are greater than the predetermined scale threshold value (S22). When the scales in the X- and Y-directions detected are smaller than the scale threshold value, that threshold value is set as the display scale in the X- and Y-directions and is stored in the display scale information memory 3 (S23) (see FIG. 6).

Figure 6:
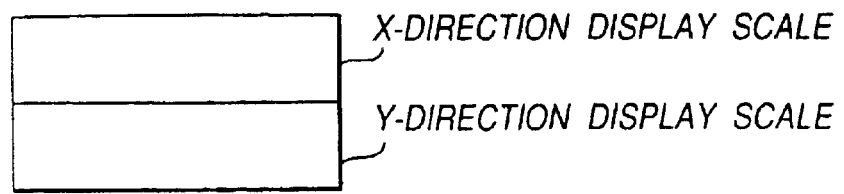
FIG. 6 is a diagram explaining a display scale stored in the display scale information memory shown in FIG. 1.

Therefore, although there has been one display scale in the X- and Y-directions in the apparatus shown in FIG. 1, the two display scales in the X- and Y-directions are calculated as shown in FIG. 6 in this system display apparatus.

Figure 8:
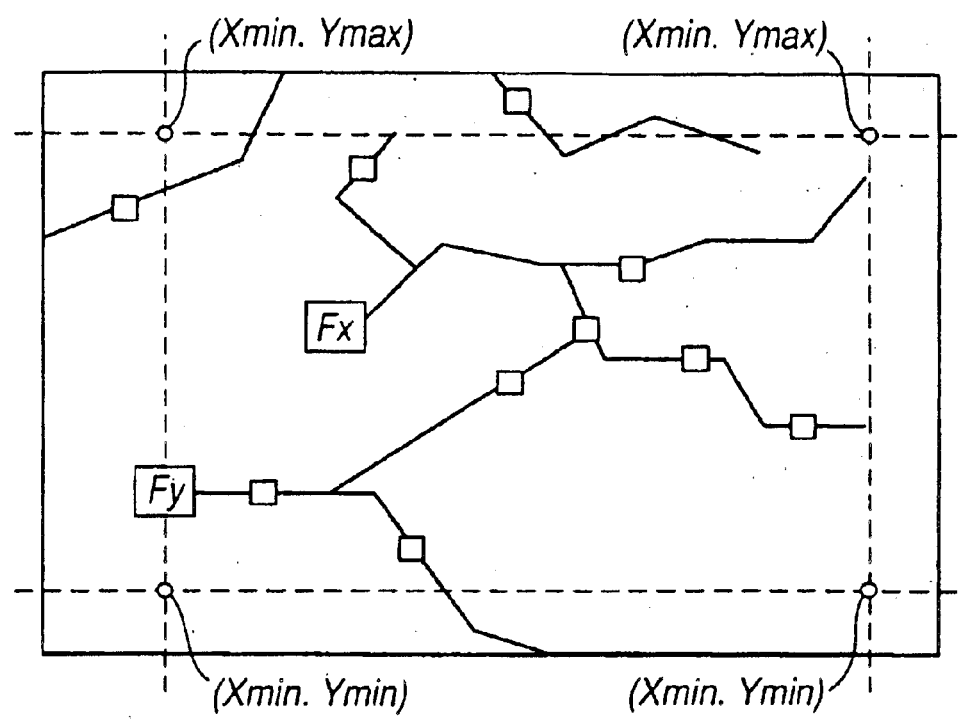
FIG. 8 is a diagram for specifying a display range from a minimum and maximum values of a system.
Figure 9:
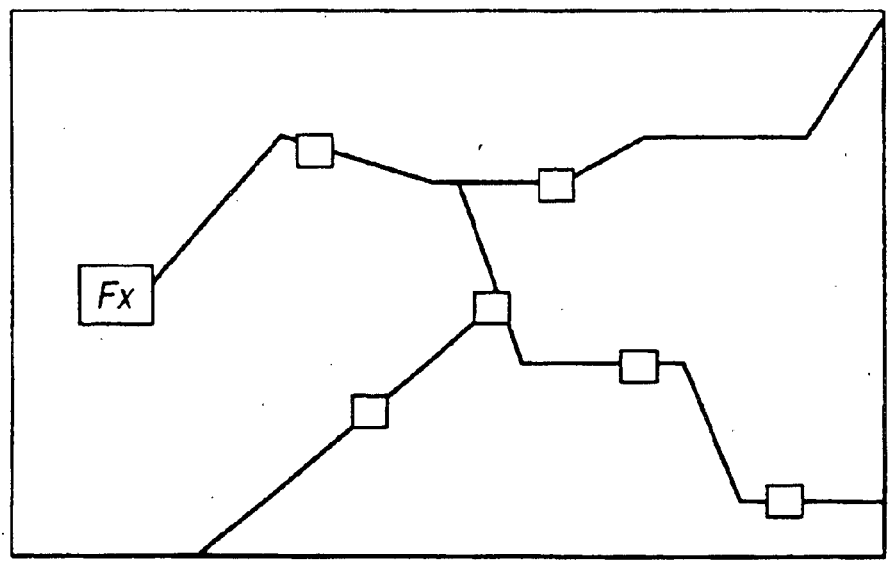
FIG. 9 is a diagram of a display screen in which a system within a display range in FIG. 8 is displayed with the display scale calculated by the display scaling section shown in FIG. 1.

After calculating the two display scales in the X- and Y-directions as described above, the power system screen displaying section 12 is operated to select information on the equipment related to the same distribution line number and to display a system diagram of the distribution lines within the dot line frame shown in FIG. 8 on the display section 5 by using the two display scales in the X- and Y-directions stored in the display scale information memory 3. This displaying method is the same as the conventional method.

However, although the display coordinates on the display screen is obtained by calculating the X- and Y-coordinates by multiplying the same scale with world coordinates in the conventional art, the display coordinate on the display screen is detected by multiplying the stored two display scales in the X- and Y-directions separately with the world coordinate also in this embodiment.

In addition, "world coordinate" is equal to an absolute coordinate of each equipment itself of the power system has. Here, X-coordinate and Y-coordinate corresponds to the world coordinates.

According to this embodiment, the system diagram of the whole distribution lines and equipment belonging to the specified distribution line number can be displayed on the display screen automatically with the easy-to-see scale and the status of the whole equipment within the system without changing the scale of the display screen every time can be confirmed easily.

Figure 2:
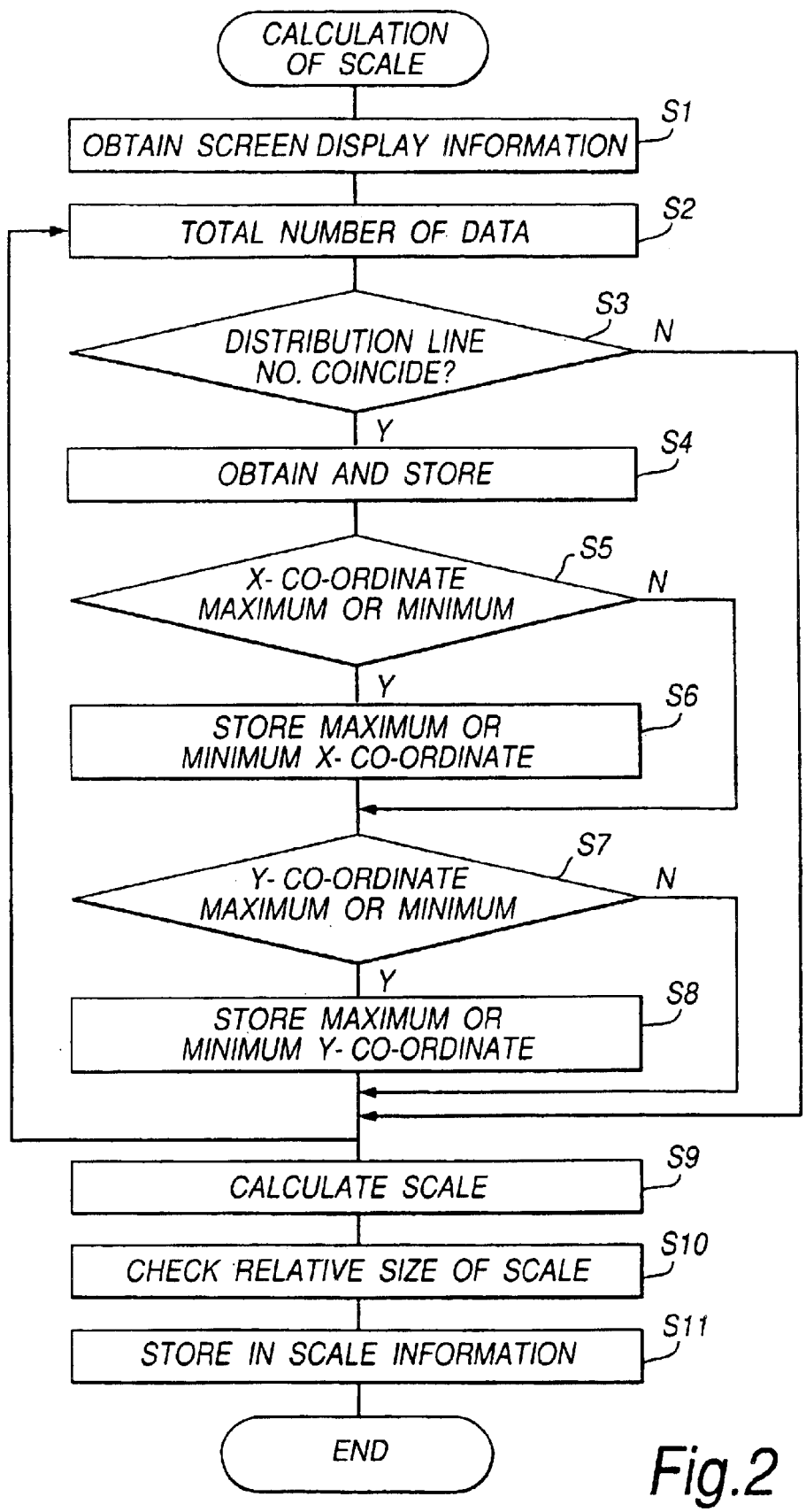
FIG. 2 is a flowchart for explaining an operation of a display scaling section.

It is noted that the functions explained in the above-mentioned embodiment may be realized by recording a program shown in FIG. 2 or 7 in a storing medium and by reading the program recorded in the storing medium by the display scale calculating section 12 which includes, for example, a CPU or other computing device.

Figure 10:
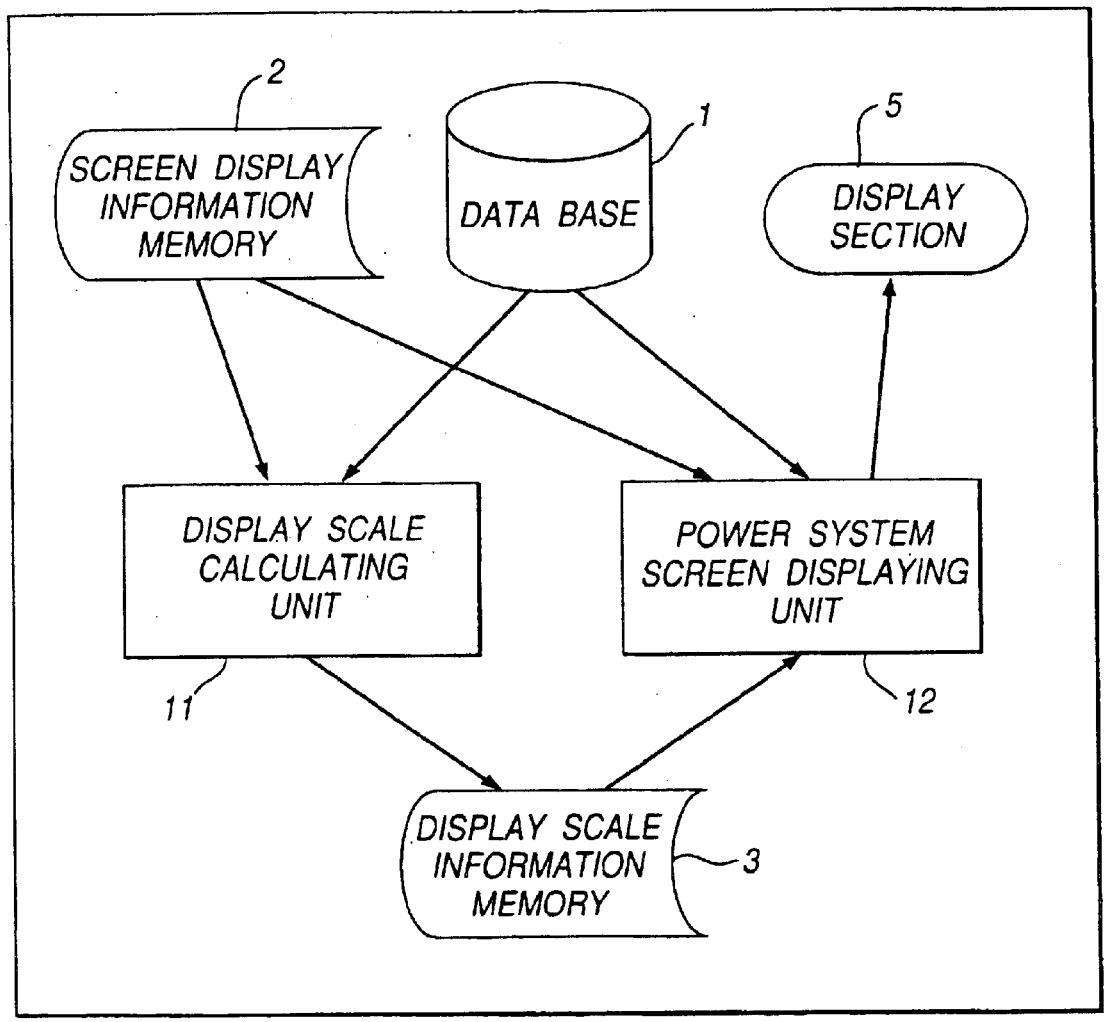
FIG. 10 is a block diagram showing a second embodiment of a system display apparatus and a storing medium according to the invention.

FIG. 10 is a block diagram showing a second embodiment of a system display apparatus according to the invention. It is noted that the elements in the figure which are similar to those in FIG. 1 are denoted by the same reference numerals and an explanation thereof will be omitted here. Only the elements which are specifically different from them will be explained below.

A system display apparatus has a distribution line displaying section 16 which is a system suppressive displaying means in addition the input section (not shown), a database 1, a screen display information memory 2, a display scale calculating section 11, a display scale information memory 3 and a display section 5 similarly to those in FIG. 1.

The distribution line displaying section 16 has a function for selecting only a distribution line which is required by an operator to make reference or control and for displaying a system diagram on the display screen by using the display scale stored by a display scale calculating section 11.

Figure 11:
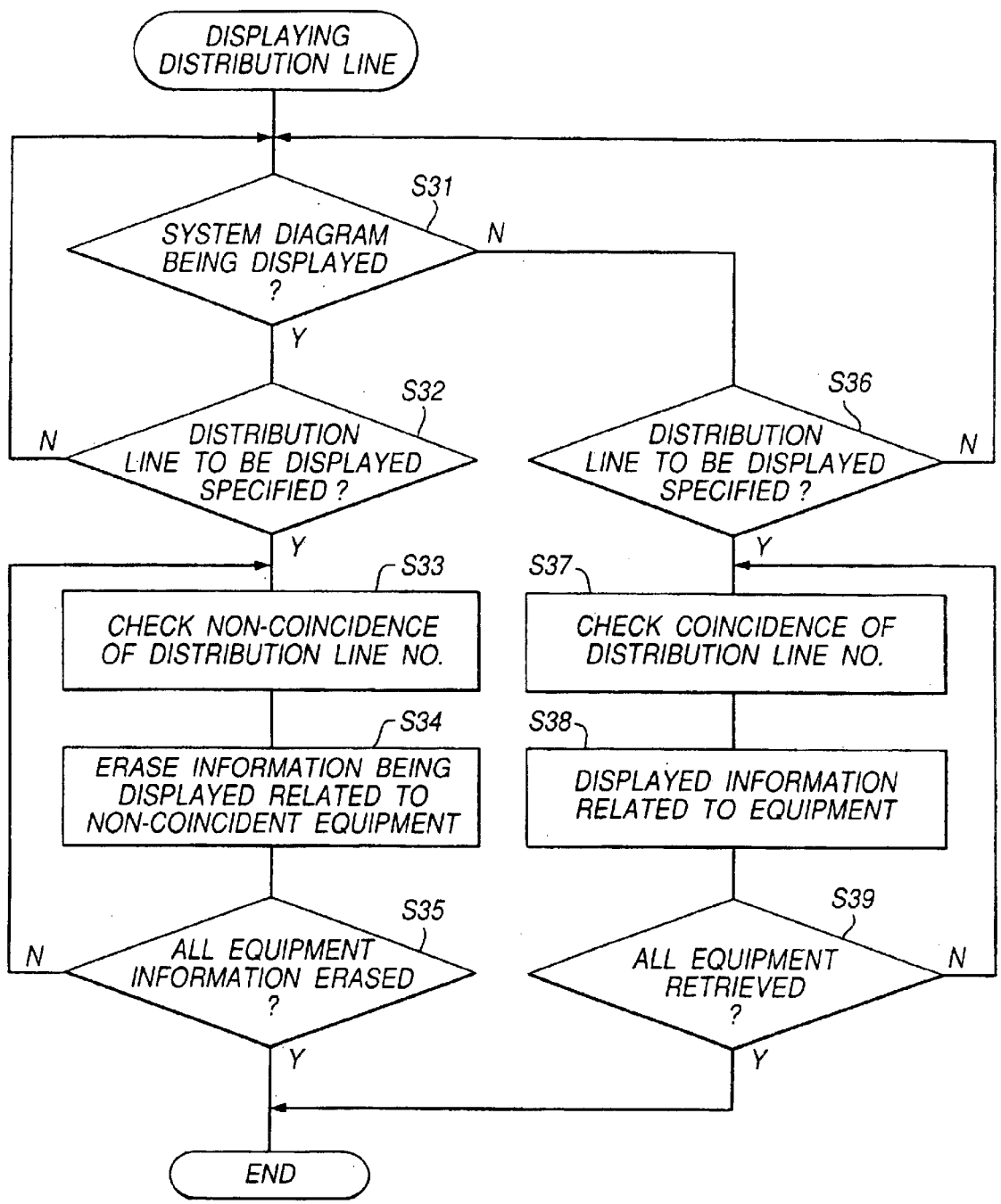
FIG. 11 is a flowchart for explaining an operation of the distribution line displaying section shown in FIG. 10.

An operation of this embodiment will be explained with reference to FIG. 11.

As the display scale calculating section 11 is similar to that shown in FIG. 1, its explanation will be omitted here and only the operation of the distribution line displaying section 16 will be explained below with reference to FIG. 11.

When the distribution line displaying section 16 is operated after the display scale calculating section 11 completes the display scale calculating process, the distribution line displaying section 16 judges whether or not the system diagram is displayed on the display screen (S31).

When the system diagram is displayed and when one distribution line, e.g., Fx, is specified to display among a plurality of distribution lines within the system diagram (S32), the distribution line displaying section 16 compares and checks the distribution line number of that distribution line with the distribution line numbers of the equipment stored in the database 1 (S33) and erases information currently being displayed related to equipment whose distribution line numbers do not coincide (S34).

Figure 12:
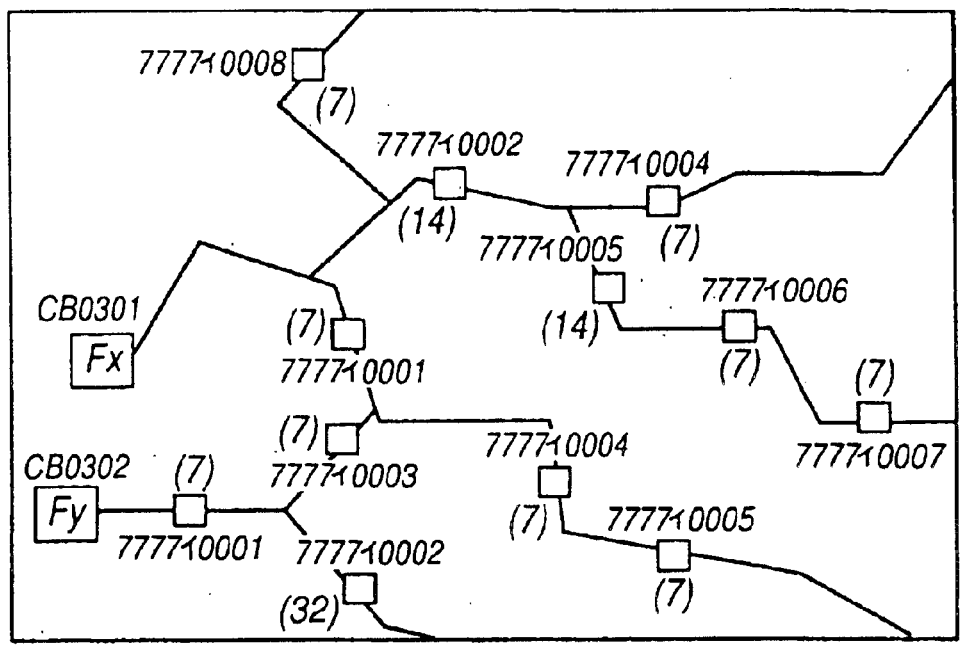
FIG. 12 is a diagram of a system display screen of distribution lines displayed by a conventional apparatus.
Figure 13:
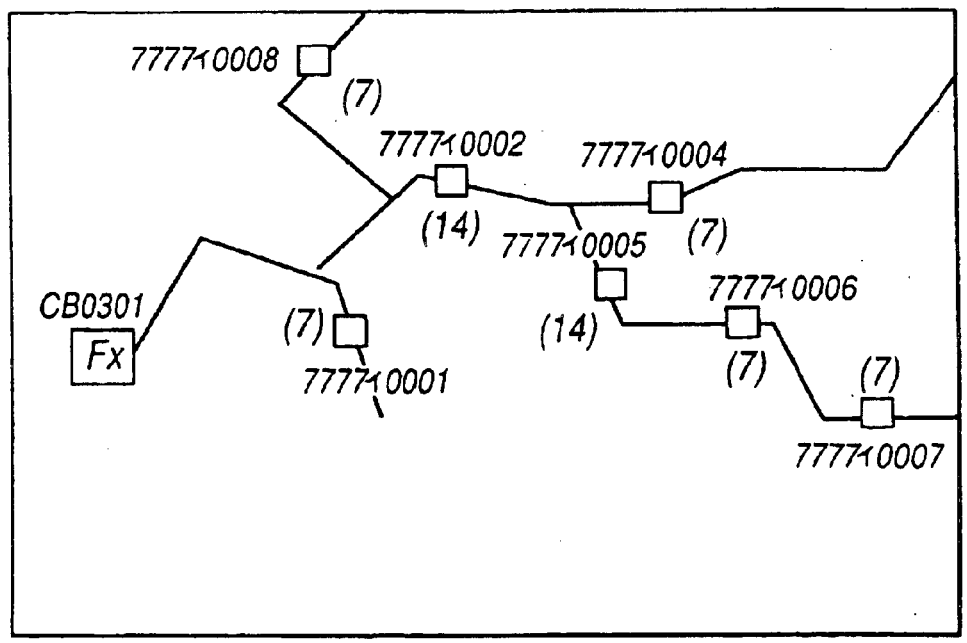
FIG. 13 is a diagram of a system display screen of distribution lines displayed by a process of a distribution line displaying section shown in FIG. 10.

Succeedingly, the distribution line displaying section 16 erases the system of a distribution line Fy shown in FIG. 13 from the system diagram of the plurality of distribution lines shown in FIG. 12 by detecting the equipment whose distribution line numbers are inconsistent (S35) and by erasing information being displayed and related to those equipment.

Thereby, the distribution line displaying section 16 can display the system diagram of only the distribution line Fx on the display section 5.

Meanwhile, when there is no system diagram currently being displayed in Step S31, the distribution line displaying section 16 moves to Step S36 to judge whether or not the distribution line is specified to be displayed by the input section. When the distribution line Fx is specified, the distribution line displaying section 16 compares and checks the distribution line number in the screen display information memory 2 to be displayed with the distribution line numbers of the equipment stored in the database 1 (S37).

When they coincide, the distribution line displaying section 16 reads information related to the equipment of that distribution line number and displays the distribution line displaying section 16 on the display screen by using the display scale which has been stored already in the display scale information memory 3 (S38).

After that, the distribution line displaying section 16 judges whether or not the distribution line numbers of all equipment have been retrieved (S39) and when there still exists, the distribution line displaying section 16 returns to Step S37 to repeatedly execute the process and to display the system diagram of only the distribution line Fx to be displayed on the display screen as shown in FIG. 13.

It is noted that when a method of overwriting all screen information is adopted as a screen display method, the process moves to Step S36 regardless of the result of judgment in Step S31. The procedure from Steps S32 through S35 becomes unnecessary.

According to this embodiment, the distribution lines required to make reference or control to be displayed on the display screen can be displayed. That is, the system related to only required distribution line can be selected and displayed even when the power system of the plurality of distribution lines are crowded. Therefore, it is easy to recognize or to control the equipment of the pertinent distribution line, and even improving the visibility and controllability can be ascertained.

Figure 14:
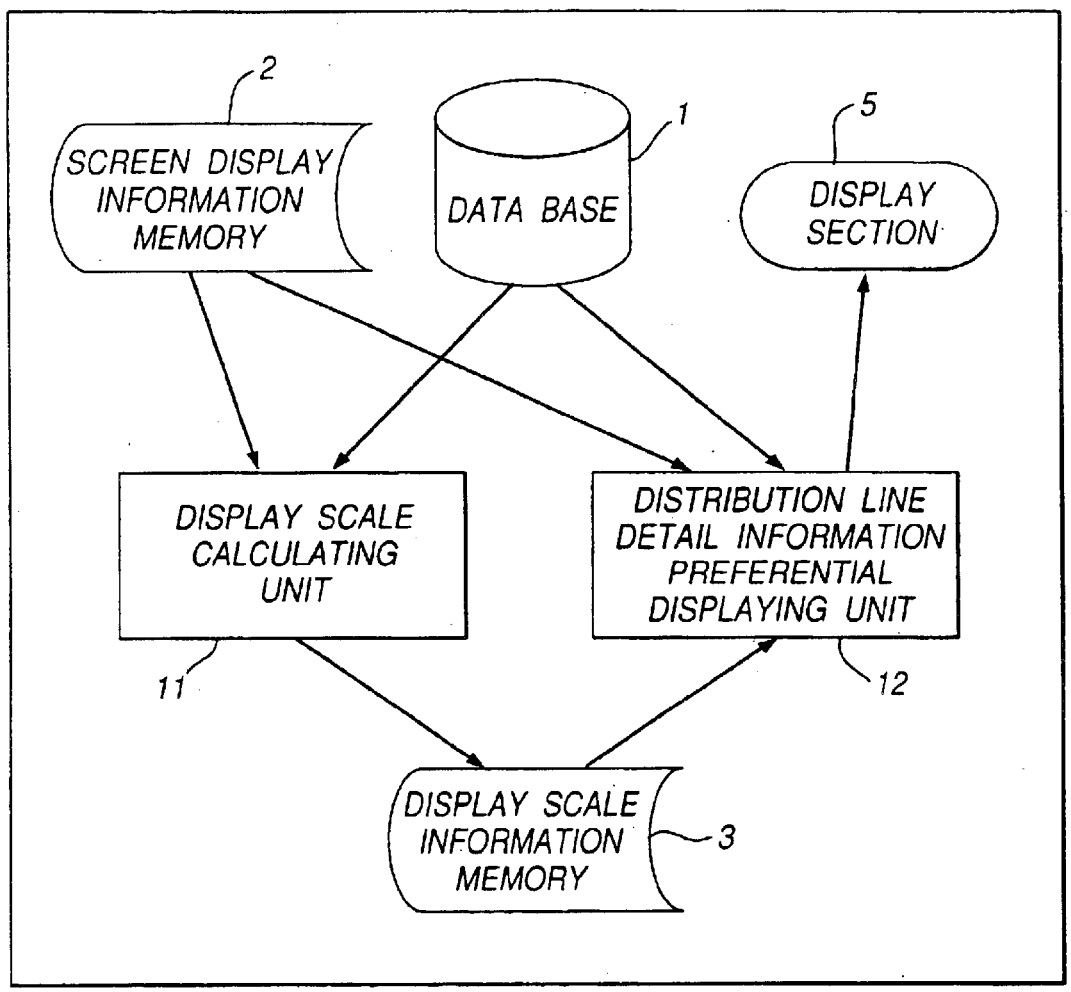
FIG. 14 is a block structural diagram showing another embodiment of a system display apparatus according to the invention.

FIG. 14 is a block diagram showing another embodiment of a system display apparatus according to the invention.

A system display apparatus has a distribution line detail information preferential displaying section 17 which is system suppressive displaying means in addition to the input section (not shown), a database 1, a screen display information memory 2, a display scale calculating section 11, a display scale information memory 3 and a display section 5 similarly to those in FIG. 1.

Accordingly, the elements in the figure which are similar to those in FIG. 1 are denoted by the same reference numerals and an explanation thereof will be omitted here. Only the part which is specifically different from them will be explained below.

The distribution line detail information preferential displaying section 17 performs the process for displaying a distribution line required by the operator to make reference or control on the display screen by adding detail information only thereto. It is noted that the detail information of the distribution line section information such as the name of an equipment, a capacity of the equipment and feed current is stored in the equipment data area in information related to each equipment in the database 1.

Figure 15:
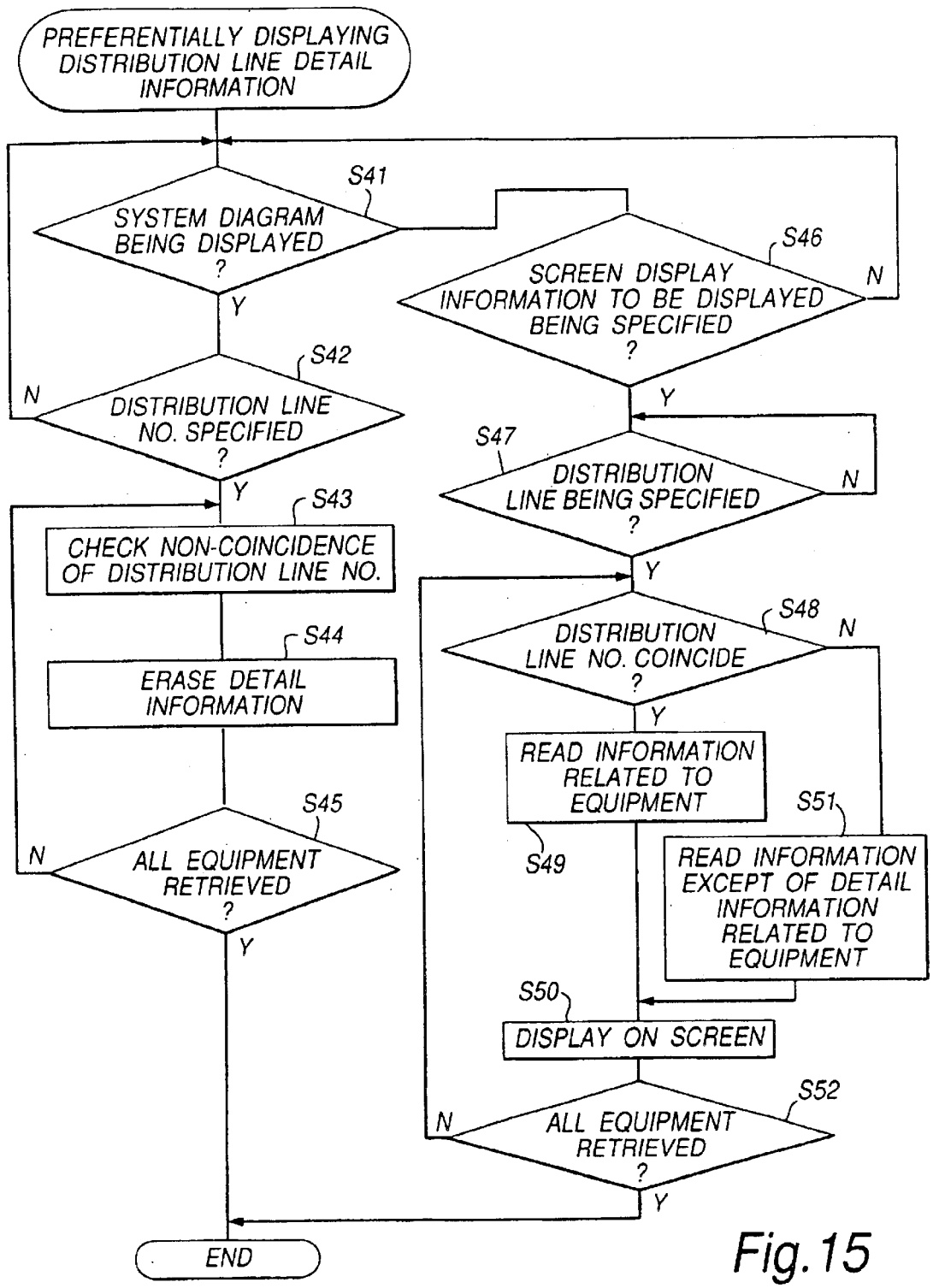
FIG. 15 is a flowchart for explaining an operation of section for preferentially displaying distribution line detail information shown in FIG. 14.

The distribution line detail information preferential displaying section 17 is operated after the display scale calculating section 11 is operated in this system display apparatus. As the processes up to the calculation of the scale of the distribution line to be displayed implemented by the display scale calculating section 11 are the same as those shown in FIG. 2 or 7, the scale calculating process is not described here as it was explained with reference to FIG. 2 or 7, and only the process of the distribution line detail information preferential displaying section 17 will be explained here with reference to FIG. 15.

When the distribution line detail information preferential displaying section 17 is operated after the display scale calculating section 11 completes the process for calculating the display scale, the distribution line detail information preferential displaying section 17 judges whether or not the system diagram is displayed on the display screen at this time (S41).

When the system diagram is being displayed and when one distribution line, e.g., Fx, is specified to display and to make reference or control among a plurality of distribution lines within the system diagram (S42), the distribution line detail information preferential displaying section 17 compares and checks the distribution line number of the pertinent distribution line with distribution line numbers of the equipment related to those currently being displayed and stored in the database 1 (S43).

When the distribution line numbers do not coincide, it erases detail information among information currently being displayed and related to the equipment whose distribution line numbers have not coincided (S44).

Figure 16:
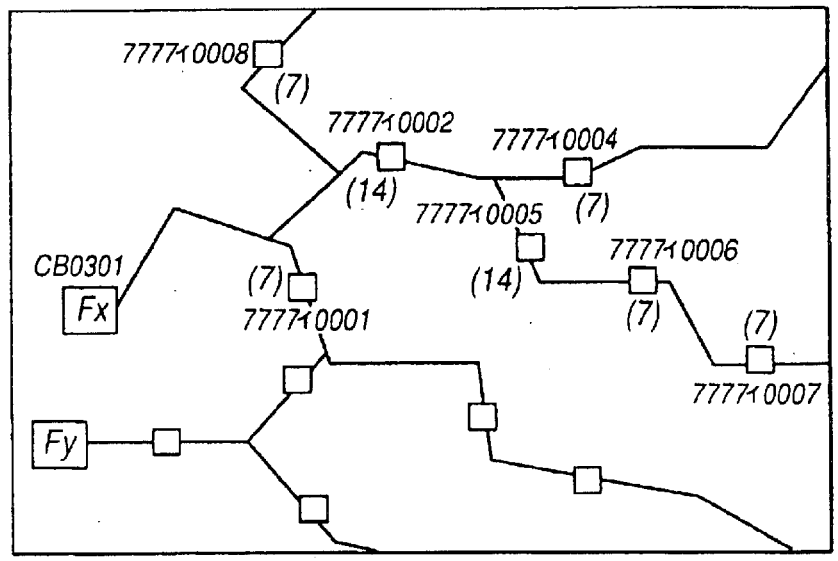
FIG. 16 is a diagram of a system display screen of distribution lines displayed by the process for preferentially displaying the distribution line detail information shown in FIG. 14.

Succeedingly, the distribution line detail information preferential displaying section 17 displays a system diagram as shown in FIG. 16 by detecting the equipment whose distribution line numbers are inconsistent (S45) and by erasing the detail information currently being displayed and related to the pertinent equipment.

Meanwhile, when a system diagram is not currently displayed in Step S41, the process moves to Step S46 to judge whether or not screen display information to be displayed is specified by the input section. When the information is specified, the distribution line detail information preferential displaying section 17 specifies a plurality of distribution lines Fx and Fy which fall within the display range of the screen display information memory 2 and then judges whether or not one distribution line, e.g., Fx, is specified to display and to make reference or control among the plurality of distribution lines (S47).

When the distribution line Fx is specified here, the distribution line detail information preferential displaying section 17 compares and checks its distribution line number with the distribution line numbers of the equipment stored in the database 1 (S48).

When they coincide, the distribution line detail information preferential displaying section 17 reads the information related to the equipment of that distribution line number (S49) and displays it on the display screen by using the display scale already stored in the display scale information memory 3 (S50).

When the distribution line numbers do not coincide in Step S48, the distribution line detail information preferential displaying section 17 reads information other than the detail information (name of equipment, time limit and others) related to that equipment (S51) and displays information on the display screen in the same manner by using the display scale already stored in the display scale information memory 3 (S50).

After that, the distribution line detail information preferential displaying section 17 judges whether or not the distribution line numbers of all equipment have been retrieved (S52) and when there still remains, returns to Step S48 to repeatedly execute the process. Then, the distribution line detail information preferential displaying section 17 displays the system diagram in which detail information is added only to the distribution line Fx and no detail information is added to the distribution line Fy as shown in FIG. 16.

It is noted that when the method of overwriting all of the screen information is adopted as the screen displaying method, the process moves to Step S46 regardless of the result of judgment in Step S41. The procedures from Steps S42 through S45 are not necessary in such a case.

According to this embodiment, only the distribution line required by the operator to make reference or control can be displayed in detail and the other distribution lines to be displayed only with the rough system connection can be displayed. That is, the recognizability of the required distribution line can be improved, the state of system of the adjoining distribution lines can be readily recognized and the visibility and controllability can be improved even when the power system is complex.

Figure 17:
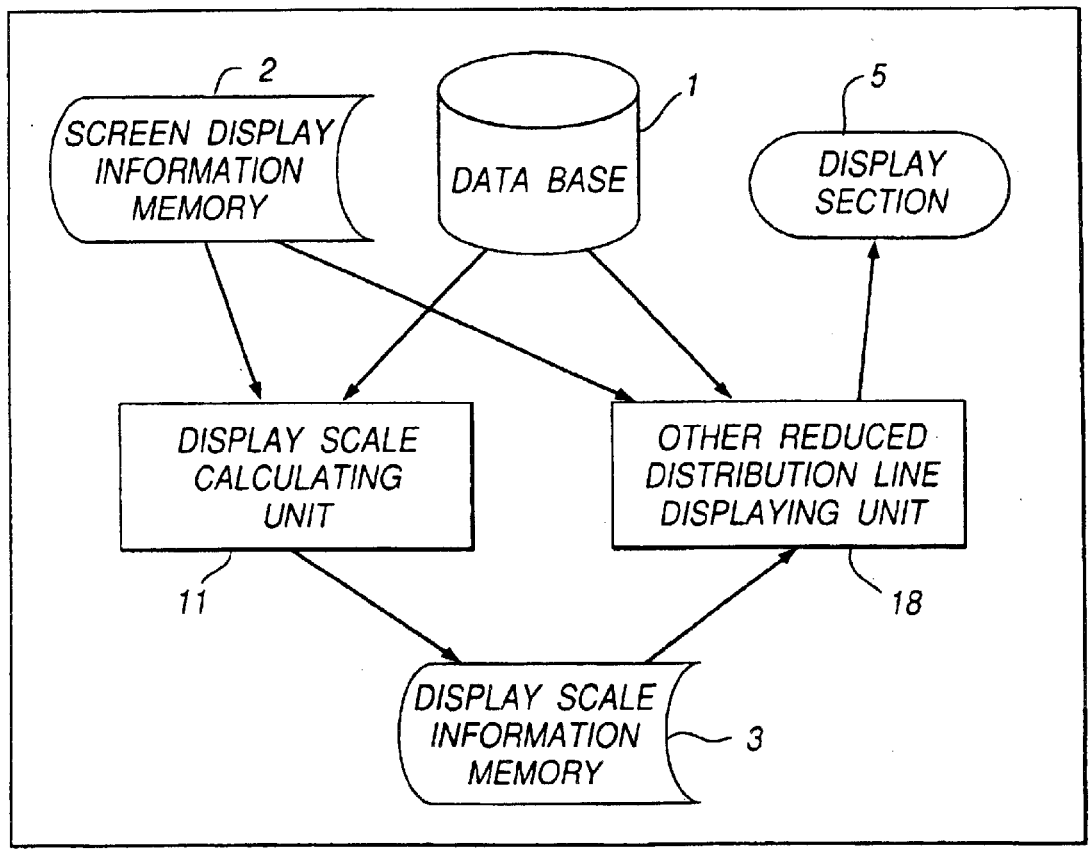
FIG. 17 is a block structural diagram showing another embodiment of a system display apparatus and a storing medium according to the invention.

FIG. 17 is a block diagram showing another embodiment of a system display diagram according to the invention.

The system display apparatus has a reduced distribution line displaying section which is system suppressive displaying means in addition to a input section (not shown), a database 1, a screen display information memory 2, a display scale calculating section 11, a display scale information memory 3 and a display section 5 similarly to those in FIG. 1.

Accordingly, the elements in the figure which are similar to those in FIG. 1 are denoted by the same reference numerals and an explanation thereof will be omitted here. Only the elements which are specifically different from them will be explained below.

The other reduced distribution line displaying section 18 displays symbols and others of distribution lines other than a distribution line specified by the operator while reducing them in accordance to a predetermined scale. Then, display scale of two times (ratio of scale: 1/2), for example, is set in the display scale information memory 3 as the reducing display scale in the apparatus.

The other reduced distribution line displaying section 18 is operated after the display scale calculating section 11 is operated in this system display apparatus.

Figure 18:
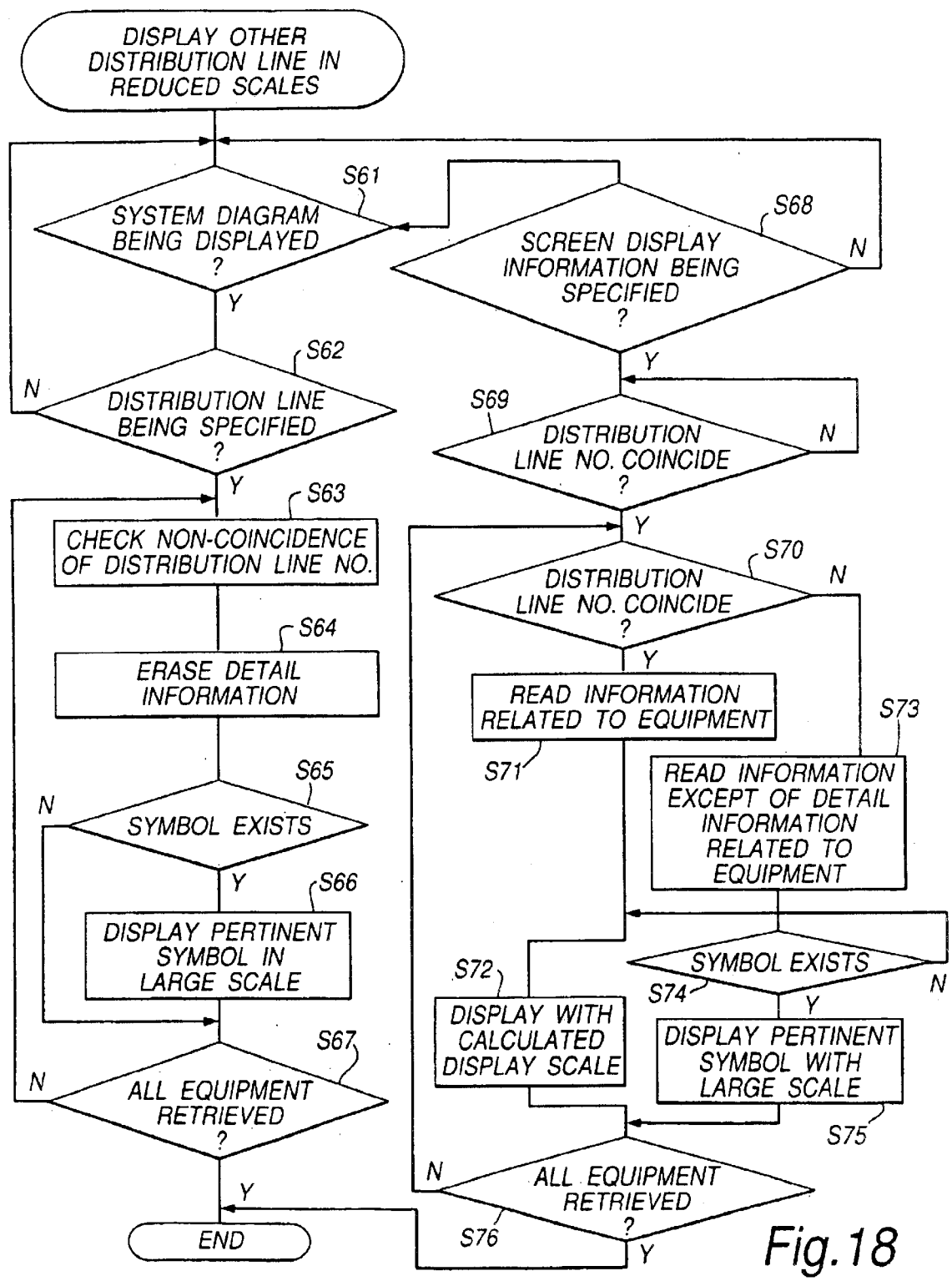
FIG. 18 is a flowchart for explaining the operation of the reduced distribution line displaying section shown in FIG. 17.

As the processes until the scale of the distribution line to be displayed is calculated by the display scale calculating section 11 are the same as those shown in FIG. 2 or 7, the scale calculating process is not explained again since the scale calculating process was explained with reference FIG. 2 or 7 and only the process of the other reduced distribution line displaying section 18 will be explained with reference to FIG. 18.

While the other reduced distribution line displaying section 18 is operated after the display scale calculating section 11 completes the process for calculating the display scale, the other reduced distribution line displaying section 18 judges whether or not the system diagram is displayed on the display screen at this time (S61).

When the system diagram is being displayed and when one distribution line, e.g., Fx, is specified to display and to make reference or control among a plurality of distribution lines within the system diagram (S62), the other reduced distribution line displaying section 18 compares and checks the distribution line number of the pertinent distribution line related to the displaying range in screen displaying information memory 2 with the distribution line numbers of the equipment related to those currently being displayed and stored in the database 1 (S63).

When the distribution line numbers do not coincide, the other reduced distribution line displaying section 18 erases detail information among information currently being displayed and related to the equipment whose distribution line numbers have not coincided (S64).

When the equipment has a symbol, the other reduced distribution line displaying section 18 displays that symbol by using the large display scale (1/2) set in advance in the screen display information memory 2 (S65, S66).

Figure 19:
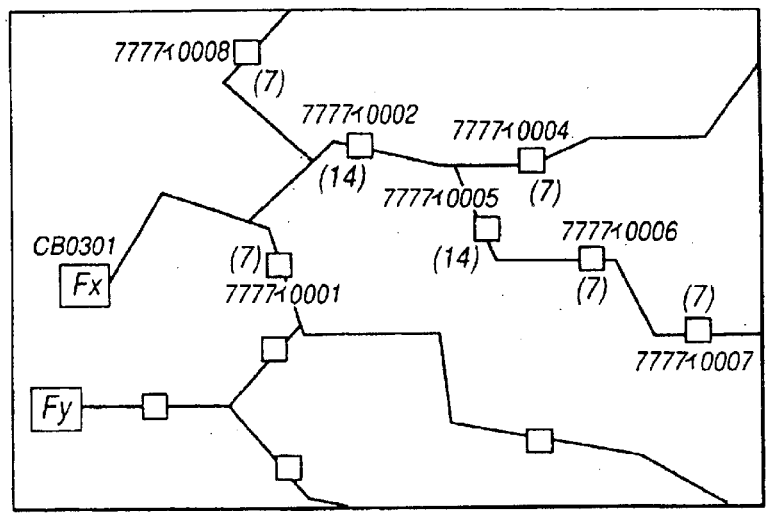
FIG. 19 is a diagram of a system display screen of distribution lines displayed by the process of the other reduced distribution line displaying section shown in FIG. 17.

Succeedingly, it displays a system diagram as shown in FIG. 19 by detecting equipment whose distribution line numbers are inconsistent (S67) and by executing the similar processes.

Meanwhile, when there exists no system diagram currently being displayed in Step S61, the process moves to Step S68 to judge whether or not screen display information to be displayed is specified through the input section. When there is specified information, the other reduced distribution line displaying section 18 specifies a plurality of distribution lines Fx and Fy which fall within the display range of the screen display information memory 2 and then judges whether or not one distribution line, e.g., Fx, is specified to display and to make reference or control among the plurality of distribution lines (S69).

When the distribution line Fx is specified, the other reduced distribution line displaying section 18 compares and checks that distribution line number with the distribution line numbers of the equipment stored in the database 1 (S70).

When they coincide, the other reduced distribution line displaying section 18 reads information related to the equipment of that distribution line number (S71) and displays information on the display screen by using the display scale already stored in the display scale information memory 3 (S72).

When the distribution line numbers do not coincide in Step S70, the other reduced distribution line displaying section 18 reads information other than the detail information (name of equipment, time limit and others) related to that equipment (S73) and displays information on the display screen in the same manner by using the calculated display scale.

When that equipment has a symbol, the other reduced distribution line displaying section 18 displays the symbol on the display screen by using the large scale set as described above (S74).

After that, the other reduced distribution line displaying section 18 judges whether or not the distribution line numbers of all equipment have been retrieved (S76) and when there still remains, returns to Step S70 to repeatedly execute the process.

Then, on the display screen the other reduced distribution line displaying section 18 displays the system diagram in which detail information is added only to the distribution line Fx and no detail information is added to the distribution line Fy and the distribution line Fx has small symbols as shown in FIG. 19.

It is noted that when the method of overwriting all screen information is adopted as the screen displaying method, the process moves to Step S68 regardless of the result of judgment in Step S61. The procedures from Steps S62 through S67 are not necessary in such a case.

According to this embodiment, the distribution line required by the operator to make reference or control can be displayed in the specified or calculated display scale, and the equipment of the other distribution lines can be displayed only with the small symbols. That is, the recognizability of the required distribution line can be improved even when the power system is crowded. And, the state of system or state of connection of the desired distribution line and the adjoining distribution lines can be readily recognized and the visibility and controllability can be improved.

Figure 20:
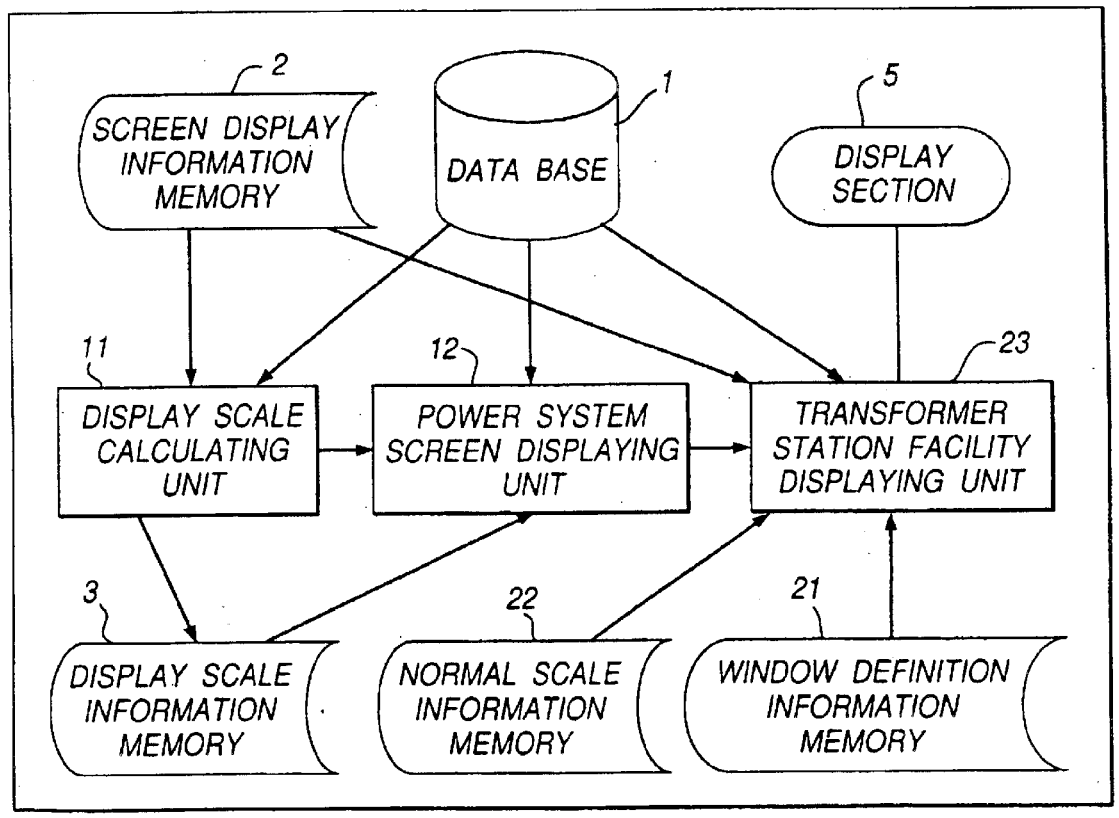
FIG. 20 is a block diagram showing a third embodiment of a system display apparatus and a storing medium according to the invention.

FIG. 20 is a block diagram showing a third embodiment of a system display apparatus according to the invention.

A system display apparatus has a window definition information memory 21 for defining the size of a window corresponding to the display range in a screen display information memory 2, a normal scale information memory 22 for storing scale data for displaying equipment within the window and substation equipment displaying section 23 for displaying equipment of a substation provided at each distribution line in addition to the input section (not shown), a data base 1 (see FIG. 88), a screen display information memory 2 (see FIG. 89), a display scale calculating section 11 for calculating the scale for displaying a system diagram in conformity with the size of the display screen, a display scale information memory 3 for storing the scale calculated by the display scale calculating section 11 as a display scale in addition to the normal display scale, and the power system screen displaying section 12.

The display scale calculating section 11 detects coordinates of a rectangle into which distribution lines to be displayed fall, to calculate the display scale which allows the distribution lines within the rectangle to be displayed in the largest size within the display screen of the display section 5. It is the same as that explained in the first embodiment, so that its explanation will be omitted here.

The power system screen displaying section 12 displays the system diagram on the display section 5 by using the display scale calculated by the display scale calculating section 11. It is also the same as that explained in the first embodiment.

While there is a case when the substation (equipment) is excluded or the surrounding area including the substation can be hardly understood depending on the size of the system diagram when it is displayed, for example, the substation equipment displaying section 23 displays one substation which exists per distribution line in an adequate size in a window.

Figure 21:
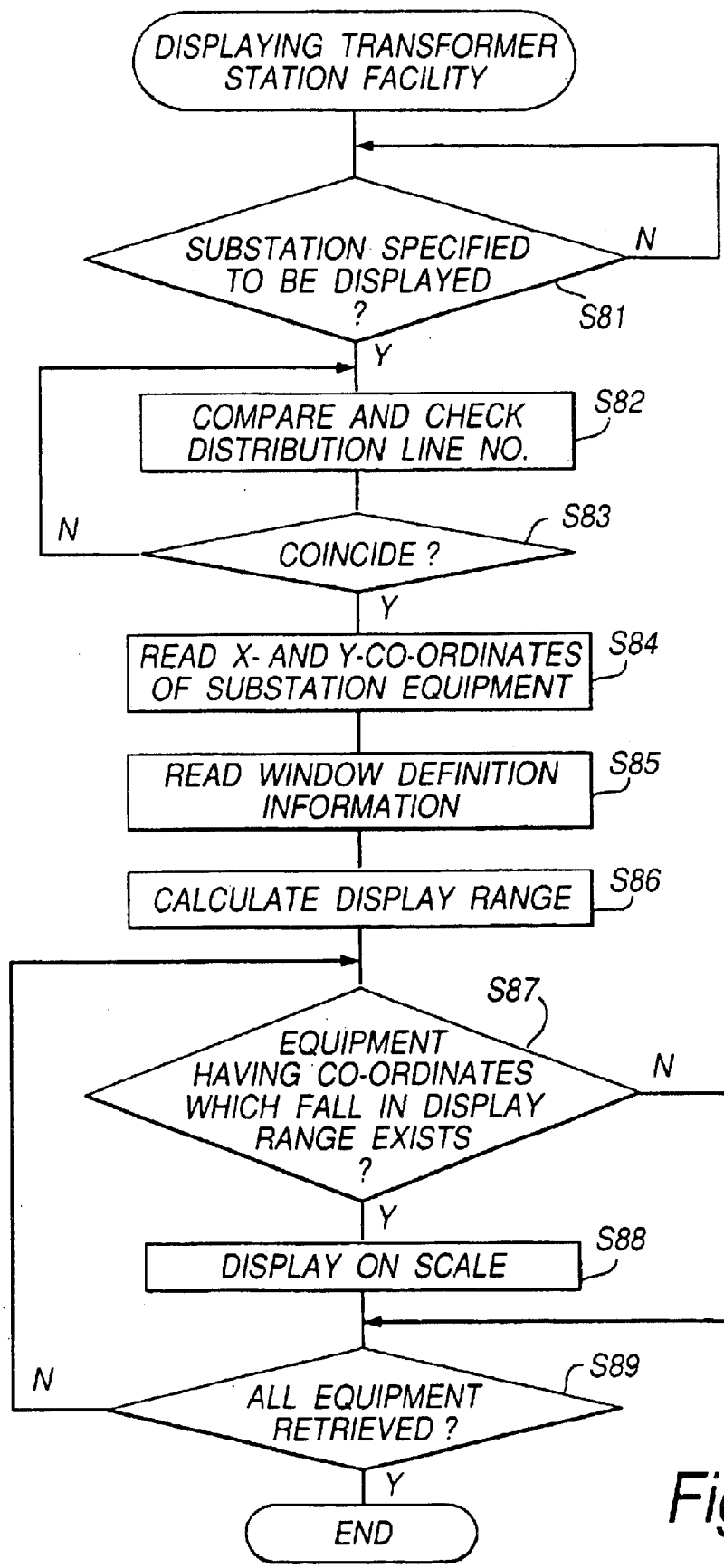
FIG. 21 is a flowchart for explaining an operation of substation equipment displaying section shown in FIG. 20.

The process of the substation equipment displaying section 23 will be explained below with reference to FIG. 21.

Figure 22:
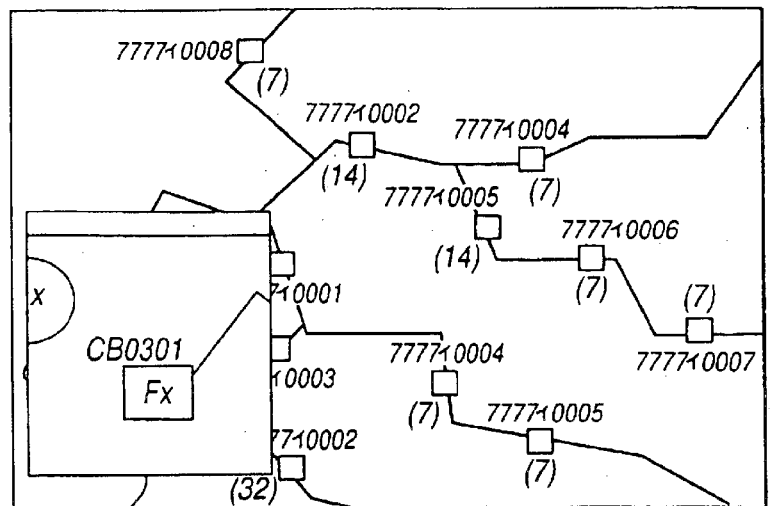
FIG. 22 is a diagram of a system display screen of distribution lines displayed by the process of the transformer equipment displaying section shown in FIG. 20.

At first, the power system screen displaying section 12 displays the system diagram composed of one or more distribution lines on the display section 5 as shown in FIG. 22 by sing the display scale calculated by the display scale calculating section 11.

In this state, the substation equipment displaying section 23 judges whether or not a command to display a substation has been inputted from the input section (S81).

When the command has been inputted, the substation equipment displaying section 23 compares and checks the distribution line number in the screen display information memory 2 of the system diagram currently being displayed with the distribution line number related to the substation equipment in the database 1 (S82).

When there is a coincident substation equipment (S83), the substation equipment displaying section 23 reads X- and Y-coordinates of an FCB symbol which is the substation equipment regarding to the substation FCB symbol (S84) and sets those coordinates as the center coordinate of the FCB symbol of the substation equipment on the display section 5.

Further, the substation equipment displaying section 23 reads window definition information (size of the window) from a window definition information memory 21 (S85) and calculates a window display range on the display section 5 (S86).

The process for calculating the window display range is carried out by adding/subtracting the values of the center coordinates detected from the window definition information with respect to the center coordinates of the FCB symbol of the substation equipment and by setting the obtained values as the display range of the window on the display section 5.

An example of the calculation of the display range will be described below.

The center coordinates of the substation equipment displayed on the display section 5 (display coordinates of FCB of the distribution line):

(X, Y)=(30000, 50000)
Window definition information (size of window):
(X, Y)=(3000, 4000)
Center coordinates of window:
(X, Y)=(3000/2, 4000/2)=(1500, 2000)
Display range (coordinates) of substation equipment:
X-direction=30000−1500<display data<30000+1500= 28500<display data<31500
Y-direction=50000−2000<display data<50000+2000= 48000<display data<52000

Then, the substation equipment displaying section 23 judges whether or not there exists an equipment of coordinates which fall within the display range calculated from the database 1 in Step S86.

When there exists an equipment around the surrounding including the substation, the substation equipment displaying section 23 displays that the equipment within a window 24 on the display section 5 by using the scale in the normal scale information memory 21 (S87 through S89).

FIG. 22 shows a screen display of this system display apparatus in which the substation equipment of the distribution line (Fx) and its surrounding are displayed separately on the window 24.

It is noted that detail information may be displayed when they are displayed largely on the separate window.

According to this embodiment, the distribution line which is required by the operator to make reference or control can be displayed on the screen and the substation equipment of the distribution line can be displayed so that the operator can understand.

Therefore, it is possible to readily understand the status of the power source of the distribution line and to improve the controllability in switching or recovering when a fault occurs even when the distribution line to be referred is positioned at the part where the power system is condensed.

Figure 23:
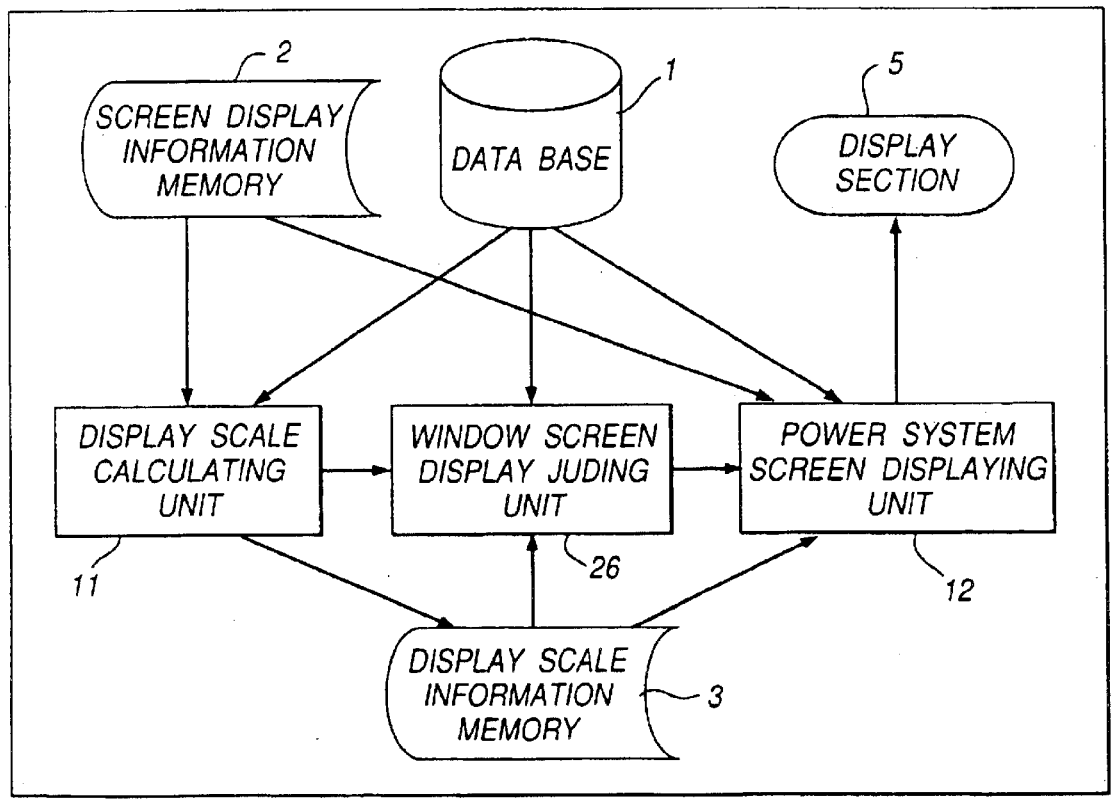
FIG. 23 is a diagram showing a fourth embodiment of a system display apparatus and a storing medium according to the invention.

FIG. 23 is a block diagram showing a fourth embodiment of a system display apparatus according to this invention. It is noted that the elements in the figure which are similar to those in FIG. 1 are denoted by the same reference numerals and a detailed explanation thereof will be omitted here.

This system display apparatus has a window screen display judging section 26 in addition to the input section (not shown), a data base 1, a screen display information memory 2, the display scale calculating section 11, a display scale information memory 3, a display section 5 and a power system screen displaying section 12.

The example in which a scale threshold value (see FIG. 5) is set in advance and the display scale calculating section 11 judges whether or not a scale calculated in the X- and Y-directions is greater than the scale threshold value and sets and stores the scale threshold value in the display scale information memory 3 as the display scale when the calculated scale is smaller than the scale threshold value has been explained in the first embodiment.

In this embodiment, the window screen display judging section 26 judges an area on the outside of the screen display range in the scale threshold value and allows equipment in that area to be displayed in a window when the scales calculated by the display scale calculating section 11 in the X- and Y-directions exceed the scale threshold value, for example.

Next, the processing operation of the window screen display judging section 26 will be explained with reference to FIG. 24.

It is assured that the display scale calculating section 11 stores the coordinates of a rectangle in the database 1, for example, as the coordinates of the rectangle by the scale threshold values as shown in FIG. 8 is obtained in the display scale calculating section 11.

It is also assured that the scale threshold values are stored in the display scale information memory 3 in advance and the display scale calculating section 11 outputs the display scale as the calculation result.

In this state, the window screen display judging section 26 compares the display scale obtained from the display scale calculating section 11 with the scale threshold value in the display scale information memory 3 to judge whether or not the display scale exceeds the scale threshold value (S91).

When the window screen display judging section 26 judges here that the display scale exceeds the scale threshold value, it reads the rectangular coordinates of the display range by the scale threshold value from the database 1, selects coordinates of an equipment having a distribution line number on the outside of the coordinates which coincides with the distribution line number within the coordinates (within the display range) (S93 through S95) and judges the positional relationship between the rectangular coordinates of the display range with the coordinates of the equipment (S96).

That is, when the coordinate of the equipment is smaller than the minimum X-coordinate of the rectangle coordinates of the display range, the window screen display judging section 26 assumes that the equipment exists in the left direction on the outside of the display range and stores its minimum X-coordinate, the maximum Y-coordinate and the minimum Y-coordinate in the database 1, for example, to store that display area (S97).

Similarly, when the coordinate of the equipment is greater than the maximum X-coordinate of the rectangular coordinates of the display range, it assumes that the equipment exists in the right direction on the outside of the display range and stores its maximum X-coordinate, the maximum Y-coordinate and the minimum Y-coordinate (S98).

When the coordinate of the equipment is greater than the maximum Y-coordinate of the rectangular coordinate of the display range, it assumes that the equipment exists in the upper direction on the outside of the display range and stores its maximum X-coordinate, the minimum X-coordinate and the maximum Y-coordinate (S99).

When the coordinate of the equipment is smaller than the minimum Y-coordinate of the rectangular coordinate of the display range, it assumes that the equipment exists in the lower direction on the outside of the display range and stores its maximum X-coordinate, the minimum X-coordinate and the minimum Y-coordinate (S100).

The power system screen displaying section 12 is operated upon the above-mentioned processes after retrieving about all equipment on the outside of the rectangular coordinates and storing the display range in the four direction of the window (S101).

Figure 25:
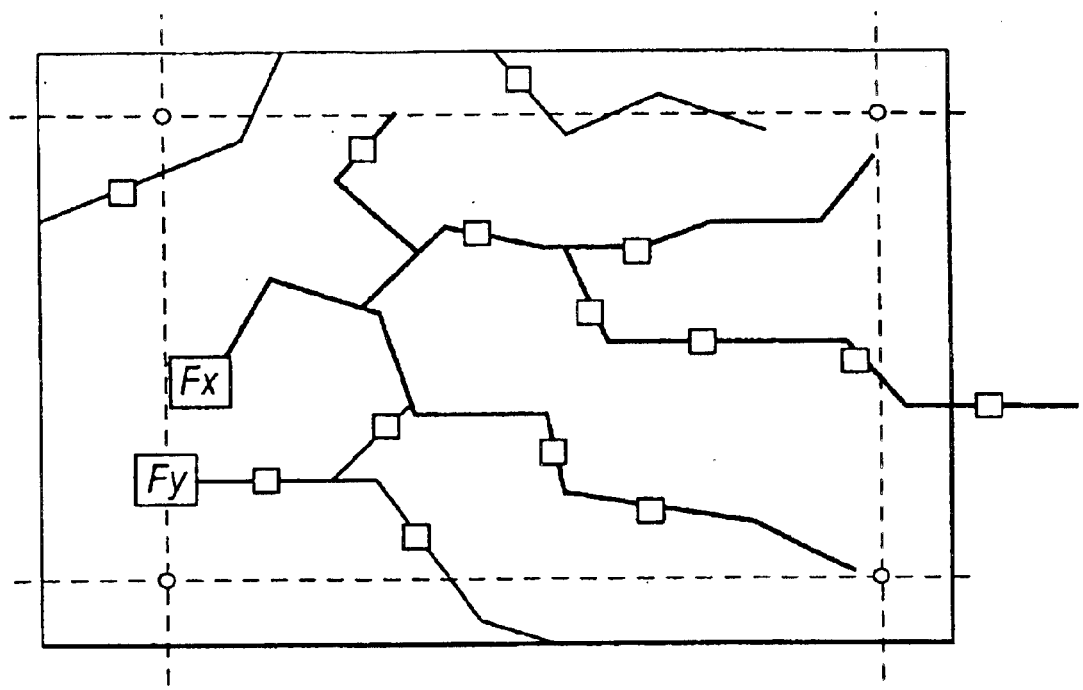
FIG. 25 is a diagram of a system display screen in which a distribution line to be displayed is excluded from the display range.
Figure 26:
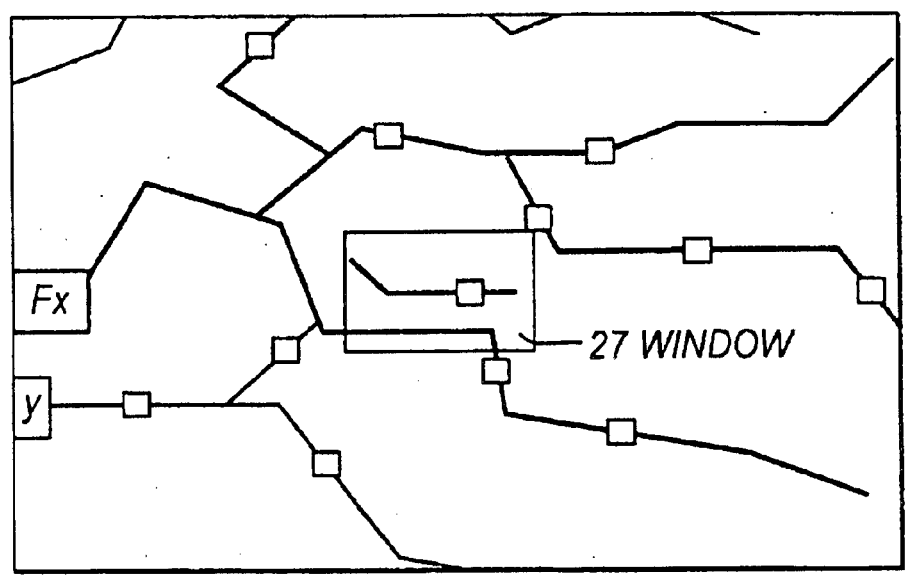
FIG. 26 is a diagram of a display screen in which the distribution line to be displayed and excluded from a display range in FIG. 25 is displayed in a window.

Here, the power system screen displaying section 12 display an equipment existing in the right direction on the outside of the display range as shown in FIG. 26 in a window 27 in addition to displaying the system diagram shown in FIG. 25.

According to this embodiment, as the excluded equipment of the distribution line can be displayed within one display screen, it is possible to understand the whole system of the distribution line adequately just by commanding to change the screen display magnification and information amount, without changing the contents of the display of the system diagram every time.

Figure 27:
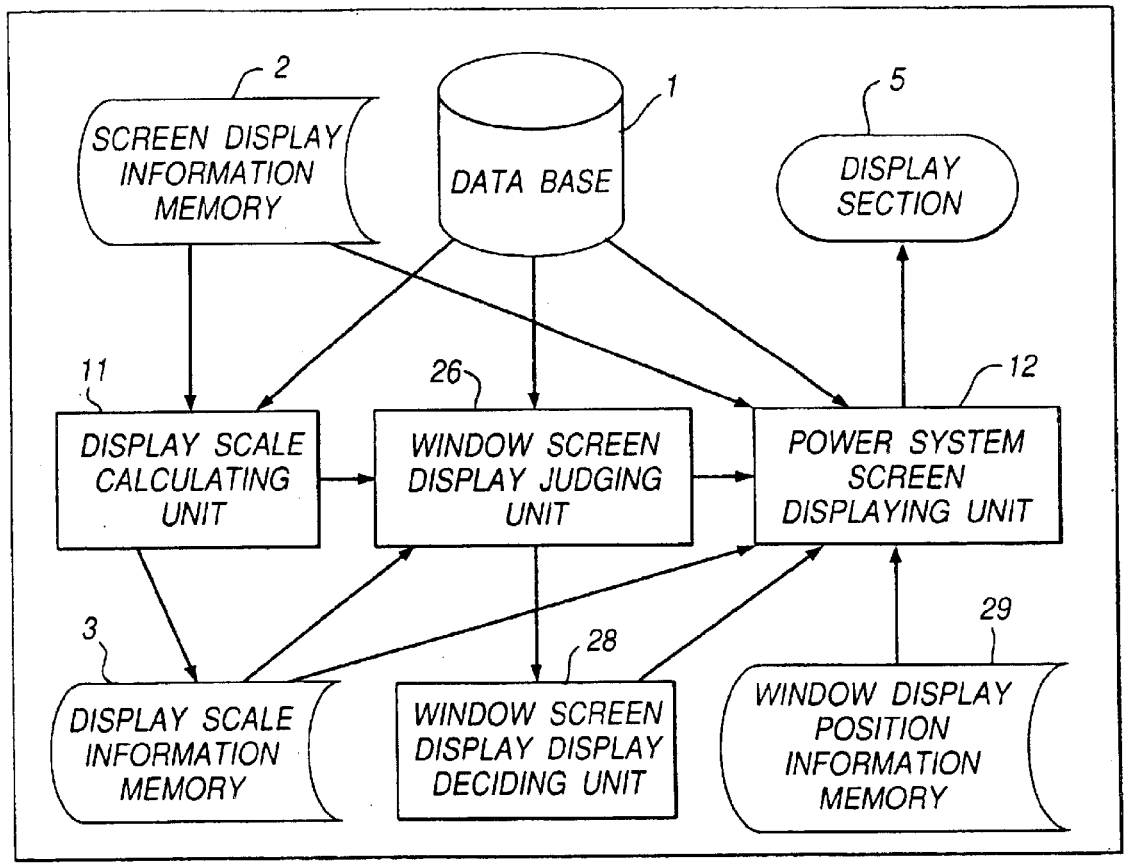
FIG. 27 is a block diagram showing another embodiment of a system display apparatus and a storing medium according to the invention.

FIG. 27 is a block diagram showing another embodiment of a system display apparatus according to the invention. It is noted that the elements in the figure which are similar to those in FIG. 23 are denoted by the same reference numerals and an explanation thereof will be omitted here.

This system display apparatus has a window screen display position deciding section 28 for displaying a window for displaying equipment on the outside of the screen display range in addition to a distribution line to be displayed and a window display position information memory 29 for storing display position information of the window to be displayed in addition to elements shown in FIG. 23.

Figure 24:
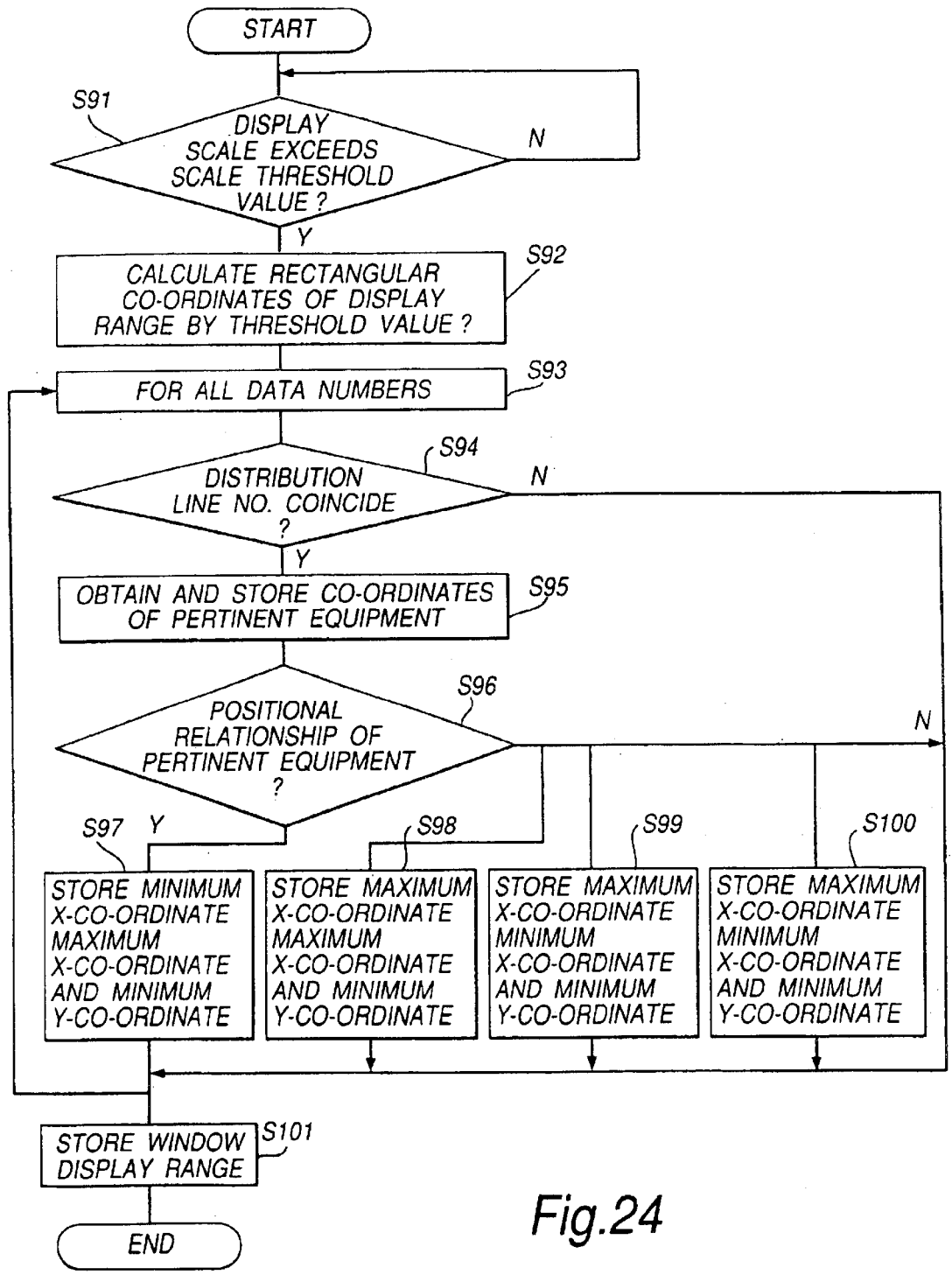
FIG. 24 is a flowchart for explaining an operation of window screen display range judging section shown in FIG. 23.

While the processes of this system display apparatus are basically the same as those in FIG. 23 and 24, the window display position is decided by the screen display position deciding section 28 after judging the display range by the window screen display judging section 26.

The processes of the screen display position deciding section 28 will be explained below with reference to FIG. 28.

The screen display position deciding section 28 calculates the center coordinates of a window screen in an area on the outside of the display range at first (S111). The screen display position deciding section 28 then select the rectangular coordinates of the display range by the scale threshold value and its center coordinates from the database 1 and others (S112), divides the display range into four elements of up and down and right and left and calculates the center coordinates of the respective partial areas (S113) and judges the display position of the window screen for each partial area (S114).

This judgment is made by calculating the display range of the window screen at the center coordinate of the partial area (S115), retrieving that how many equipment of the distribution line exist within the display range and by storing its result (S116).

Figures 28, 29:
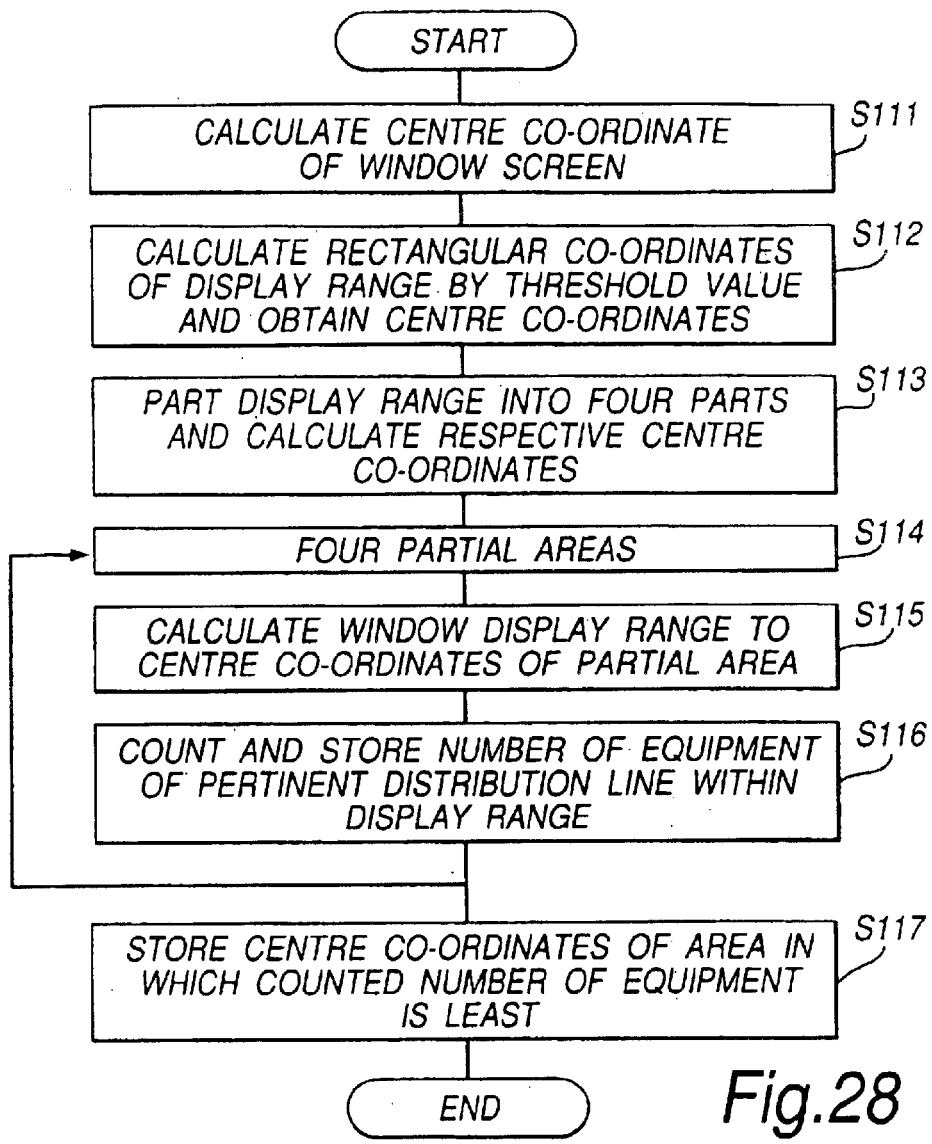
FIG. 28 is a flowchart for explaining an operation of screen display position deciding section shown in FIG. 27.
FIG. 29 is a table showing a structure of data array related to a position for displaying a window.

The screen display position deciding section 28 implements this judgment by a number of the partial areas, sets an area in which a number of retrieved equipment is the least as the center coordinate for displaying the window screen, stores each window display position information including the center coordinate as shown in FIG. 29 in a window display position information memory 29 (S117) and activates the power system screen displaying section 12.

Figure 30:
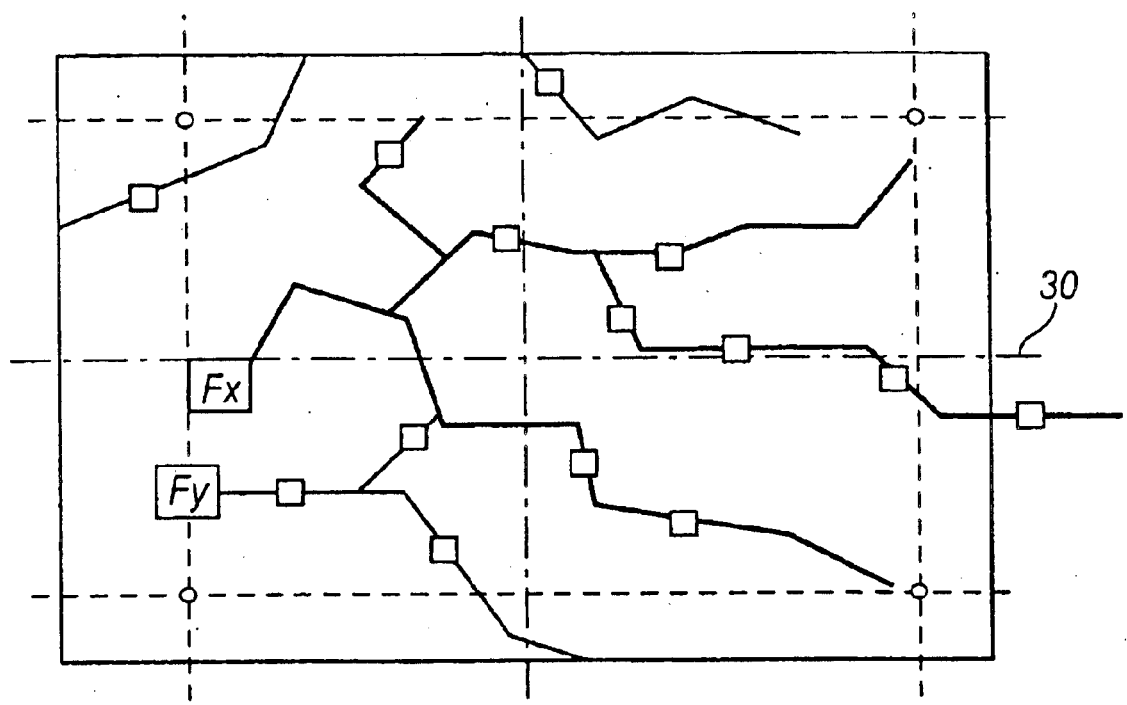
FIG. 30 is a diagram of a screen for detecting out a domain other than a distribution line system to be displayed by using the screen display position deciding section shown in FIG. 27.
Figure 31:
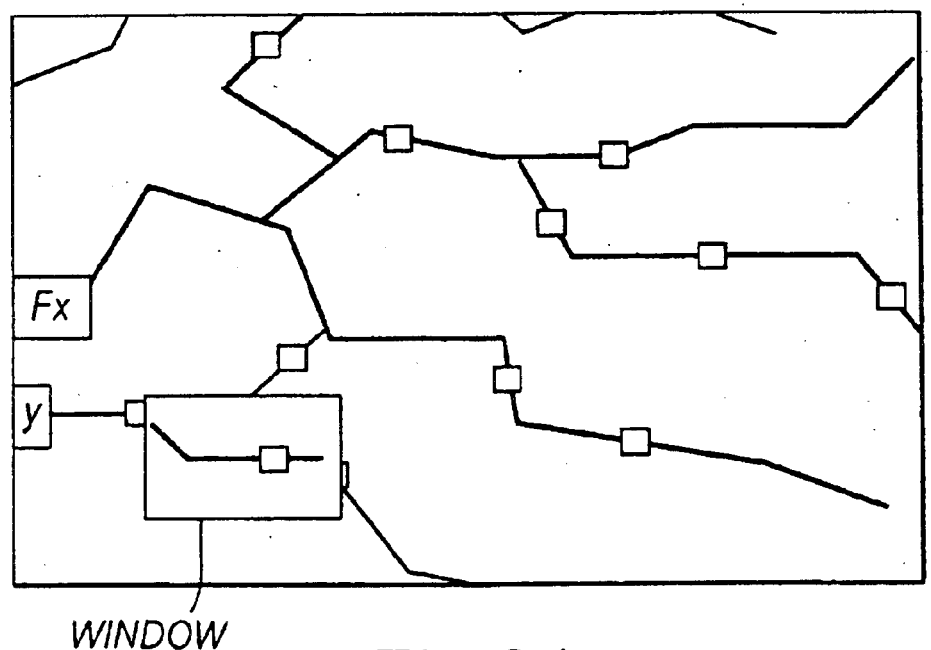
FIG. 31 is a diagram of a display screen in window displaying the distribution line system to be displayed in a domain other than that of a system by using the screen display position deciding section shown in FIG. 27.

The power system screen displaying section 12 reads each window display position information stored in the window display position information memory 29 and displays window display position information in the window in addition to the display of the system diagram shown in FIG. 30. It is noted that the reference numeral (30) denotes parting lines for parting into four elements.

Meanwhile, when there is no display range which allows the window for displaying the equipment in the area on the outside of the display range to be displayed in the partial area, it is possible to display the display scale of the area on the outside of the display range so that it falls within the display range. It is also possible to display the window in the plurality of partial areas when there exist a plurality of areas on the outside of the display range.

While the distribution line Fx to be displayed is displayed in FIG. 30, the distribution line Fx cannot be displayed on one display screen when the display range caused by the scale threshold value is the part surrounded by the dot lines.

However, it is possible to display the equipment in the area on the outside of the display range on the window on the distribution line number to be displayed and to display the window so as not to overlap with the distribution line Fx.

According to this embodiment, the whole distribution line can be displayed steadily within the display screen even when the distribution line required for making reference or control is excluded from the display screen. And, the window can be displayed in the area where there is no problem in terms of the control of the screen related to the distribution line. Therefore, it is possible to understand the whole required distribution line precisely and to improve the controllability.

Figure 32:
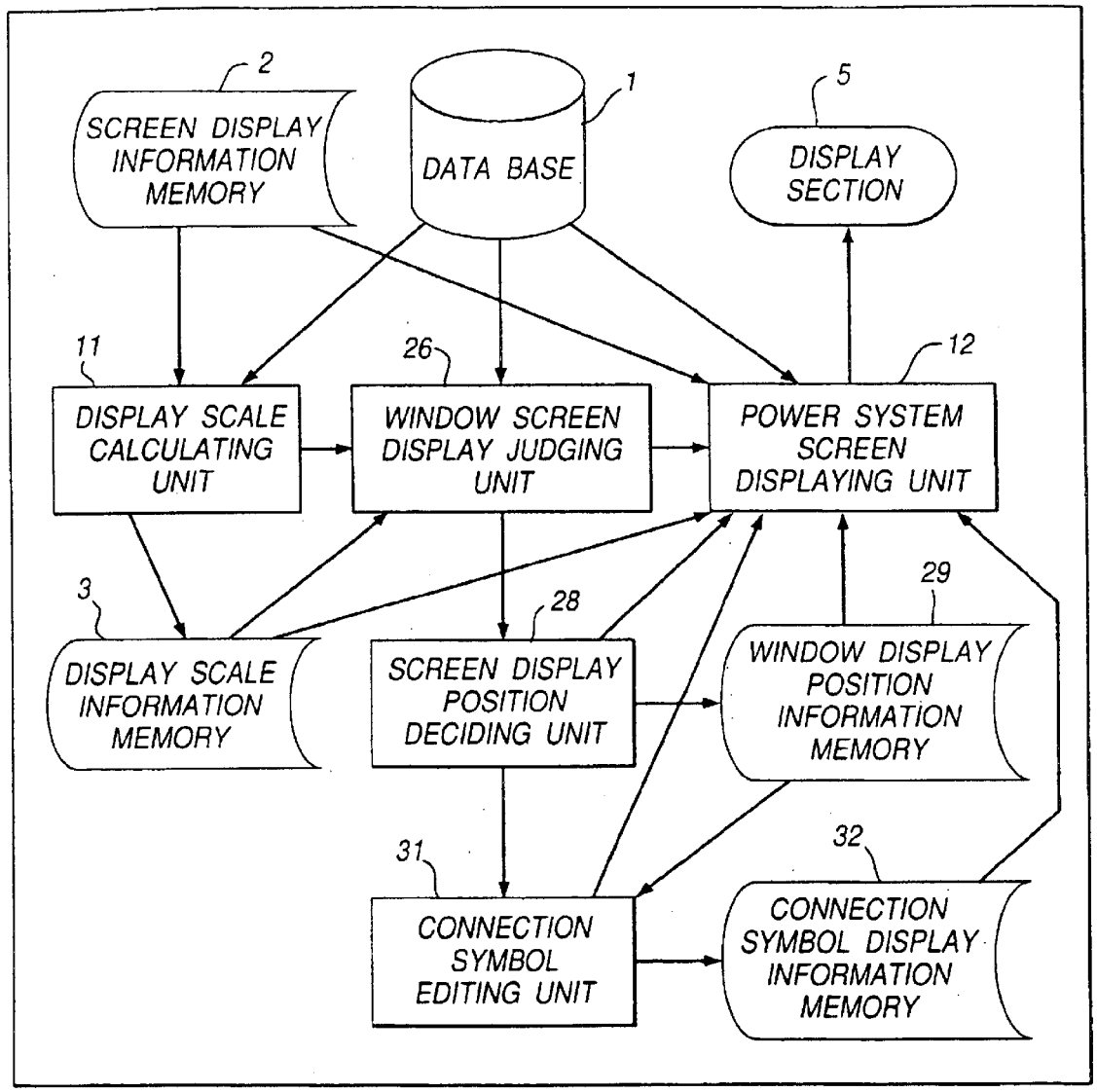
FIG. 32 is a block diagram showing a still another embodiment of a system display apparatus and a storing medium according to the invention.

FIG. 32 is a block diagram showing another embodiment of the system display apparatus according to this invention.

This system display apparatus has a connection symbol editing section 31 for editing connection symbols of distribution lines across the window and a connection symbol display information memory 32 for storing connection symbol display information such as connecting position in addition to elements shown in FIG. 27. It is noted that the window display position information memory 29 may be used instead of the connection symbol display information memory 32.

While an operation of this system display apparatus is basically the same as that shown in FIG. 27, the connection symbol editing section 31 executes a process of editing a connection symbol indicating to which distribution line the equipment excluded from the display range is connected and of displaying executes a process of editing a connection symbol within a window, in displaying information related to the equipment excluded from the display range after judging the display range area by the window screen display judging section 26 and deciding the window screen display position.

The process of the connection symbol editing section 31 will be explained below with reference to FIG. 33.

That is, the connection symbol editing section 31 calculates an intersection of the distribution line (excluded distribution line) straddling to the window screen with the screen display frame (S121). It is the coordinate of the end of the distribution line displayed on the window screen.

Succeedingly, as for a distribution line A, for example, the connection symbol editing section 31 stores a connection symbol A within a display character area in the memory 32 as the connection symbol editing section 31 receives the connection symbol A inputted by the operator (S122).

Still more, the connection symbol editing section 31 calculates display coordinates of the connection symbol to be displayed on the display section 5 and display coordinates of that to be displayed on the window screen and stores them in the screen display position area and the window screen display position in the memory 33 (see FIG. 34)(S123, S124).

These display positions may be calculated readily by obtaining information stored in the memory 29 or information in deciding the screen display position.

When the display position of the connection symbol is decided as described above, the power system screen displaying section 12 selects in the display coordinates of the connection symbol from the memory 32 and displays the connection symbol when the window is displayed.

Figure 35:
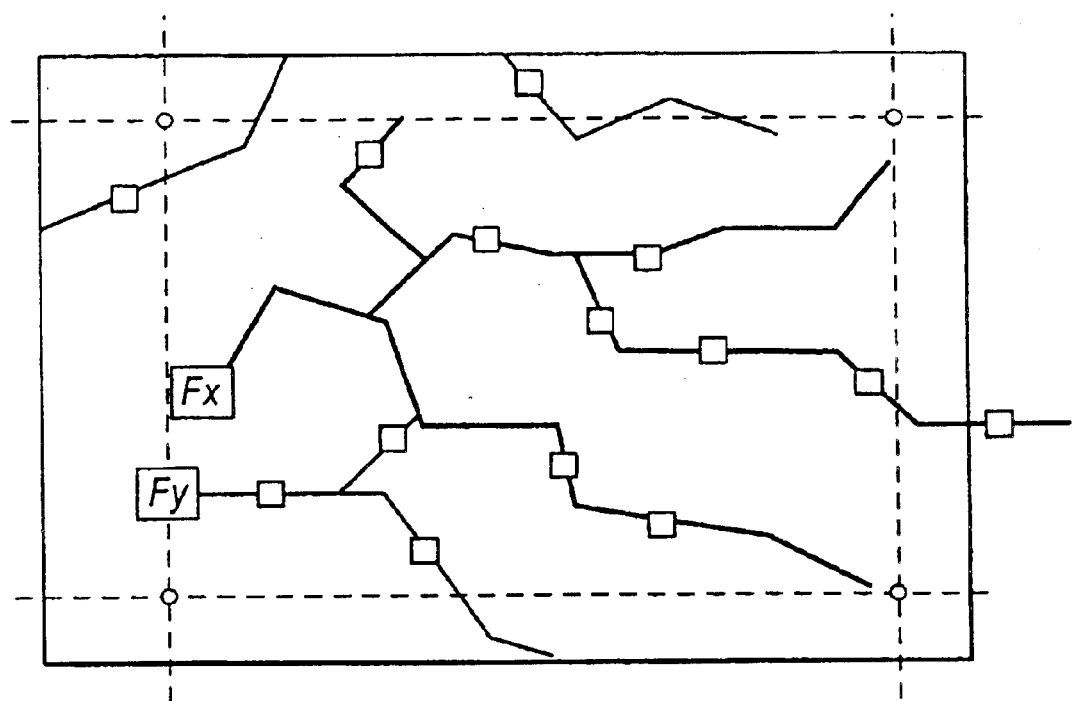
FIG. 35 is a diagram of a display screen in which a distribution line to be displayed is excluded from a display range.
Figure 36:
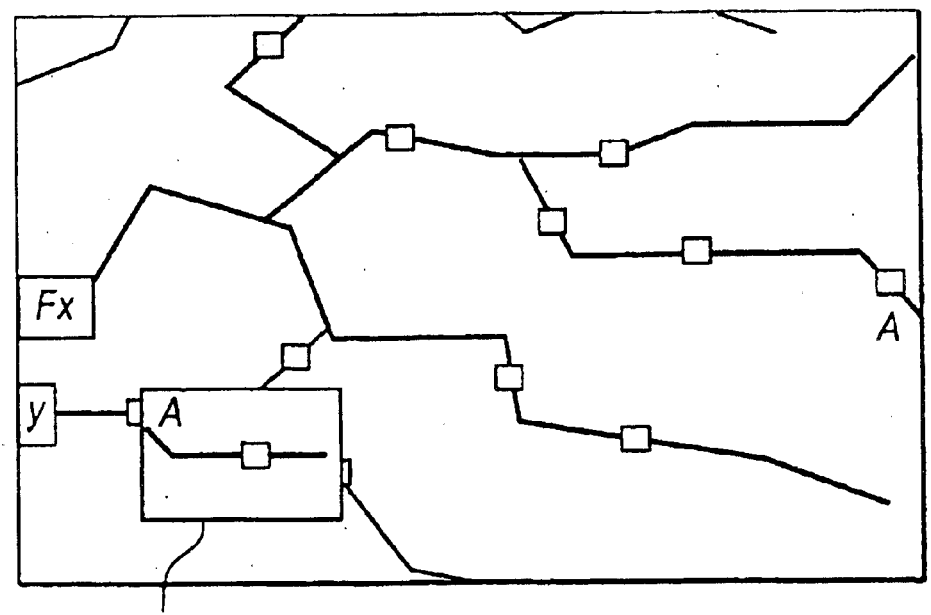
FIG. 36 is a diagram of a display screen in which a distribution line to be displayed and excluded from a range in FIG. 35 is displayed in a window and which is indexed by a symbol indicating a relationship of connection between a display screen and a window screen.

FIG. 35 shows a display screen in which part of the distribution line Fx is excluded from the display range and FIG. 36 shows another display screen in which the connection symbol A is displayed on the excluded display screen and the window screen.

According to this embodiment, the whole distribution line can be displayed steadily within the display screen even if the distribution line required for making reference or control is excluded from the display screen. And, the window can be displayed in the area where there is no problem in controlling the screen related to the distribution line. Therefore, it is possible to understand the whole required distribution line precisely and to understand the distribution line straddling over the window readily by the connection symbol.

It is noted that it is possible to display a connecting section appearing on the display screen and a connecting section appearing within the window by using different colors, instead of the connection symbol, so as to allow the operator to readily understand the connecting part of the equipment displayed on the window.

Figure 37:
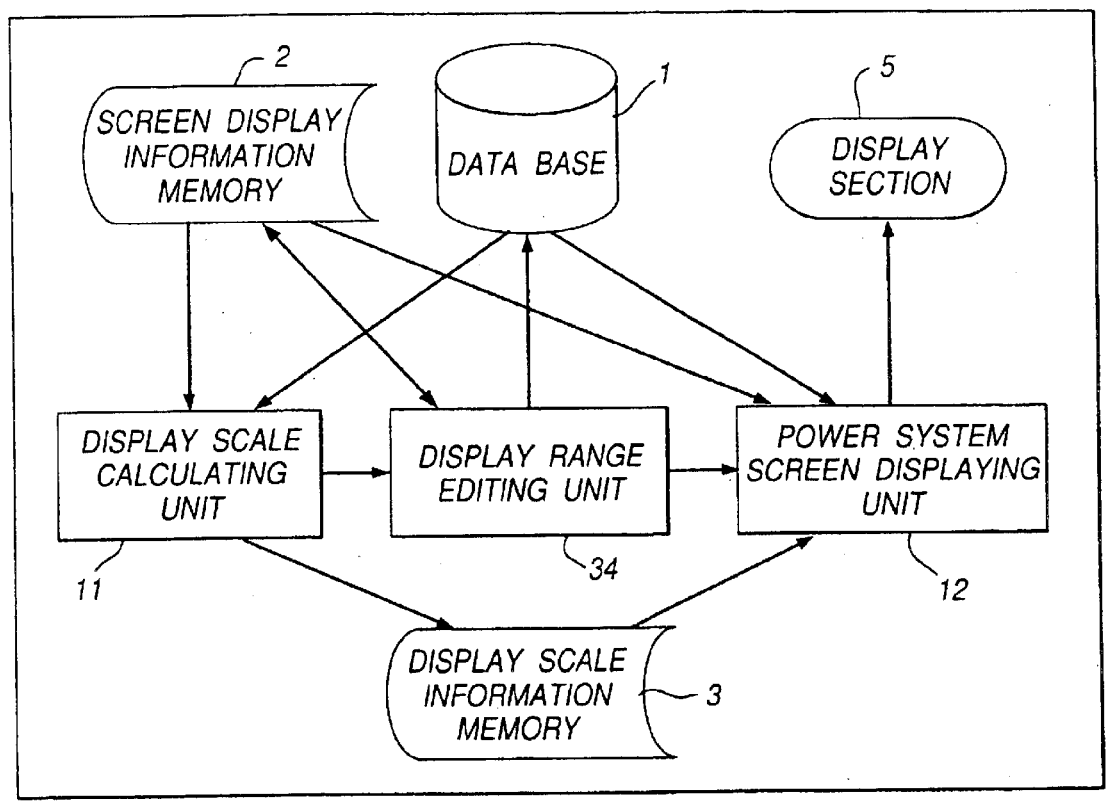
FIG. 37 is a block diagram showing a fifth embodiment of a system display apparatus and a storing medium according to the invention.

FIG. 37 is a block diagram showing a fifth embodiment of the system display apparatus according to this embodiment. It is noted that the elements in the figure which are similar to those in FIG. 1 are denoted by the same reference numerals and an explanation thereof will be omitted here.

This system display apparatus has a display range editing section 34 for judging a display omissible range from the system displayed on the display screen when the display scale calculated by a display scale calculating section 11 exceeds the scale threshold value in addition to a data base 1, a screen display information memory 2, a input section (not shown), a display scale calculating section 11, a display scale information memory 3 for storing the display scale calculated by a display scale calculating section 11, a power system screen displaying section 12 and a display section 5.

While this system display apparatus is basically the same as that shown in FIG. 1, a display range editing section 34 omits part of the system within the display range when the display scale calculated by a display scale calculating section 11 exceeds the scale threshold value, to be able to display the equipment excluded from the display screen within the display screen.

Figure 38:
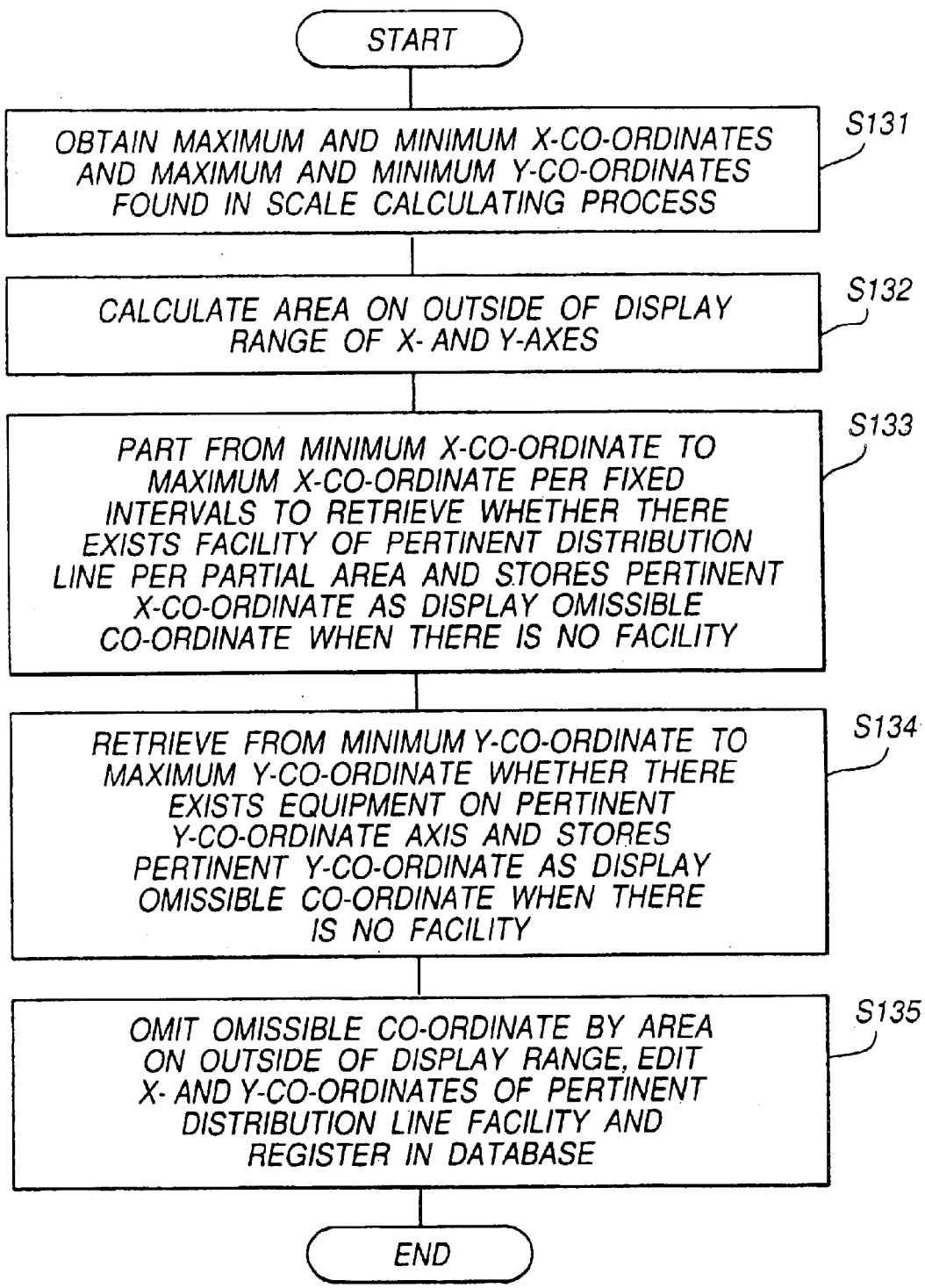
FIG. 38 is a flowchart for explaining an operation of display range editing section shown in FIG. 37.

The process of a display range editing section 34 will be explained below with reference to FIG. 38.

That is, the display range editing section 34 selects the maximum X-coordinate, the minimum X-coordinate, the maximum Y-coordinate and the minimum Y-coordinate of the distribution line detected in the process for calculating the scale from the database 1 (S131) and then calculates an area on the outside of the display range of the X- and Y axes of the distribution line (S132).

After that, the display range editing section 34 divides the display range at predetermined intervals from the minimum X-coordinate to the maximum X-coordinate, retrieves whether or not an equipment of the distribution line exists per partial area, and when there is no equipment therein, stores the X-coordinate as a display omissible coordinate (S133).

It is noted that because there exist elements for displaying symbols before and after the coordinate of the equipment, the display range editing section 34 judges it to be omissible coordinate under the condition that neither equipment nor equipment exists before and after (fixed value) the X-coordinate even when there exists neither equipment nor equipment as a result of the retrieval.

In the same manner, the display range editing section 34 retrieves from the minimum Y-coordinate to the maximum Y-coordinate whether or not an equipment exists in the Y-coordinate axes and stores that Y-coordinate as a display omissible coordinate when there exists neither equipment nor equipment (S134).

Then, the display range editing section 34 omits the omissible coordinate by the area on the outside of the display range, edits the X- and Y-coordinates of the equipment of the distribution line again, stores the coordinate data of those equipment in the database 1 (S135) and displays them on the display section 5 by the power, system screen displaying section 12 as described before.

Figure 39:
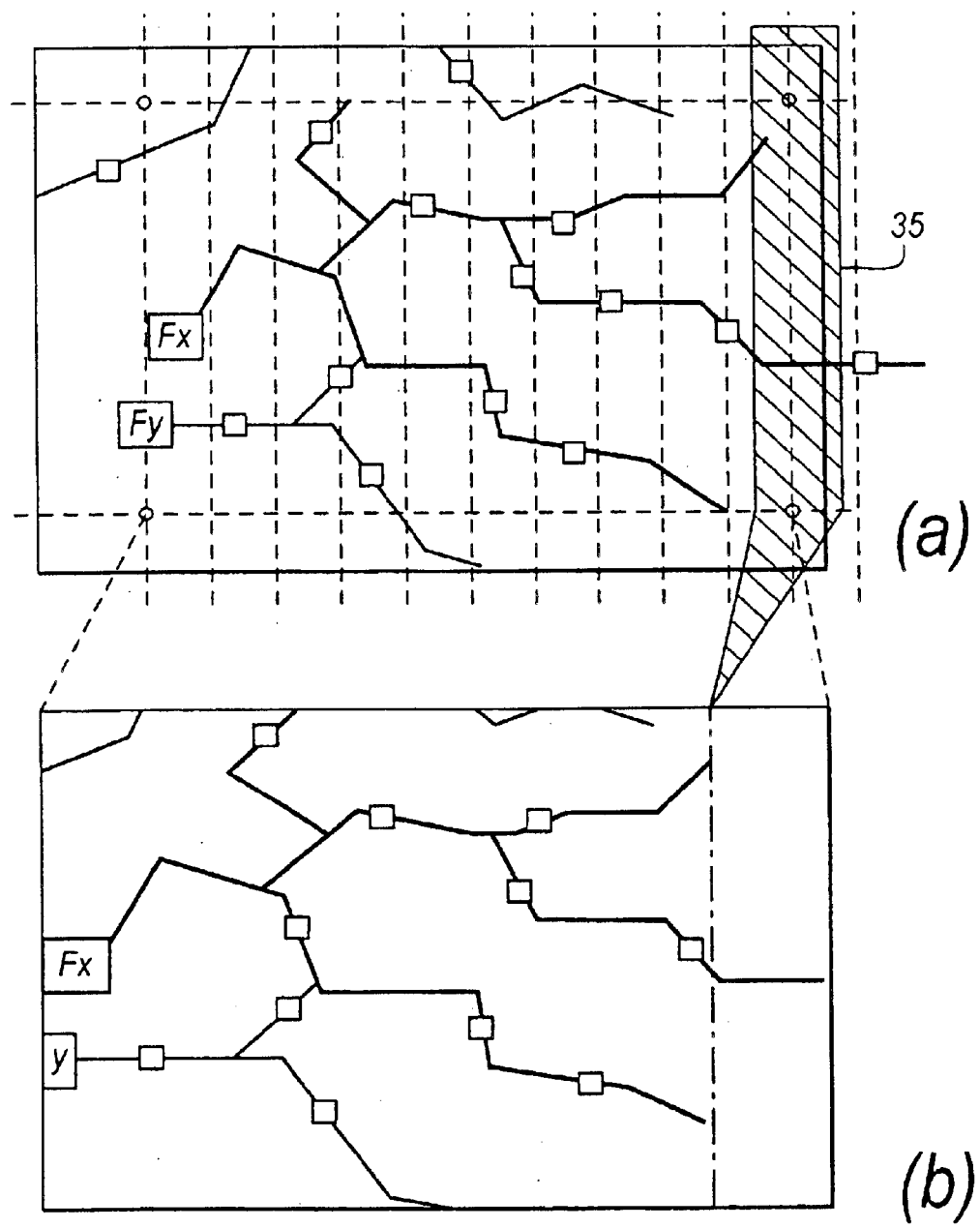
FIG. 39 is a diagram of a system display screen in displaying an excluded part of a system within a display range by detecting a display omitting range from a distribution line to be displayed.

FIG. 39a shows a display screen showing the state in which the equipment of the distribution line at the part exceeding the display range surrounded by the four rectangular coordinates cannot be displayed on one display screen when the distribution line Fx is displayed with the predetermined display scale, and FIG. 39b shows a display screen in which a dotted area 35 is omitted in the system display screen of FIG. 39a.

According to this embodiment, when the system diagram cannot be displayed within one display screen, the whole system required to make reference or control can be displayed on one display screen, and it is possible to understand the whole system readily without changing the contents of display every time by detecting and omit the part which needs to be less displayed on the screen.

Figure 40:
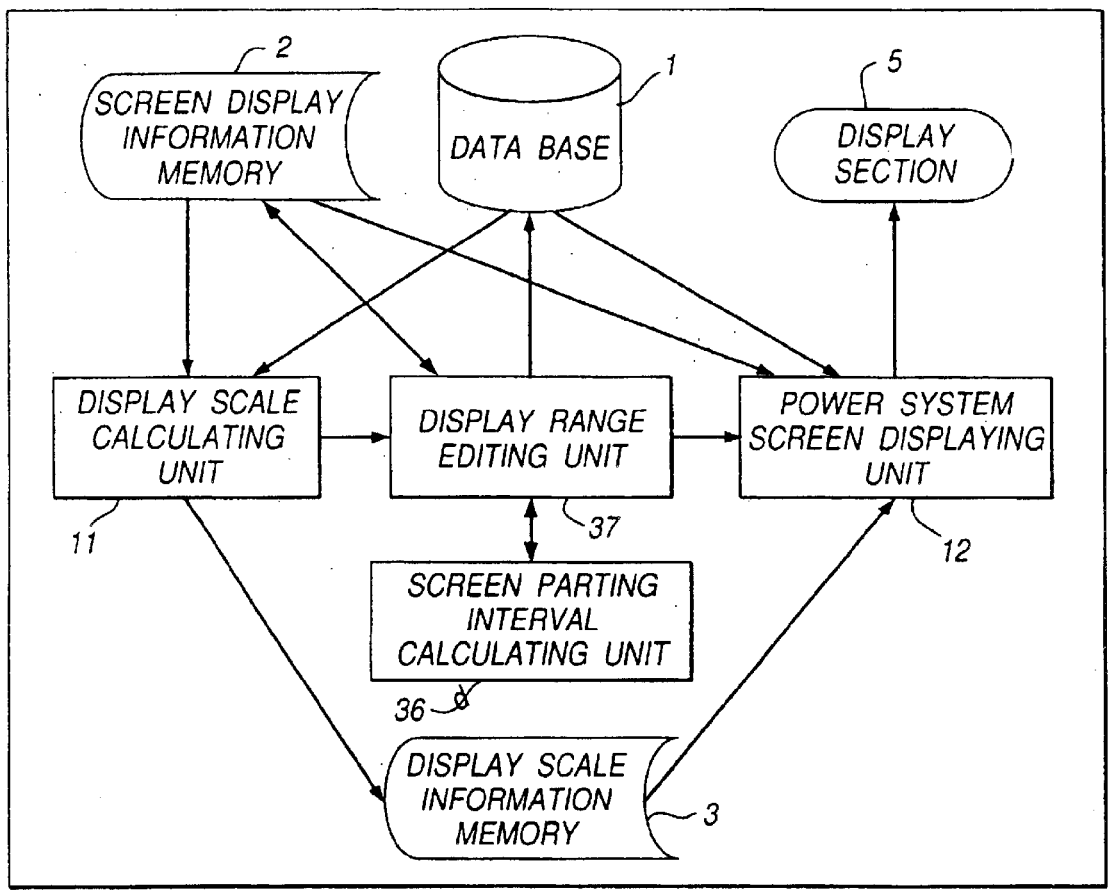
FIG. 40 is a block diagram showing another embodiment of a system display apparatus and a storing medium according to the invention.

FIG. 40 is a block diagram showing another embodiment of a system display apparatus according to this invention.

This system display apparatus has a screen parting interval calculating section 36 anew to elements of the apparatus shown in FIG. 37 to find a minimum value in a distance between symbols in the X-direction and Y-direction coordinates and to omit the part between the symbols by setting the minimum value as the parting interval.

Figure 41:
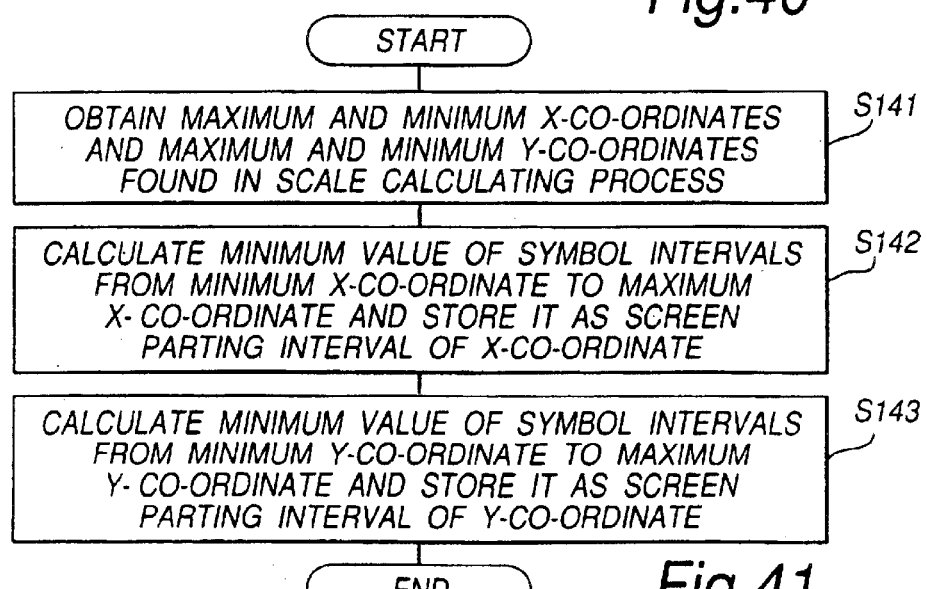
FIG. 41 is a flowchart for explaining an operation of screen dividing interval calculating section shown in FIG. 40.

Specifically, the screen parting interval calculating section 36 detects the minimum value between the symbols by calculating the distances between the respective symbols one after another from the side of the minimum X-coordinate to the side of the maximum X-coordinate after obtaining the maximum X-coordinate, the minimum X-coordinate, the maximum Y-coordinate and the minimum Y-coordinate detected in the process for calculating the scale (S141) and obtains the minimum value as the screen parting interval on the side of the X-coordinate so as to be able to provide to the display range editing section 34 as shown in FIG. 41 (S142).

Similarly, the screen parting interval calculating section 36 detects the minimum value between the symbols by calculating the distances between the respective symbols one after another from the side of the minimum Y-coordinate to the side of the maximum Y-coordinate and obtains the minimum value as the screen parting interval on the side of the Y-coordinate so as to be able to provide to the display range editing section 34 (S143).

According to this embodiment, the equipment of the system excluded with the display scale can be displayed within the display range while omitting the sections between the symbols in the X- and Y-directions by using the minimum value detected by the screen parting interval calculating section 36.

Figure 42:
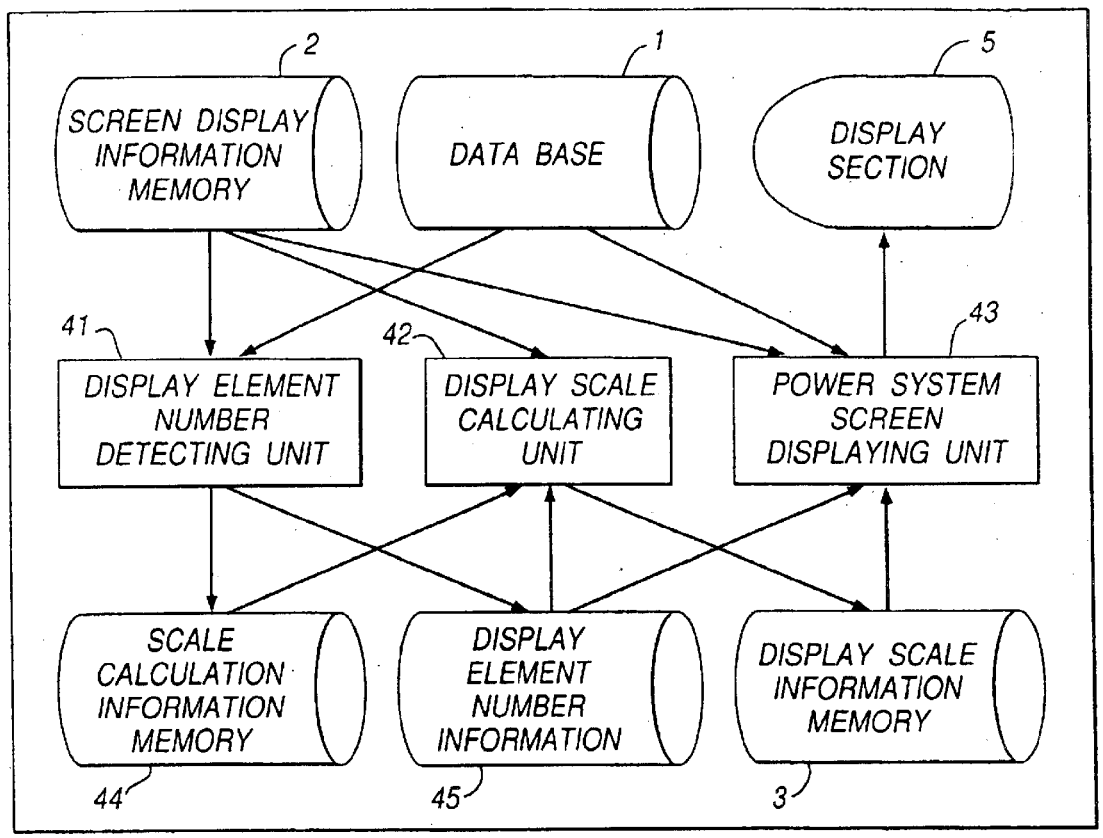
FIG. 42 is a block diagram showing a sixth embodiment of a system display apparatus and a storing medium according to the invention.

FIG. 42 is a block diagram showing a sixth embodiment of a system display apparatus according to this invention. It is noted that the elements in the figure which are similar to those in FIG. 1 are denoted by the same reference numerals and an explanation thereof will be omitted here.

Figure 44:
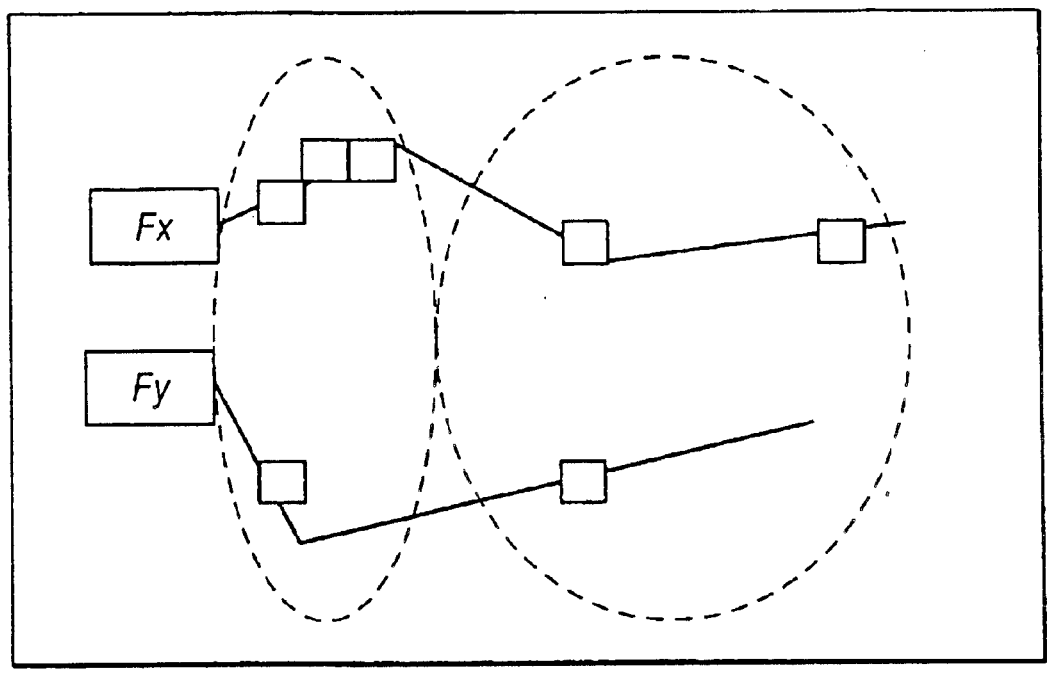
FIG. 44 is a diagram showing a display screen showing a state in which equipments are crowded.
Figure 45:
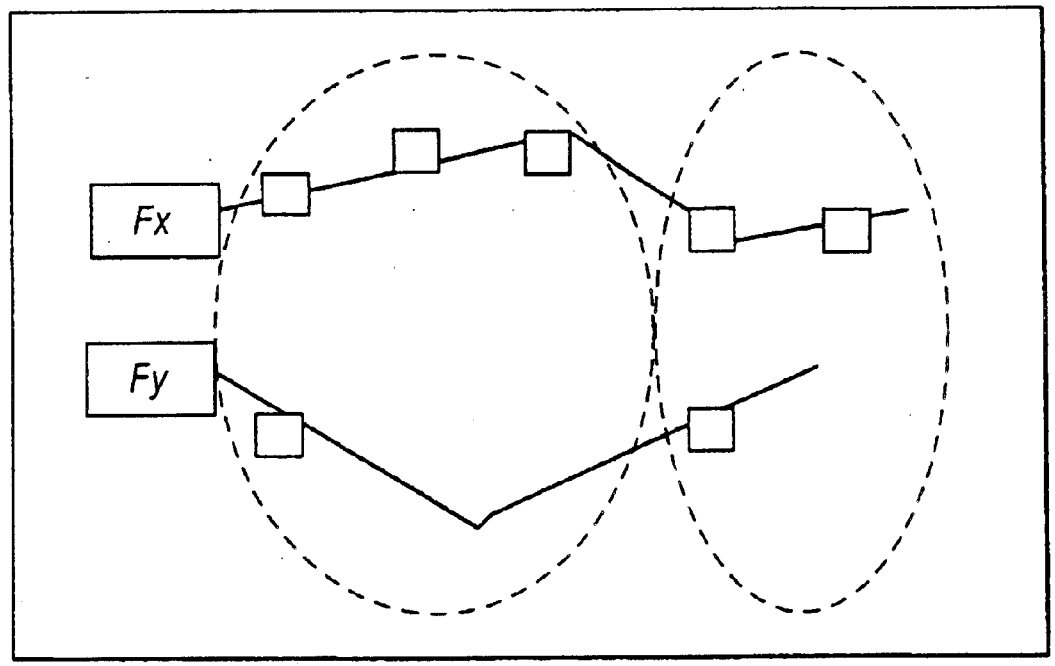
FIG. 45 is a diagram of the display screen in which a part of the crowded equipment shown in FIG. 44 is enlarged.

This system display apparatus has a display element a number detecting section 41, a display scale calculating section 42, a system screen displaying section 43, a scale calculation information memory 44 for storing a display screen parting number (e.g., a parting number 10) and data of non-displayed width of up and down and right and left of the display screen in advance and a display element number information memory 45 in addition to a data base 1, a screen display information memory 2, a display scale information memory 3, a display section 5 and the input section (not shown) to display a crowded part largely as shown in FIG. 45 when equipment of a system to be displayed on the display screen are crowded as shown in FIG. 44.

Figure 43:
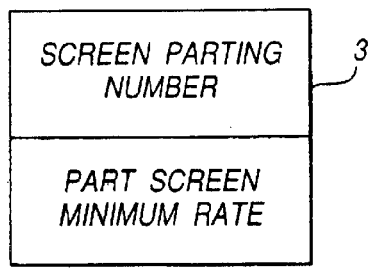
FIG. 43 is a table showing a data array of a scale calculating information memory shown in FIG. 42.
Figures 46, 47:
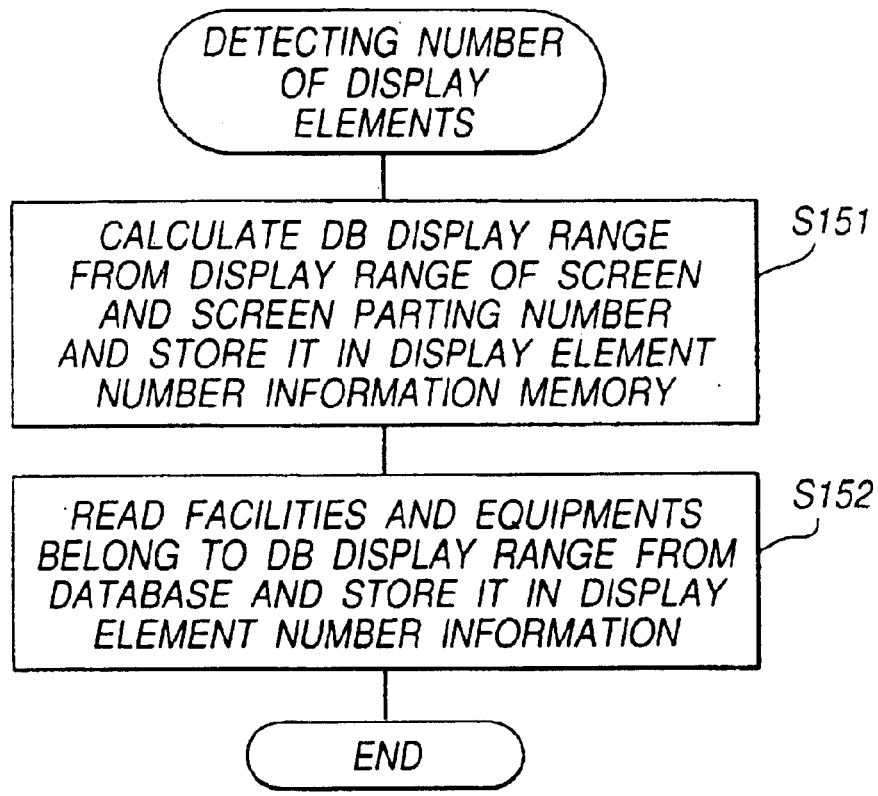
FIG. 46 is a flowchart for explaining an operation of display element number detecting section shown in FIG. 42.
FIG. 47 is a table showing a data array structure of a display element number information memory shown in FIG. 42.

The display element number detecting section 41 calculates DB (database) display range from the display range in the screen display information memory 2 and the screen parting number in the scale calculation information memory 44 (see FIG. 43) and stores it in the corresponding DB display range in the display element number information memory 45 (see FIG. 47) as shown in FIG. 46 (S151).

A specific example of this calculation will be explained. When coordinates of a starting point of the display range are (x1, y1), coordinates of an ending point are (x2, y2) and the screen parting number is a1, the coordinates of the n-th DB display range turn out as follows when counted as 1, 2 and 3 from the left of the display range:

DB display range $nx1 = x1 + (x2-x1)/a1*(n-1)$

DB display range $nx2 = x1 + (x2-x1)/a1*n$

DB display range $ny1 = y1$

DB display range $ny2 = y2$

The display element number detecting section repeats above calculation until when the DB display range n becomes $(x2-x1)/a1$.

In addition to that, the coordinate of the DB display range n may be set as follows;

DB display range $nx1 = x1$

DB display range $nx2 = x2$

DB display range $ny1 = y1 + (y2-y1)/a1*(n-1)$

DB display range $ny2 = y1 + (y2-y1)/a1*n$

After finishing the process in Step S151 as described above, the display element number detecting section 41 reads the equipment belonging to the DB display range n from the database 1 and executes the process for storing in a number elements n displayed within the partial range in the memory 45 (S152). The display element number detecting section 41 repeats this process by a number of partial block display ranges.

Next, the process of the display scale calculating section 42 will be explained below with reference to FIG. 48.

After calculating the minimum display range based on the following equation by using the display range in the screen display information memory 2 and the screen parting number and the minimum rate of intra-part screen in the scale calculation information memory 44 (see FIG. 43) (S161), the display scale calculating section 42 detects the total from 1 to n of the number of elements displayed within the partial range in the display element number information memory 45, i.e., the total display element number (S162).

minimum display range=(display range/screen parting number)*(part screen minimum rate)

After that, the display scale calculating section 42 detects the partial display range n in the display scale information memory 3 shown in FIG. 49 from the display range in the screen display information memory 2, the total display element number detected in Step 162 and the number of elements n displayed within the partial range in the display element number information memory 45 (see FIG. 47) (S164).

For instance, when the coordinates of a starting point of the display range are (x1, y1) and the coordinates of a starting point are (x2, y2);

display range xw=x2−x1 display range yw=y2−y1 partial display range nxw=(display range xw)*(number of elements n displayed within partial range/total number of display elements)

partial display range nyw=display range yw.

In addition to that, it is possible to set as follows:

display range xw=x2−x1 display range yw=y2−y1 partial display range nxw=display range xw partial display range nyw=(display range yw)*(number of elements n displayed within partial range/total number of display elements)

Further, the display scale calculating section 42 compares the minimum display range detected in Step S161 with the partial display range n detected in Step S164 and sets the minimum display range as the partial display range n when the partial display range n is small (S165).

Then, the display scale calculating section 42 detects the display scale n within the partial range in the display scale information memory 3 (see FIG. 49) from the display scale in the screen display information memory 2, the DB display range n in the display element number information memory 45 in FIG. 47 and the partial display range n detected in Step S165 (S166).

display scale n within partial range=display scale*partial display range n/DB display range n The display scale calculating section 42 executes the processes from Steps S164 to S166 by the number of the DB display ranges.

The process of the system screen displaying section 43 will be explained further with reference to FIG. 50.

The system screen displaying section 43 displays the DB display range n in the display element number information memory 45 (see FIG. 47) by using the display scale n within the partial range in the display scale information memory 3 with regard to displaying the system in the partial display range n stored in the display scale information memory (see FIG. 49) within the display screen of the display section 5 (S172).

The system screen displaying section 43 executes such system display process repeatedly by the number of partial display ranges (S171, S172).

While FIG. 44 shows a display screen of a power system diagram, it is difficult to select and control a display element therein by using a mouse when the display elements such as switchgears provided on the distribution line are crowded in the urban area, for example.

Then, it is possible to largely display the part where the display elements are crowded as shown in FIG. 45 and to select the switch or the like readily by detecting the display scale per partial display range while taking the part in which the display elements are crowded like the urban area part into account.

According to this embodiment, the visibility can be improved and the switch or the like in the crowded part can be controlled readily without manipulating the apparatus by changing the magnification of the power system diagram, for example, by largely displaying the part which is crowded with the switchgear and various information like the urban area and by reducing the part which is less crowded with switchgears and various information such as a local area.

Figure 51:
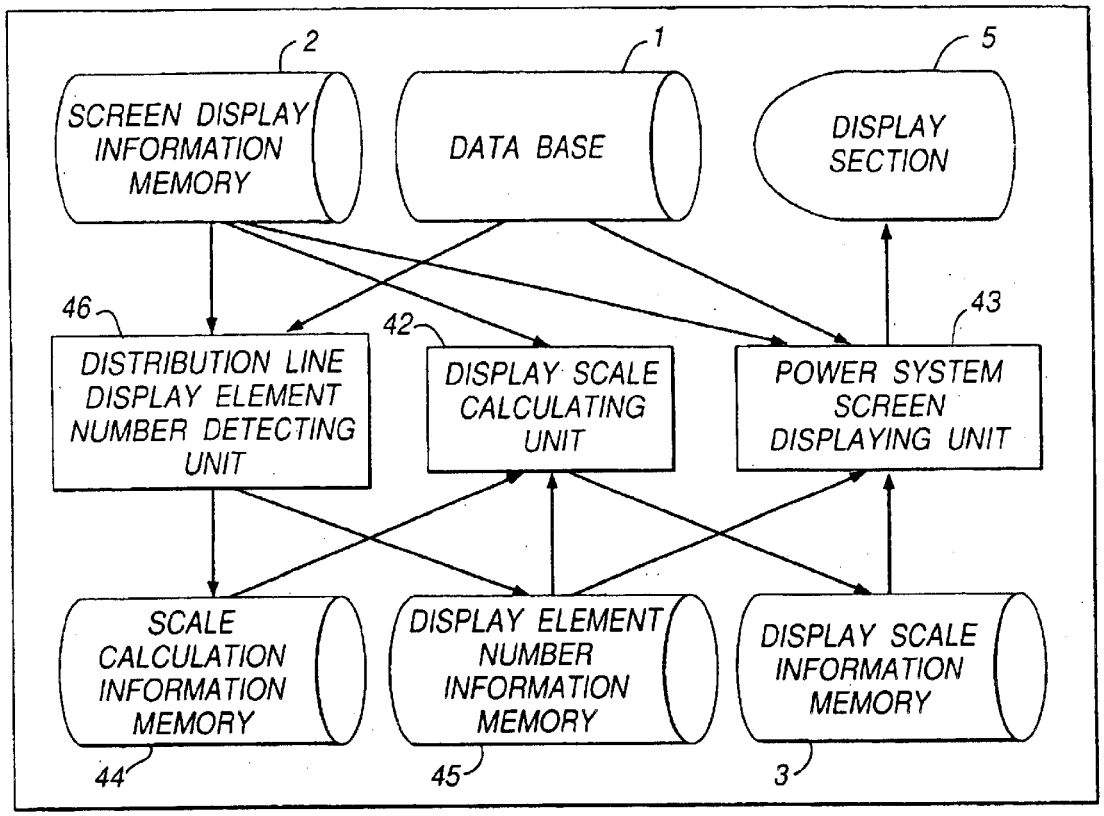
FIG. 51 is a block diagram showing another embodiment of a system display apparatus and a storing medium according to the invention.

FIG. 51 is a block diagram showing another embodiment of a system display apparatus according to the invention. It is noted that the element in the figure are similar to those in FIG. 42 are denoted by the same reference numerals and an explanation thereof will be omitted here.

This system display apparatus has a data base 1, a screen display information memory 2, a display scale information memory 3, a display section 5, a input section (not shown), a display scale calculating section 42, a power system screen displaying section 43, a scale calculation information memory 44 and a display element number information memory 45 similarly to one shown in FIG. 42.

It has a distribution line display element number detecting section 46 instead of the display element number detecting section 41 to largely display only the part where equipment provided on the distribution line are crowded.

Figure 52:
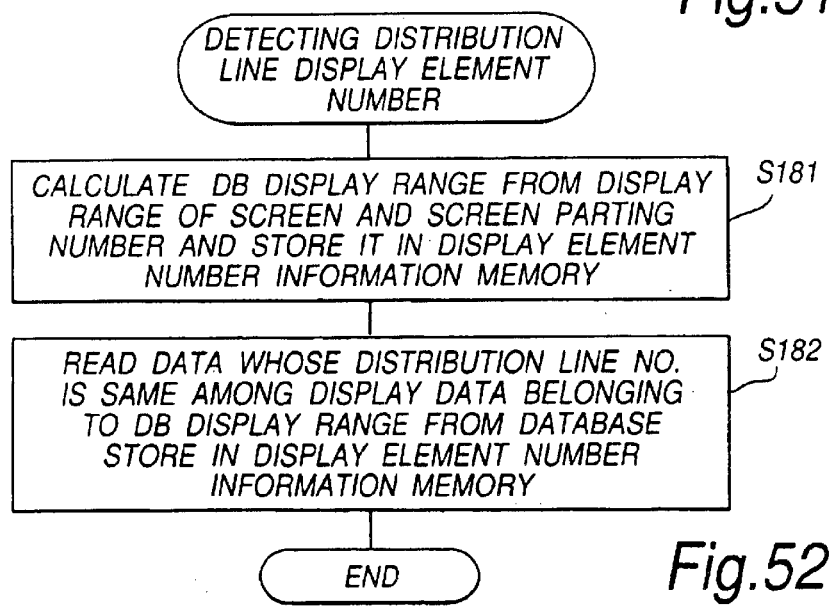
FIG. 52 is a flowchart for explaining an operation of the distribution line display element number detecting section shown in FIG. 51.

The distribution line display element number detecting section 46 calculates the DB display range from the display range in the screen display information memory 2 and the screen parting number stored in the scale calculation information memory 44 (see FIG. 43) and stores it in the pertinent DB display range in the display element number information memory 45 (see FIG. 47) (S181) as shown in FIG. 52.

After that, the number of the equipment to meet the following relation will be counted in the distribution line display element number detecting section 46.

<RELATION> a distribution line number in the screen display information memory 2 (see FIG. 89) is the same as a distribution line number in the database 1 (see FIG. 88).

And, the number of the equipment to meet the above-relation is stored as a partial range display. element number n in the display element number information memory 45 (see FIG. 47) (S182). The distribution line display element number detecting section 46 executes this process repeatedly by the number of DB display ranges.

After calculating the partial range display element number with respect to the DB display ranges 1, 2, ..., n, the display scale calculating section 42 and the power system screen displaying section 43 are executed in the same manner with that shown in FIG. 42.

Figure 53:
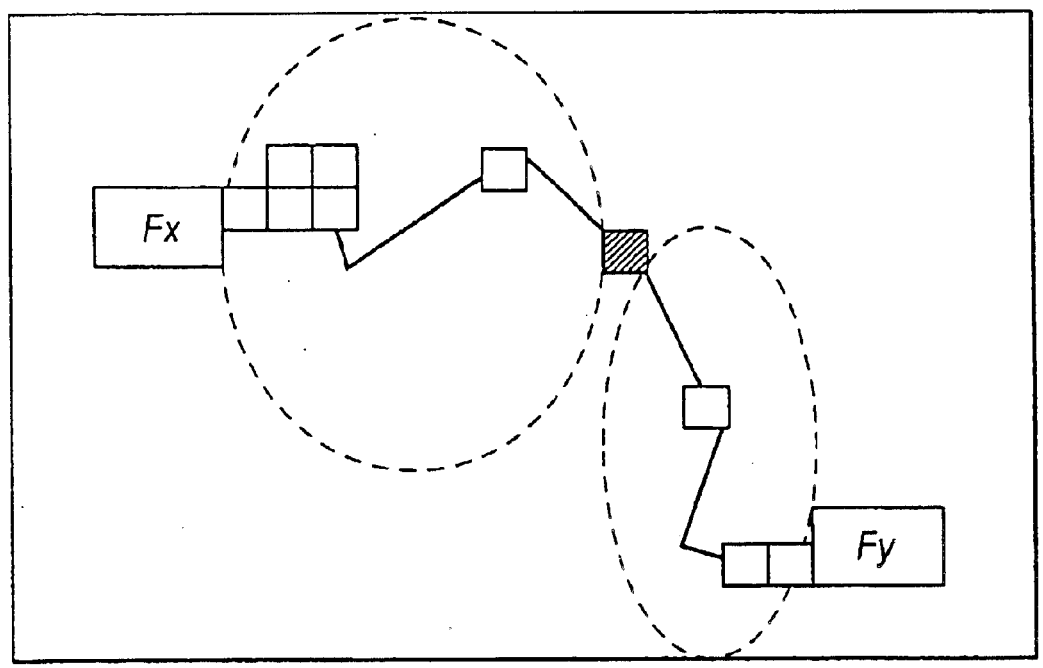
FIG. 53 is a diagram of the display screen showing a state in which equipments are crowded.
Figure 54:
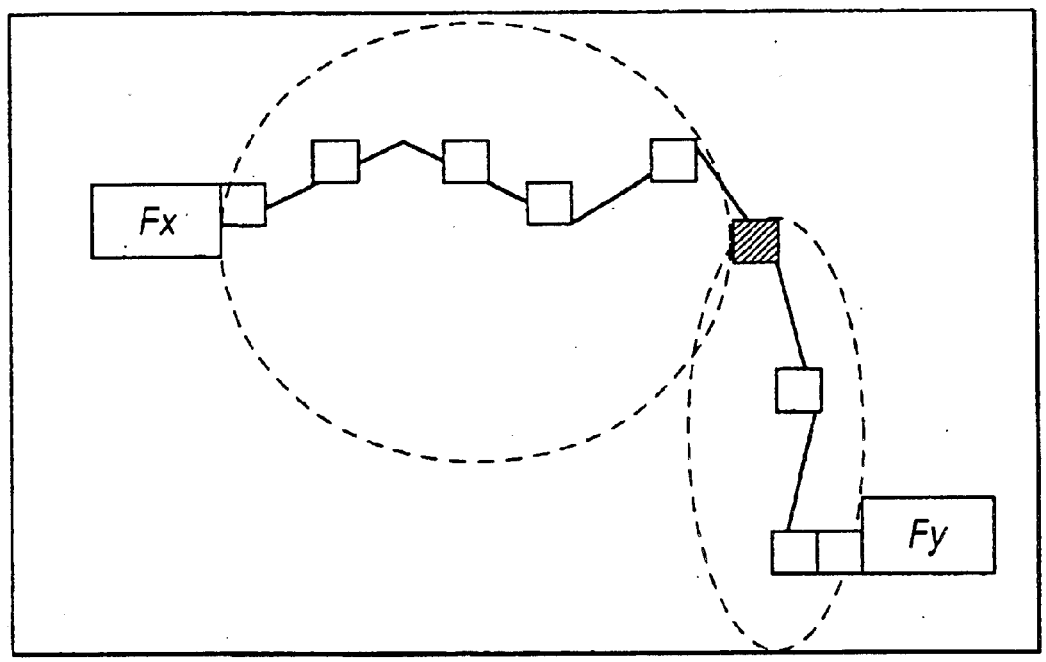
FIG. 54 is a diagram of the display screen partly magnifying and displaying a crowded equipment shown in FIG. 53.

As a result, only the specific section in which the equipment are crowded in the display screen of the power system diagram in which the distribution line Fx is displayed as shown in FIG. 53 is enlarged as shown in FIG. 54, so that it becomes easy to select or control the equipment by the mouse or the like.

According to this embodiment, as the display scale on the specific part can be changed in accordance with the state of the specific part without changing the magnification of the power system diagram, the equipment, such as a switchgear, or various display information in the crowded part can be readily controlled with the improvement of the visibility. For example, if the specific part (like the urban area) is so crowded with the equipment, such as a switchgear, or various display information, the display scale on the specific part can be magnified. On the other hand, the specific part (like the local area) is less crowded with the equipment, such as a switchgear, or various display information, the display scale on the specific part can be reduced.

Figures 55, 56:
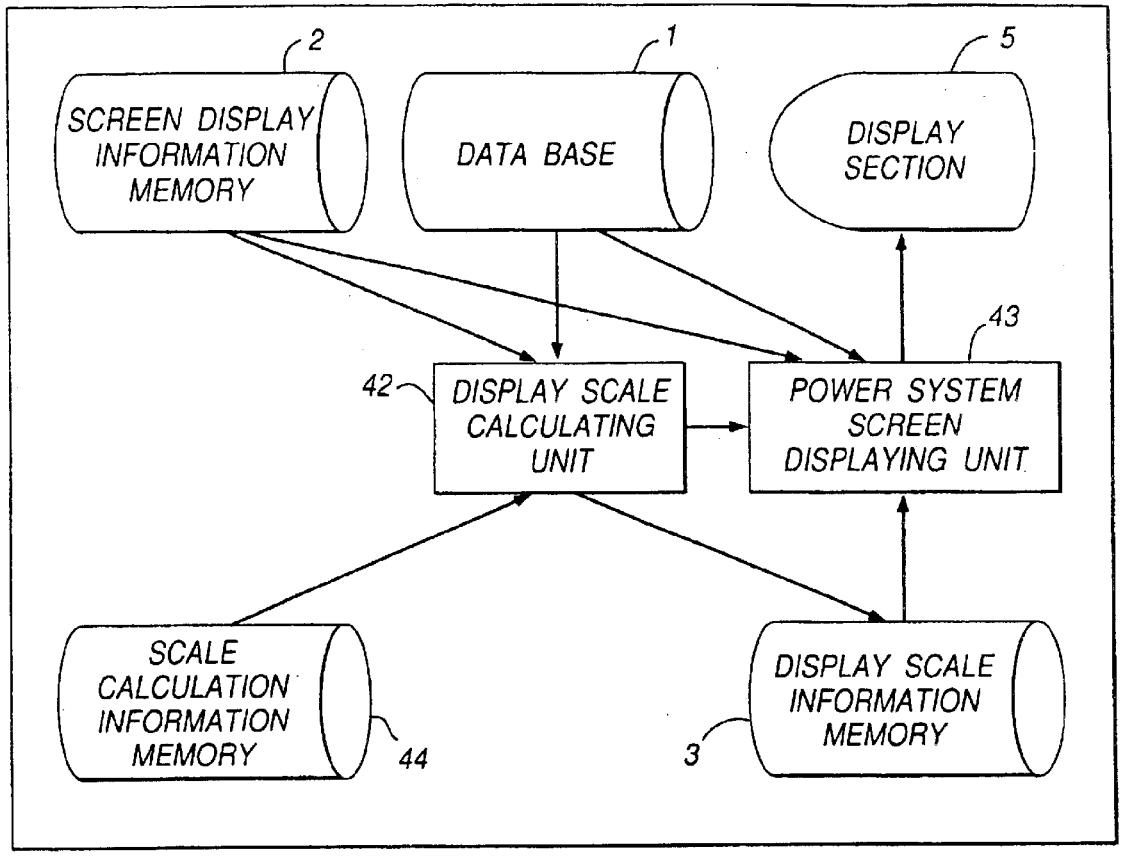
FIG. 55 is a block diagram showing another embodiment of a system display apparatus and a storing medium according to the invention.
FIG. 56 is a table showing a data array structure of a display scale information memory shown in FIG. 55.

FIG. 55 is a block diagram showing another embodiment of a system display apparatus according to this invention. It is noted that the elements in the figure which are similar to those in FIG. 42 are denoted by the same reference numerals and an explanation thereof will be omitted here.

This system display apparatus is arranged so as to eliminate a display element number detecting section 41 and a display element number information memory 45 from elements shown in FIG. 42 and such that the display scale calculating section 42 executes a part of the processes of the display element number detecting section 41 and part of information (DB display range) to be stored in the display element number information memory 45 in FIG. 42 is stored in the display scale information memory 3 as shown in FIG. 56.

Figures 57, 58:
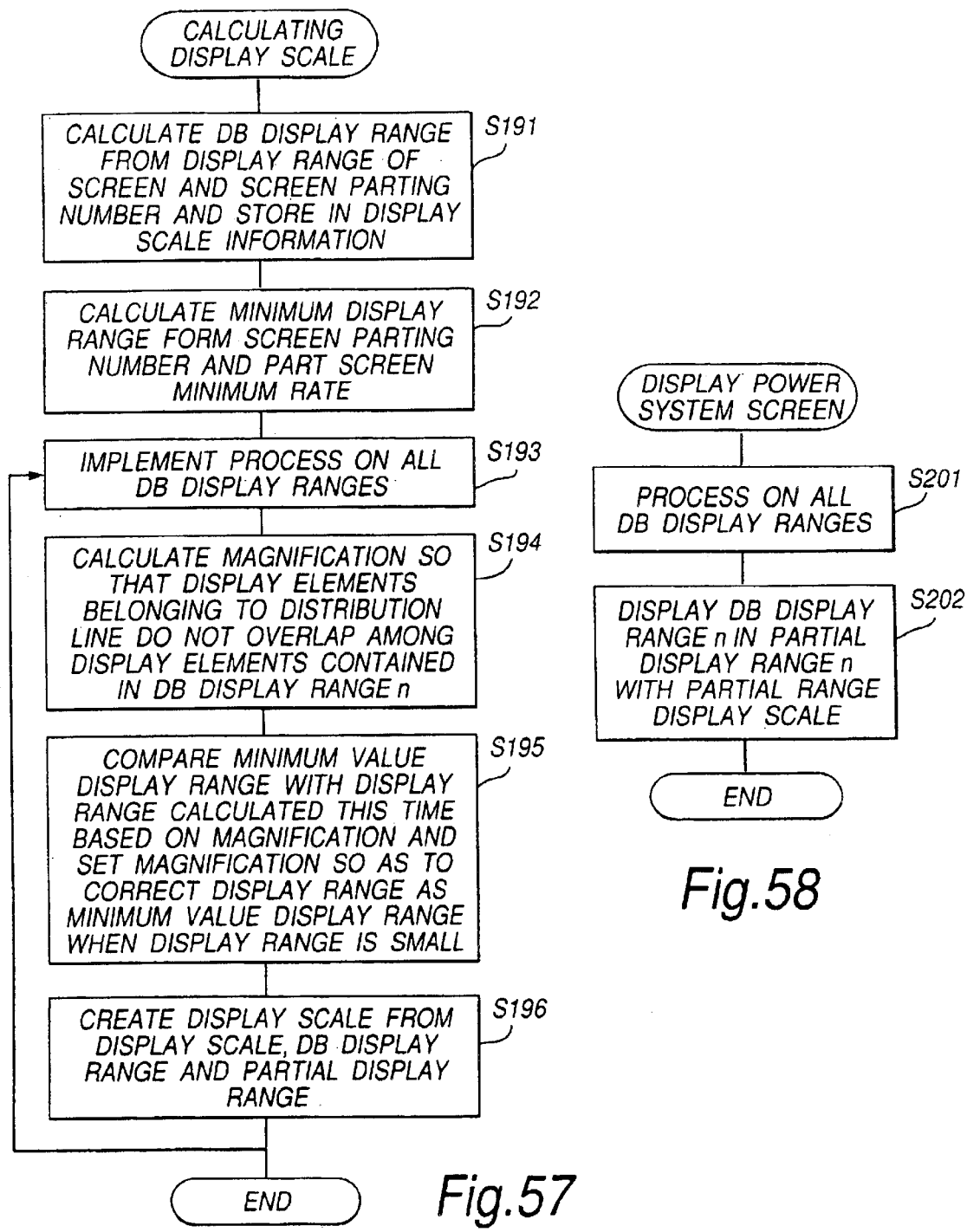
FIG. 57 is a flowchart for explaining an operation of display scale calculating section shown in FIG. 55.
FIG. 58 is a flowchart for explaining an operation of power system screen displaying section shown in FIG. 55.

The process of the display scale calculating section 42 will be explained at first with reference to FIG. 57.

The display scale calculating section 42 calculates the DB display range from the display range in the screen display information memory 2 and the screen parting number stored in the scale calculation information memory 44 (see FIG. 43) and stores it in the DB display range area of the display scale information memory 3, not that of the display element number information memory 45 (S191).

For instance, when the coordinates of the starting point of the display range are (x1, y1), the coordinates of the ending point are (x2, y2) and the screen parting number is a1, the coordinates of the DB display range n turn out as follows:

$DB$ display range $nx1=x1+(x2-x1)/a1*(n-1)$ $DB$ display range $nx2=x1+(x2-x1)/a1*n$ $DB$ display range $ny1=y1$ $DB$ display range $ny2=y2$ The display scale calculating section 42 executes the above calculations repeatedly until when the DB display range n becomes $(x2-x1)/a1$. After that, it calculates the minimum display range as follows from the display range in the screen display information memory 2, the screen parting number in the scale calculation information memory 44 (see FIG. 43) and the intra-part screen minimum rate (S192).

minimum display range=display range/screen parting number*intra-part screen minimum rate Further, the display scale calculating section 42 calculates magnification so that display elements belonging to a distribution line whose distribution line number in the screen display information memory 2 is the same as the distribution line number in the database 1 do not overlap among the equipment belonging to the DB display range n detected from the database 1 in Step S191.

The display scale calculating section 42 then calculates a display range in which they can be displayed in the maximum size with that magnification and stores it in the partial display range n (S194). Succeedingly, the display scale calculating section 42 compares the minimum display range detected in Step S192 with the partial display range n detected in Step S194 and sets the minimum display range as the partial display range n when the partial display range n is smaller (S195).

Further, the display scale calculating section 42 detects a display scale n within the partial range to be stored in the display scale information memory 3 from the display scale in the screen display information memory 2, the DB display range n in the display scale information memory 3 and the partial display range n detected in Step S195 (S196).

Partial range display scale $n$=(display scale partial display range $n$)/(DB display range $n$)

The display scale calculating section 42 executes the series of processes S194 through S196 repeatedly by the number of display ranges (S193).

Next, the process of the power system screen displaying section 43 will be explained with reference to FIG. 58.

The power system screen displaying section 43 displays the DB display range n in the memory 3 in the part of the partial display range n of the display scale information memory 3 among the display screen of the display section 5 by using the display scale n within the partial range (S202). The power system screen displaying section 43 executes it repeatedly by the number of partial display ranges (S201).

Figure 59:
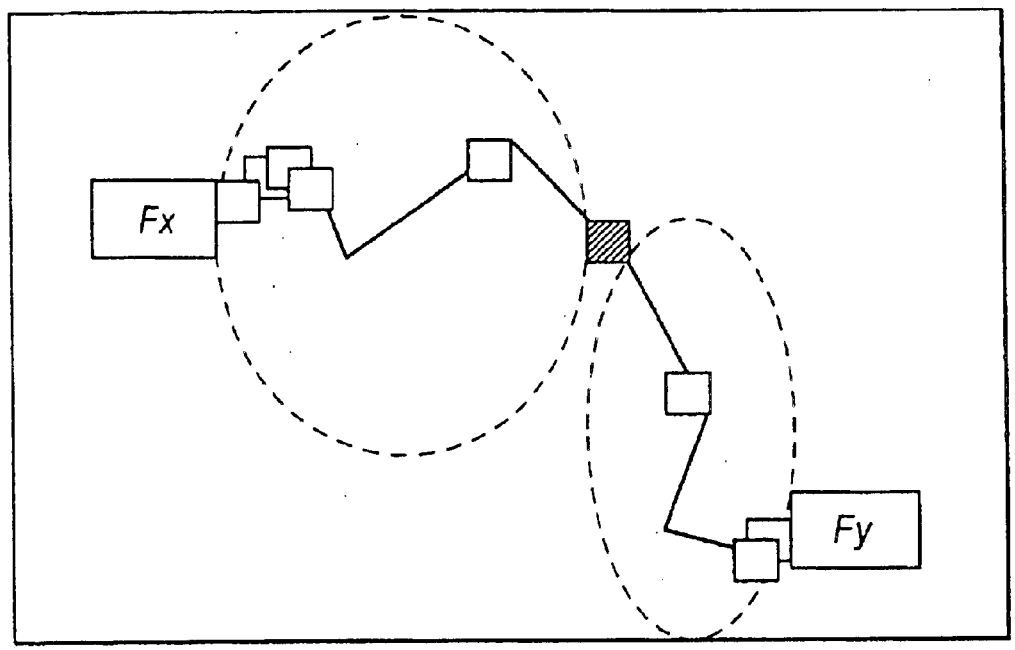
FIG. 59 is a diagram of the display screen showing a state in which equipments are crowded.
Figure 60:
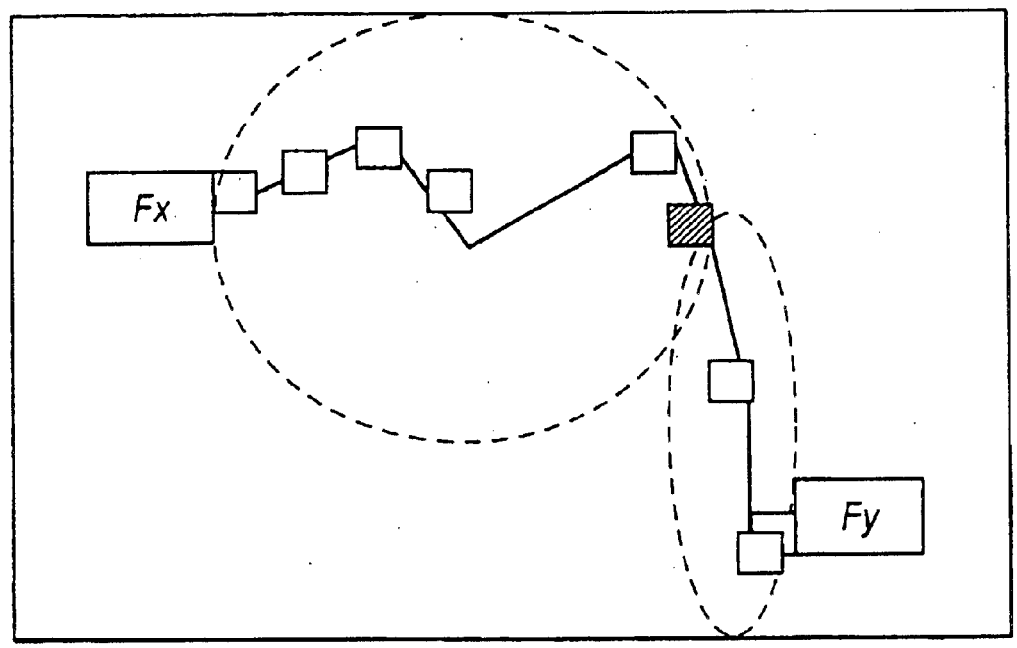
FIG. 60 is a diagram of the display screen in which a part of crowded equipments shown in FIG. 59 are magnified.

As a result, the display screen of the power system diagram of the distribution line Fx as shown in FIG. 59 is expanded centering on the equipment belonging to the distribution line Fx so that the display elements do not overlap and is displayed as shown in FIG. 60 regardless of the number of elements in the specific section in which the equipment are crowded. Accordingly, it becomes easy to select and control the equipment by the mouse.

According to this embodiment, as the display scale on the specific part can be changed in accordance with the state of the specific part without changing the magnification of the power system diagram, the equipment, such as a switchgear, or various display information in the crowded part can be readily controlled with the improvement of the visibility. For example, if the specific part (like the urban area) is so crowded with the equipment, such as a switchgear, or various display information, the display scale on the specific part can be magnified. On the other hand, the specific part (like the local area) is so crowded with the equipment, such as a switchgear, or various display information, the display scale on the specific part can be reduced.

Figure 61:
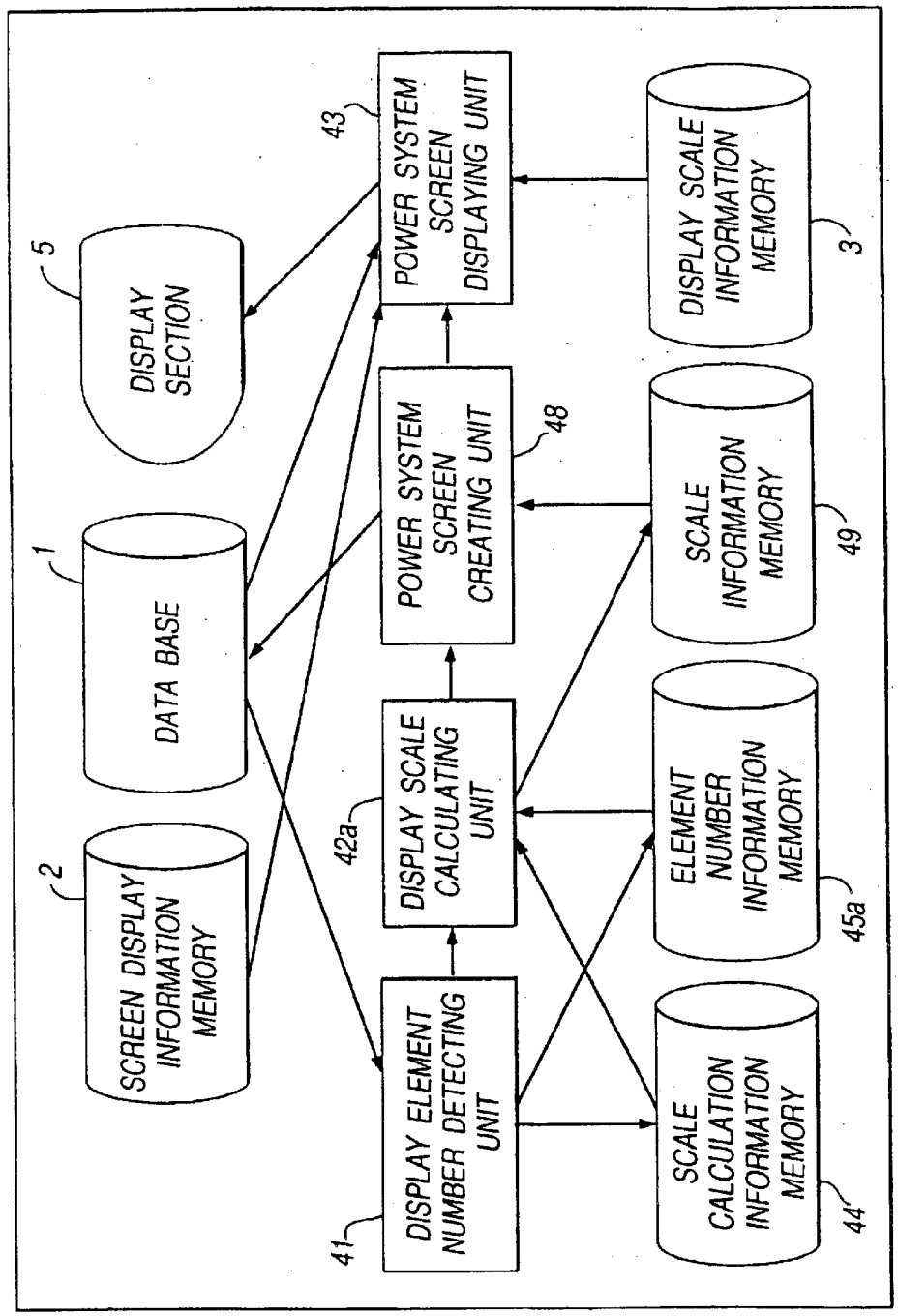
FIG. 61 is a block diagram showing a seventh embodiment of a system display apparatus and a storing medium according to the invention.

FIG. 61 is a block diagram showing a seventh embodiment of a system display apparatus according to this invention. It is noted that the elements in the figure which are similar to those in FIGS. 1 and 42 are denoted by the same reference numerals and an explanation thereof will be omitted here.

This system display apparatus has a power system screen creating section 48 and a scale information memory 49 in addition to a data base 1, a screen display information memory 2, a display scale information memory 3, a display section 5, a input section (not shown), a display element number detecting section 41, the scale calculating section 42a, a power system screen displaying section 43, a scale calculation information memory 44 and a element number information memory 45a and is arranged to implement a process of changing and setting the contents of the database 1 with regard to the part in which equipment are crowded in the system of the distribution line.

The display element number detecting section 41 makes a coordinate range by detecting the minimum and maximum values of the X-coordinate and the minimum and maximum values of the Y-coordinate from the X- and Y-coordinates regarding to the equipment in the database 1 and stores it in a coordinate range area of the scale calculation information memory 44 (see FIG. 63) (S211) as shown in FIG. 62. After that, the display element number detecting section 41 calculates the DB display range from the coordinate range detected and the screen parting number stored in the scale calculation information memory 44 and stores the DB display range in the DB display range n of the element number information memory 45a (see FIG. 64) (S212).

For instance, when the coordinates of the starting point of the coordinate range are x1, y1), the coordinates of the ending point are (x2, y2) and the screen parting number is a1, the coordinates of the DB display range n turn out as follows:

DB display range $nx1=x1+(x2-x1)/a1*(n-1)$

DB display range $nx2=x1+(x2-x1)/a1*n$

DB display range $ny1=y1$

DB display range $ny2=y2$

The display element number detecting section 41 executes the above calculations repeatedly until when the DB display range n becomes $(x2-x1)/a1$.

Succeedingly, the display element number detecting section 41 detects a number of equipment belonging to the DB display range n detected from the database 1 in Step S212 and stores it in the partial range display element number n in the element number information memory 45a (S213). The display element number detecting section 41 executes it repeatedly by the number of DB display ranges.

Next, the scale calculating section 42a executes a process as shown in FIG. 65.

That is, after calculating the minimum display range as described below from the coordinate range, the screen parting number and the part screen minimum rate in the scale calculation information memory 44 (see FIG. 63) (S221), the scale calculating section 42a detects the total number of the display elements 1 through n within the partial range (total number of equipment elements) of the element number information memory 45a (see FIG. 64) (S222).

minimum display range=(coordinate range/screen parting number)*(part screen minimum rate)

Next, the scale calculating section 42a detects a partial display range from the coordinate range in the scale calculation information memory 44, the total number of equipment elements detected in Step S222 and the number of display elements n within the partial range in the element number information memory 45a and stores partial display range in a scale information memory 49 (see FIG. 66) (S224).

For instance, when the coordinates of the starting point of the coordinate range are (x1, y1) and the coordinates of the ending point are (x2, y2), coordinate range $xw=x2-x1$ coordinate range $yw=y2-y1$ partial display range $nxw=$(coordinate range $xw$)*(partial range display element number $n$/total number of elements)

partial display range $nyw=$coordinate range $yw$

Then, the scale calculating section 42a compares the minimum display range detected in Step S221 with the partial display range n detected in Step S224 and sets the partial display range n as the minimum display range when the partial display range n is small (S225).

After that, the scale calculating section 42a detects the partial range display scale n from the DB display range n of the element number information memory 45a (see FIG. 64) and the partial display range n detected in Step S225 and stores it in an partial range display scale n area of the scale information memory 49 (see FIG. 66) (S226).

Partial range display scale $n=$partial display range $n$/DB display range $n$

The scale calculating section 42a executes the series of processes S224 through S226 as described above repeatedly by the number of DB display ranges (S223).

Further, the power system screen creating section 48 investigates where X- and Y-coordinates of the equipment n of the database 1 are contained in the partial display range of the scale information memory 49 as shown in FIG. 67 and stores X- and Y-coordinates calculated by the partial display range display scale n of the partial display range n in which they are included in the X- and Y-coordinates of the original equipment n in the database 1 (S232). The power system screen creating section 48 executes this process by a number of equipment of the database 1 (S231).

The power system screen displaying section 43 processes in the same manner with that explained with reference to FIG. 1 and makes and displays the system diagram composed of distribution lines on the display section 5.

Therefore, the operator can select and control the display elements such as the switchgear readily by using a operating tool like a mouse, or the like by widening the space between the equipment in the part like the urban area where the equipment are crowded and by reducing the space between the equipment in the part like the local area where they are not crowded for all equipment stored in the database 1, for example.

According to this embodiment, as the display scale on the specific part can be changed in accordance with the state of the specific part without changing the magnification of the power system diagram, the equipment, such as a switchgear, or various display information in the crowded part can be readily controlled with the improvement of the visibility. For example, if the specific part (like the urban area) is so crowded with the equipment, such as a switchgear, or various display information, the display scale on the specific part can be magnified. On the other hand, the specific part (like the local area) is so crowded with the equipment, such as a switchgear, or various display information, the display scale on the specific part can be reduced.

Figure 68:
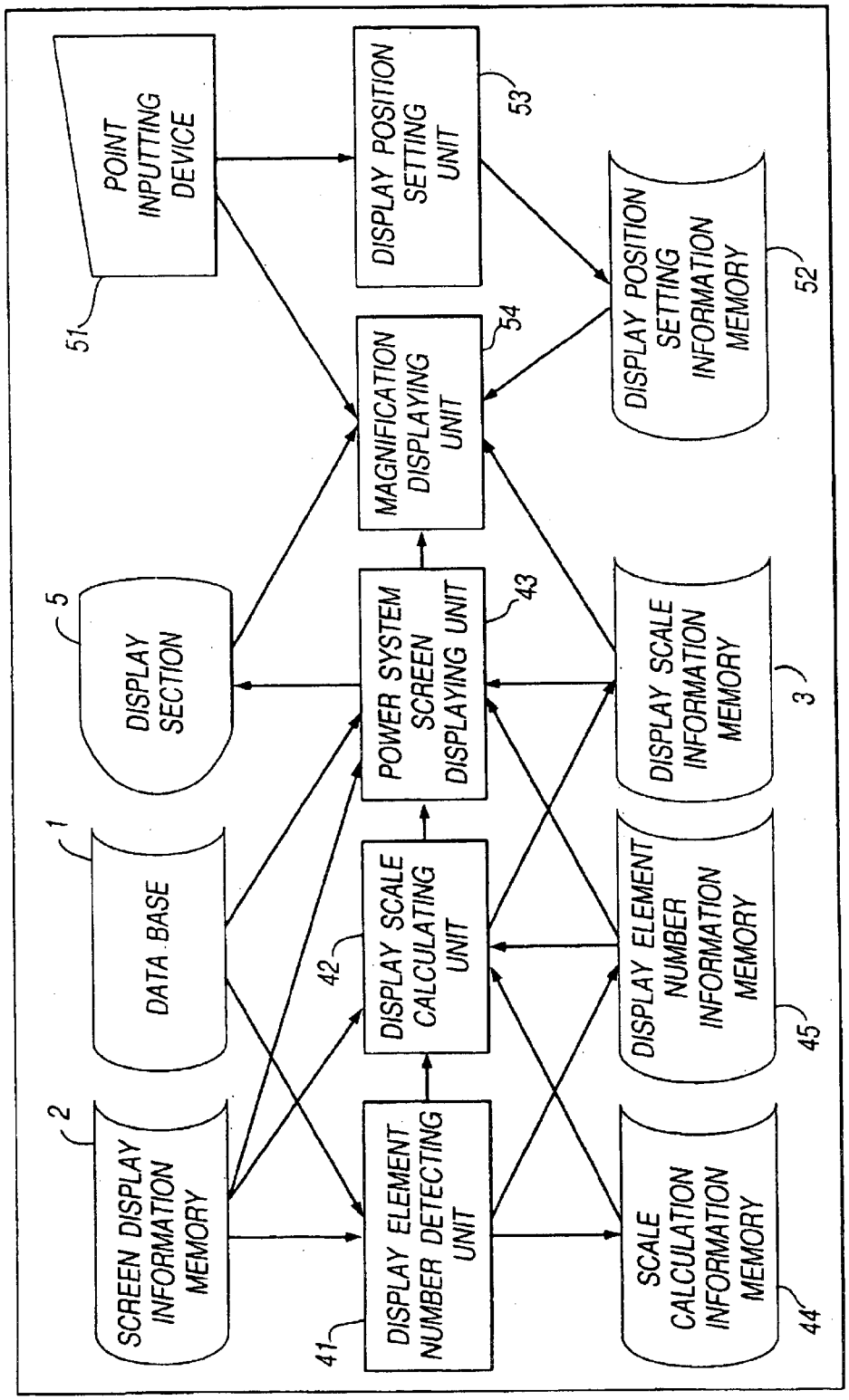
FIG. 68 is a block diagram showing an eighth embodiment of a system display apparatus and a storing medium according to the invention.

FIG. 68 is a block diagram showing an eighth embodiment of a system display apparatus according to this invention. It is noted that the elements in the figure which are similar to those in FIGS. 1 and 42 are denoted by the same reference numerals and an explanation thereof will be omitted here.

This system display apparatus has a display position setting section 53 for setting point specifying position obtained from a point inputting device 51 which is a input section used of screen control as display position in a display position setting information memory 52, and a magnification displaying section 54 for detecting and displaying the display magnification based on the point specifying position obtained from the point inputting device 51 used for controlling the screen, in addition to the same components shown in FIG. 42. FIG. 69 is a table showing a setting data array of the display position setting information memory 52.

Because the operations of the display element number detecting section 41, the display scale calculating section 42 and the power system screen displaying section 43 in this system display apparatus are the same as those in FIG. 42, only the operations of the display position setting section 53 and the magnification displaying section 54 will be explained below.

When the operator operates a display position setting request by the point inputting device 51, the display position setting section 53 operates in accordance to the setting request and selects and stores the display position of the specified part in the display position setting information memory 52. The candidate display position includes a fixed part on the screen or the neighborhood of the point specifying part, for example, and the display position setting section 53 stores the display position in the display position setting information memory 52 as the operator selects the candidate.

Next, the display position setting information memory 52 selects positions Px and Py indicating the current point based on the specification made by the point inputting device 51 used for controlling the screen as shown in FIG. 70 (S241).

Here, the display position setting information memory 52 retrieves within the display scale information memory 3 sequentially based on the taken-in position of the point to select the display scale of that position of the point (S242 through S244).

After that, the display position setting information memory 52 selects the display position set in the display position setting section 53 (S245) and displays it at the corresponding display position of the display section 5 (S246).

According to this embodiment, the display magnification can be displayed at a specific place or in the vicinity of the point specifying part, and the controllability of the operator can be improved in the system diagram displayed by the variable display magnification.

Figure 71:
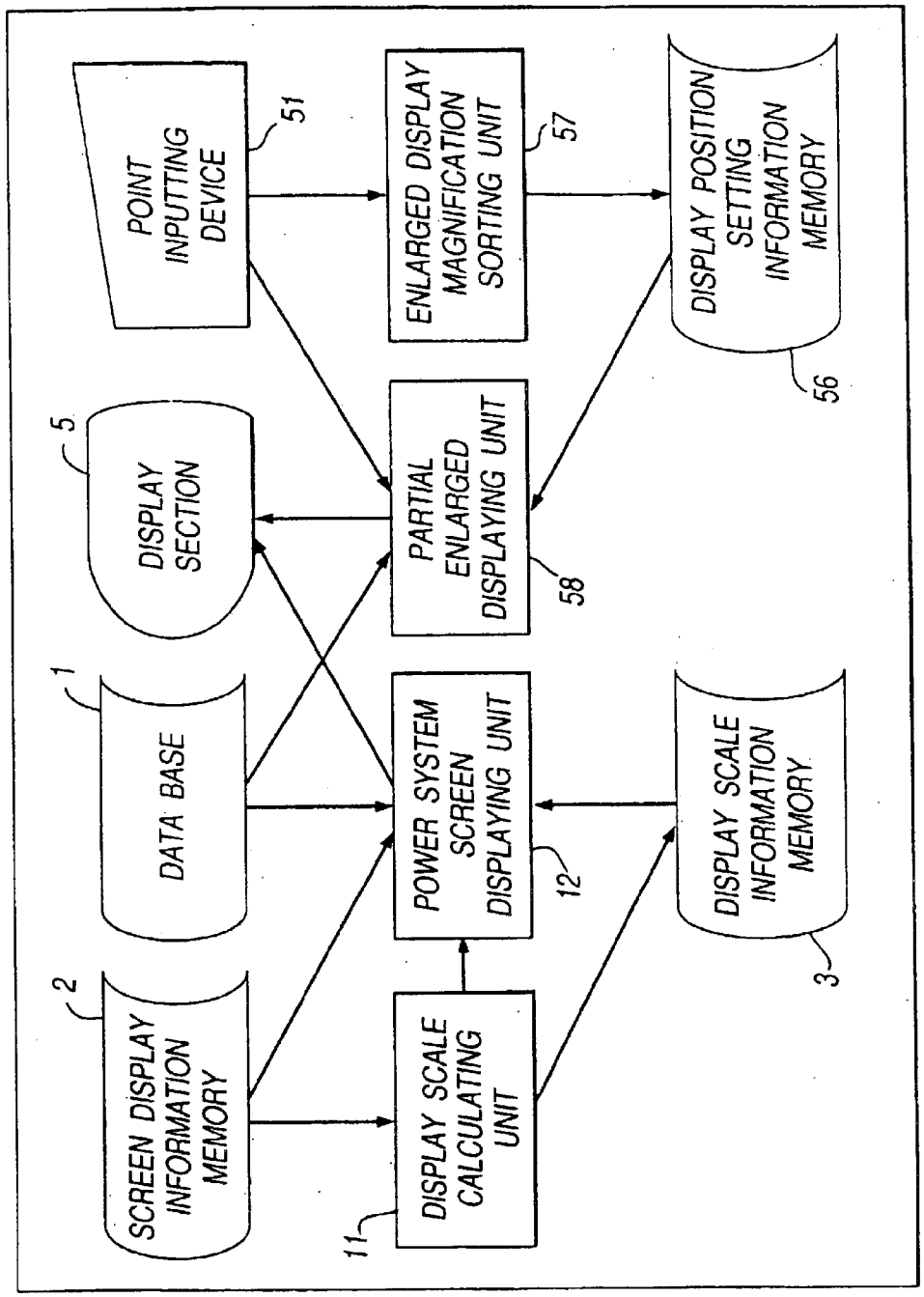
FIG. 71 is a block diagram showing an ninth embodiment of a system display apparatus and a storing medium according to the invention.

FIG. 71 is a block diagram showing a ninth embodiment of a system display apparatus according to this invention. It is noted that the elements in the figure which are similar to those in FIG. 1 are denoted by the same reference numerals and an explanation thereof will be omitted here.

Figure 72:
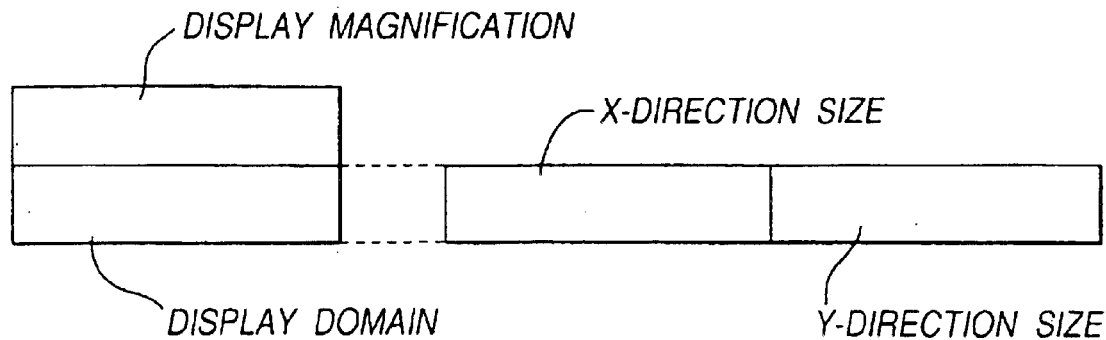
FIG. 72 is a table showing a data array structure of an enlarged display setting information memory shown in FIG. 71.
Figure 73:
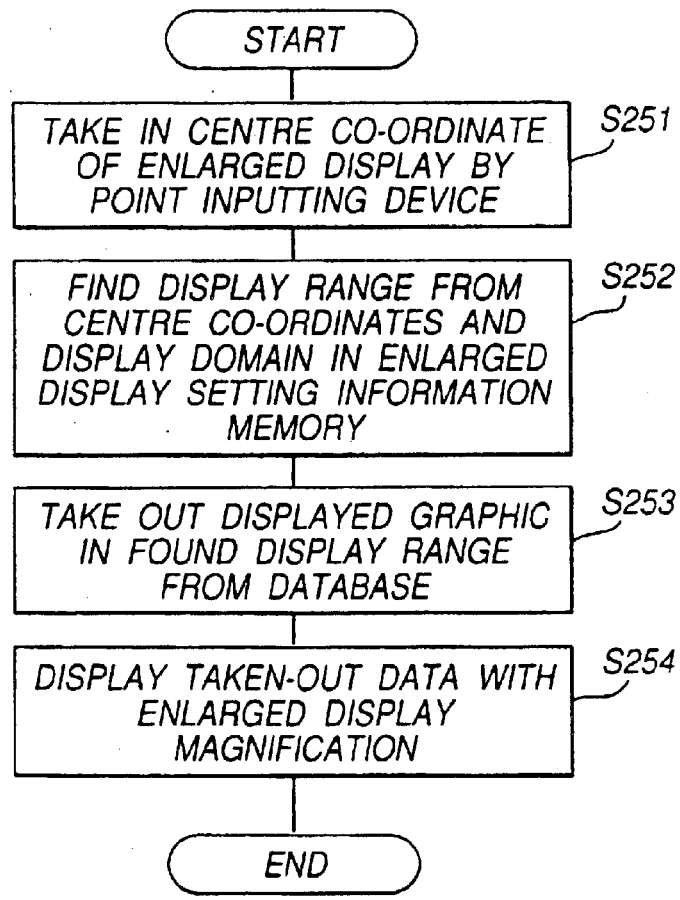
FIG. 73 is a flowchart for explaining an operation of partial enlarged displaying section shown in FIG. 71.

This system display apparatus has a enlarged display magnification setting section 57 for selecting enlarged magnification and the like based on a request to enlarge a display inputted from a point inputting device 51 to set in the enlarged display setting information memory 56 and a partial enlarged displaying section 58 for largely displaying a part specified by the operator, in addition to elements shown in FIG. 1. It is noted that FIG. 72 is a table of a setting data array of the enlarged display setting information memory 56.

Because the operations of the display scale calculating section 11 and the power system screen displaying section 12 in this system display apparatus are the same as those in FIG. 1, only the operations of the enlarged display magnification setting section 57 and the partial enlarged displaying section 58 will be explained below.

When the operator issues an enlarged display setting request by the point inputting device 51, the enlarged display magnification setting section 57 obtains an enlarged magnification M and a display domain which are the contents of the setting request to set in the enlarged display setting information memory 56 at first.

In this state, the partial enlarged displaying section 58 selects the center coordinates Sx and Sy of the part to be largely displayed via the point inputting device 51 (S251) and detects the display range from the contents of the setting stored in the enlarged display setting information memory 56 based on the center coordinates Sx and Sy (S252).

For instance, when M is the enlarged magnification, Ax is the size of the display domain in the X-direction and Ay is the size thereof in the Y-direction in the enlarged display setting information memory 56, the display range may be detected as follows:

starting point of display range $X1=Sx-((Ax*M)/2)$ $Y1=Sy-((Ay*M)/2)$ starting point of display range $X2=Sx+((Ax*M)/2)$ $Y2=Sy+((Ay*M)/2)$ The partial enlarged displaying section 58 selects a display graphic included in the display range thus detected from the database 1 (S253) and displays partially largely with the enlarged magnification M (S254).

Figure 74:
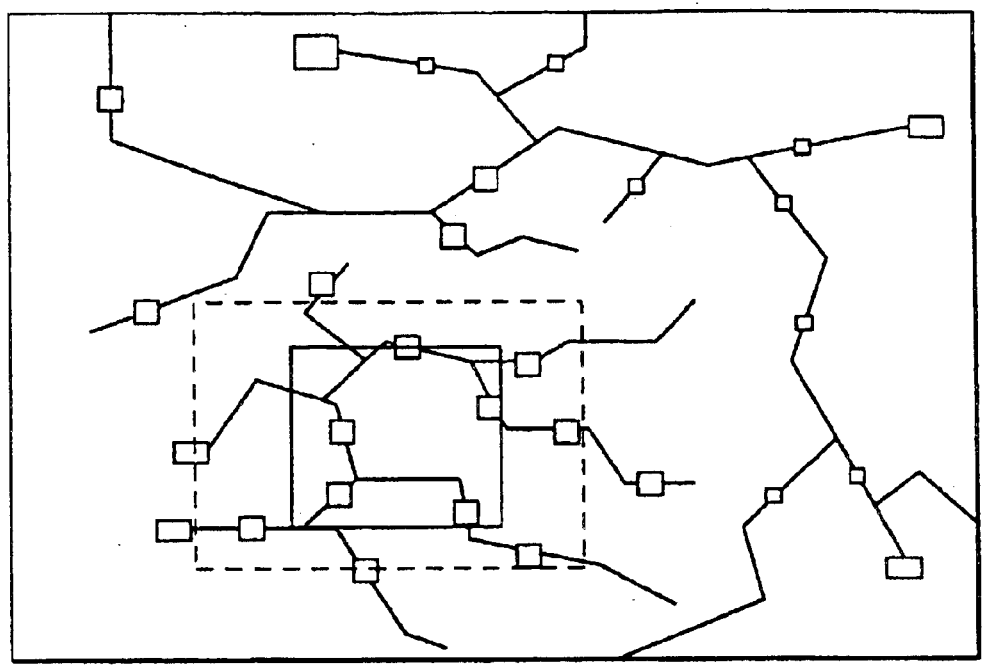
FIG. 74 is a diagram of the display screen having a part where equipments are crowded.
Figure 75:
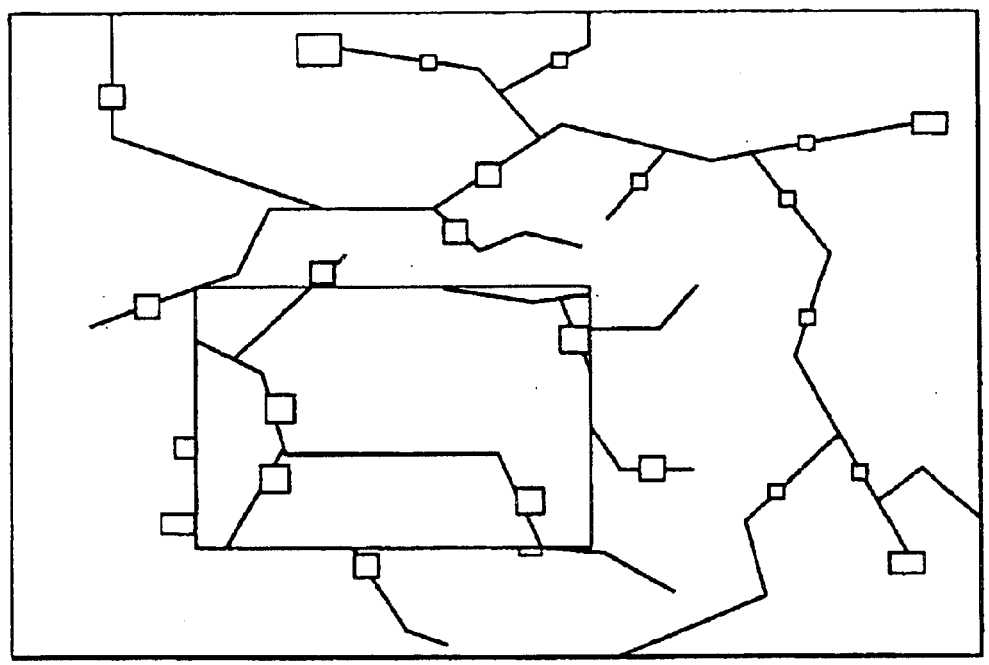
FIG. 75 is a diagram of the display screen in which a crowded part shown in FIG. 74 is enlarged.

FIG. 74 shows a screen display of a system diagram having a part in which various information, like a switchgear and equipment, are crowded. Although it is difficult to control the switchgear in this case, the equipment such as the switchgear may be controlled readily by largely displaying only the required part as shown in FIG. 75.

According to this embodiment, in addition to the same effects related to FIG. 1, as the display scale on the specific part can be changed in accordance with the state of the specific part without changing the magnification of the power system diagram, the equipment, such as a switchgear, or various display information in the crowded part can be readily controlled with the improvement of the visibility.

For example, if the specific part (like the urban area) is so crowded with the equipment, such as a switchgear, or various display information, the display scale on the specific part can be magnified. On the other hand, the specific part (like the local area) is so crowded with the equipment, such as a switchgear, or various display information, the display scale on the specific part can be reduced.

Figure 76:
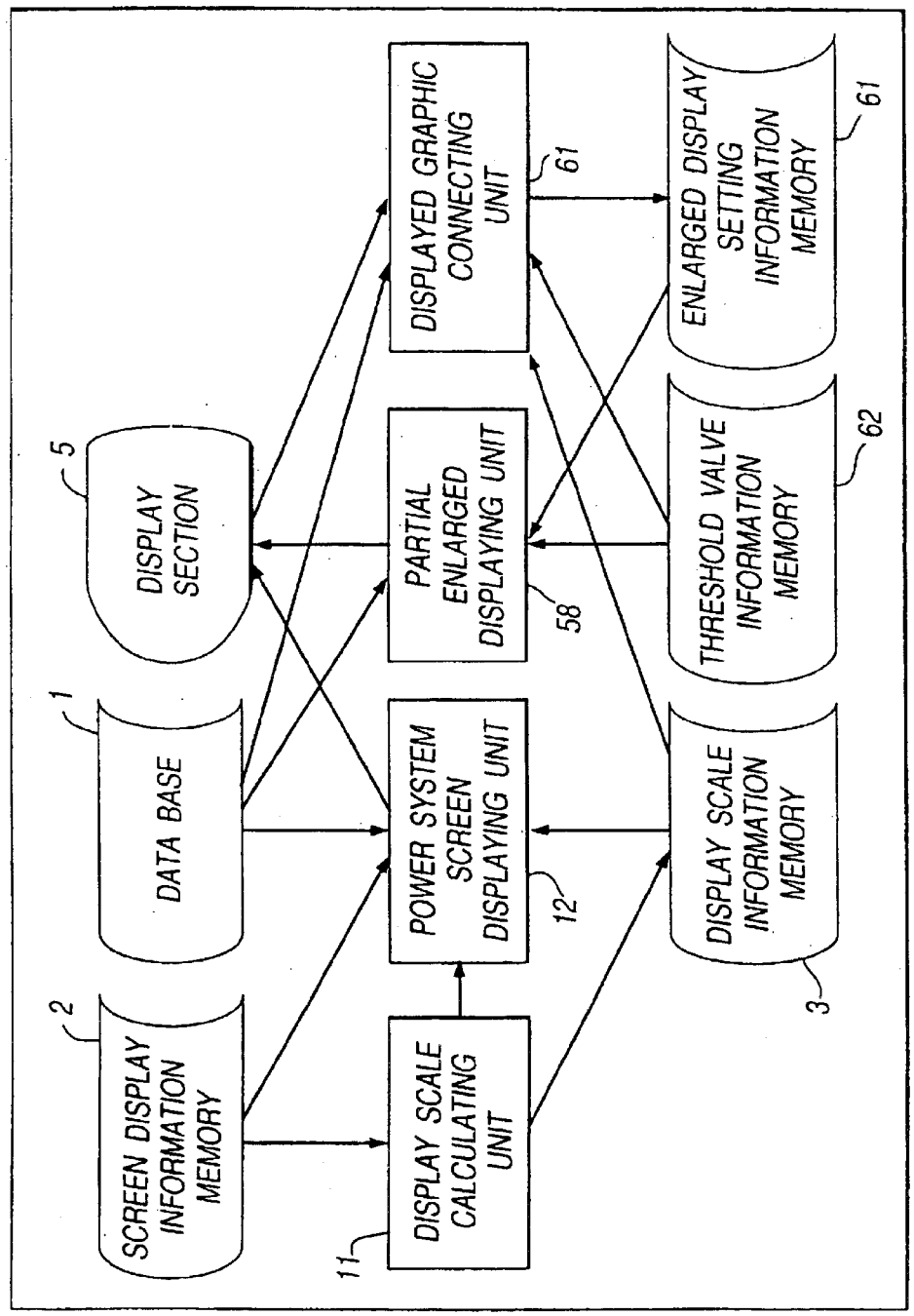
FIG. 76 is a block diagram showing a tenth embodiment of a system display apparatus and a storing medium according to the invention.

FIG. 76 is a block diagram showing a tenth embodiment of a system display apparatus according to this invention. It is noted that the elements in the figure which are similar to those in FIG. 1 and FIG. 71 are denoted by the same reference numerals and an explanation thereof will be omitted here.

In addition to those elements shown in FIG. 71, this system display apparatus has a display graphic connecting section 61 for compressing and connecting a system including the equipment on the outside of the part enlarged by the display magnification.

While the part of the system diagram in which the equipment are crowded is largely displayed by the partial enlarged displaying section 58 as shown in FIG. 71, it becomes difficult to connect the distribution network largely displayed with the distribution network at the part not enlarged in the vicinity of that distribution network.

Figures 77, 78:
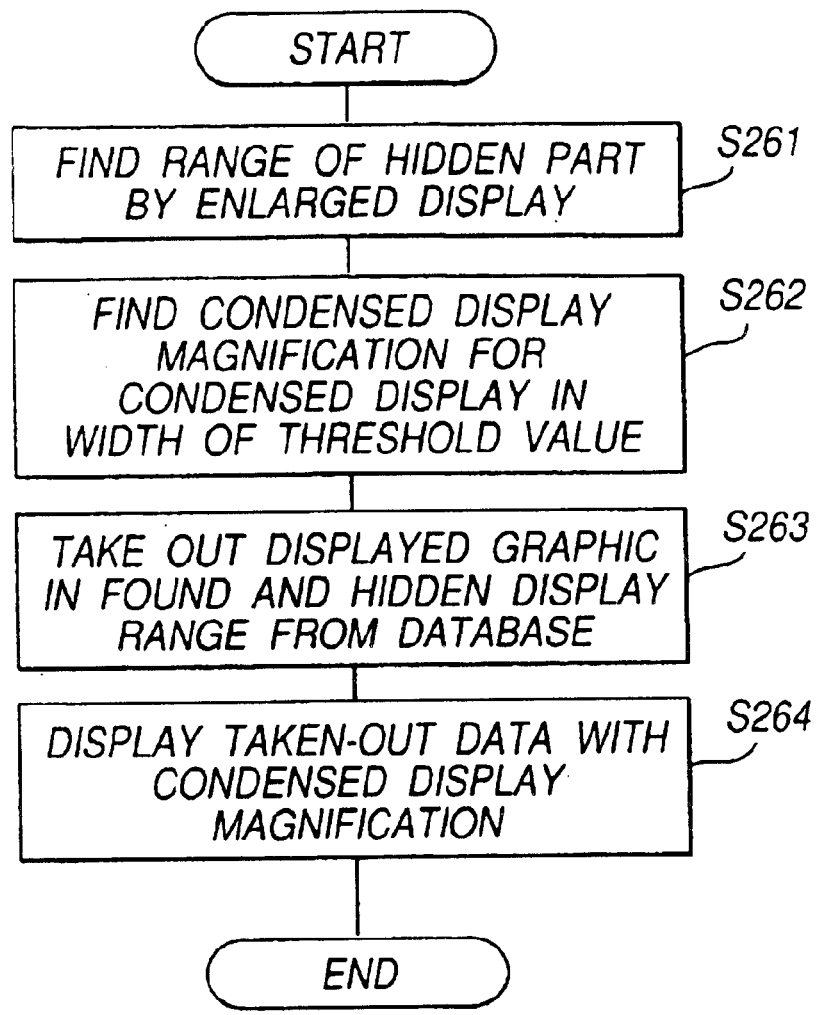
FIG. 77 is a flowchart for explaining an operation of displayed graphic connecting section shown in FIG. 76.
FIG. 78 is a table showing a data array structure of a threshold value information memory shown in FIG. 76.

Then, the displayed graphic connecting section 61 calculates the range of a part hidden by the largely displayed part as shown in FIG. 77 (S261).

For instance, the starting point A1 (A1x1, A1y1) and ending point B1 (B1x2, B1y2) of the display domain by the original display magnification turn out as follows, where M2 is the enlarged magnification set in the enlarged display setting information memory 56, Kx is the size of the display domain in the X-direction, Ky is the size thereof in the Y-direction and M1 is the original display magnification:

starting point of display range $$A1x1=Sx-((Kx*M1)/2)$$

$$A1y1=Sy-((Ky*M1)/2)$$

ending point of display range $$B1x2=Sx+((Kx*M1)/2)$$

$$B1y2=Sy+((Ky*M1)/2)$$

Meanwhile, the starting point A2 (A2x1, A2y1) and ending point B2 (B2x2, B2y2) of the display domain by the enlarged magnification turn out as follows;

starting point of display range $$A2x1=Sx-((Kx*M2)/2)$$

$$A2y1=Sy-((Ky*M2)/2)$$

ending point of display range $$B2x2=Sx+((Kx*M2)/2)$$

$$B2y2=Sy+((Ky*M2)/2)$$

Accordingly, the part obtained by subtracting an area A2B2 from an area A1B1 is the part which is hidden by the enlarged display and which cannot be displayed. Then, assuming that a width of threshold value of the display part for condensedly displaying the hidden part is stored in a threshold value information memory 62 (see FIG. 78), the display magnification for condensedly displaying in the width of the threshold value will be obtained(S262).

For instance, the condensed display magnification M3 turns out as follows, where r the width of the threshold value;

$$M3 \text{ in } X\text{-direction}=(r/A2x1-(A1x1-r))*M1$$

$$M3 \text{ in } Y\text{-direction}=(r/A2y1-(A1y1-r))*M1$$

The X-direction and the Y-direction of M3 become the same when the display domain is a circle or a square.

Then, it is possible to display while keeping the connection of the power system by selecting the displayed graphic contained in the hidden display range thus detected from the database 1 (S263) and by displaying with the condensed display magnification M3 (S264).

For instance, when the coordinate X (Xx, Xy) is included between (Ar*M1) to (Br*M1) and (A2*M1) to (B2*M1), an intersection on a line from (Ar) to (Br) with a straight line connecting (X/M1) from the center S of the part to be largely displayed is set as XAr(XArx, XAry) and an intersection on a line from (A2) to (B2) with a straight line connecting from S to (X/M1) as XA2(XA2x, XA2y).

Here, when $$Z=(((XArx-Sx)^2+(XAry-Sy)^2)/((XA2x-Sx)^2+(XA2y-Sy)^2)^{1/2}*(((XxM1-Sx)^2+(XyM1-Sy)^2)^{1/2}),$$

the new coordinates N(Nx,Ny) turn out as follows:

$$Nx=Z*\cos(\tan^{-1}((Xy-Sy)/(Xx-Sx)))+Sx$$

$$Ny=Z*\sin(\tan^{-1}((Xy-Sy)/(Xx-Sx)))+Sy$$

When a line segment passes through the intersection with Ar–Br when the magnification is M1, the intersection and N are drawn by connecting with a straight line. In the same manner, when a line segment passes through the intersection with A2–B2 when the magnification is M2, the intersection and N are drawn by connecting with a straight line.

Figure 79:
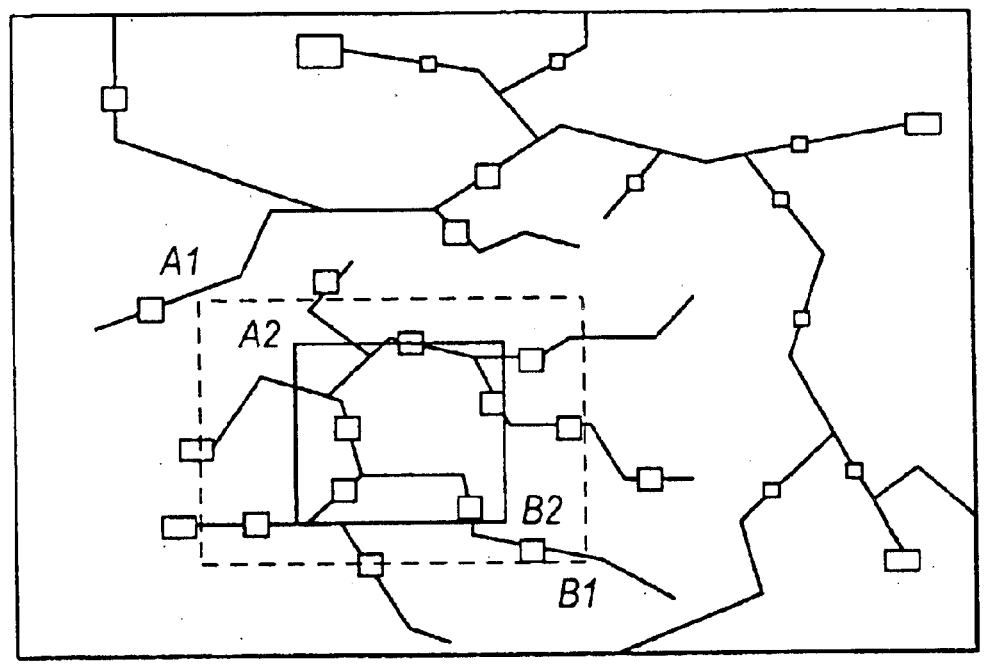
FIG. 79 is a diagram of the display screen having a part where equipments are crowded.

This will be explained with reference to FIGS. 79 and 80. A system diagram in the areas A1B1–A2B2 is hidden when an area A2B2 is partially and largely displayed in FIG. 79.

Figure 80:
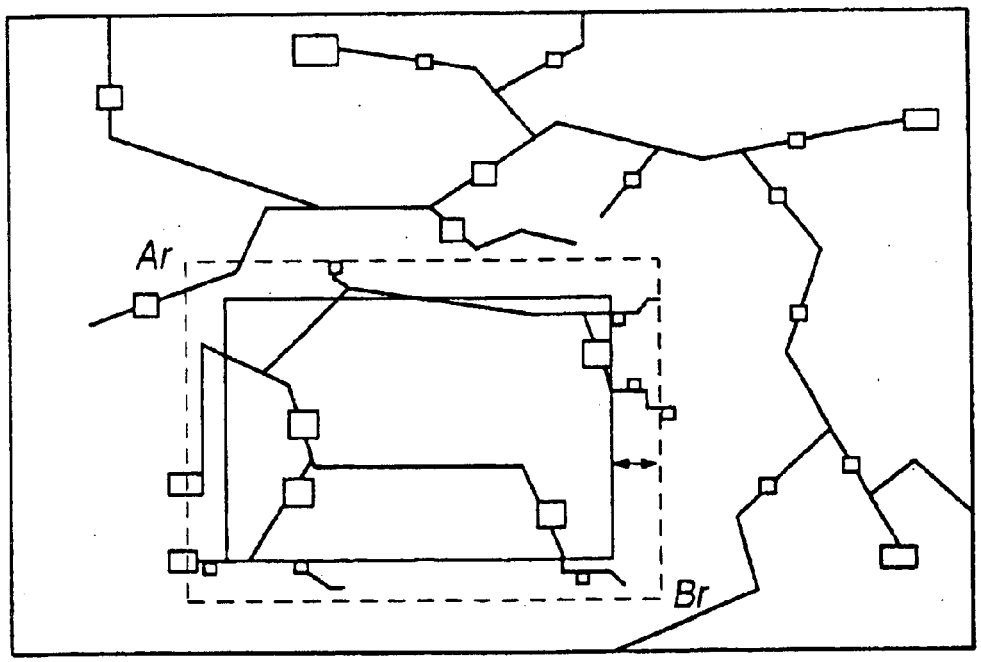
FIG. 80 is a diagram of the display screen in which a crowded part shown in FIG. 79 is enlarged.

Then, the whole system diagram may be displayed by calculating and displaying magnification which condenses the system diagram of the ArBr–A2B2 of the threshold value r shown in FIG. 80 so that it falls within the width r.

According to this embodiment, the visibility in recognizing the connection of the power system can be improved even when part of the displayed graphic is largely displayed at the part like the urban area where the equipment, such as switchgear etc. and various display information are crowded.

It is noted that when a threshold value is set for the enlarged magnification M2 and when the enlarged magnification M2 specified by the operator exceeds the threshold value, it is also possible to display detail information such as a value of current passing through the switch displayed in the enlarged area. Thereby, the detail information of the desired system equipment readily and correctly while understanding the whole power system can be ascertained.

Various embodiments are conceivable on the present invention in addition to those described above.

Figure 81A:
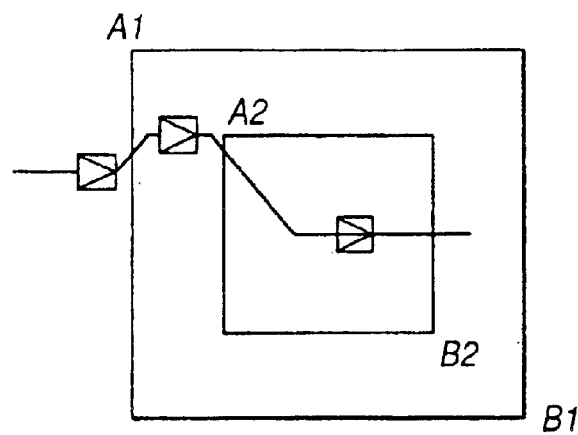
FIGS. 81a through 81c are diagrams for explaining a systematic connection for connecting a partially enlarged display part with a non-enlarged part.
Figure 81B:
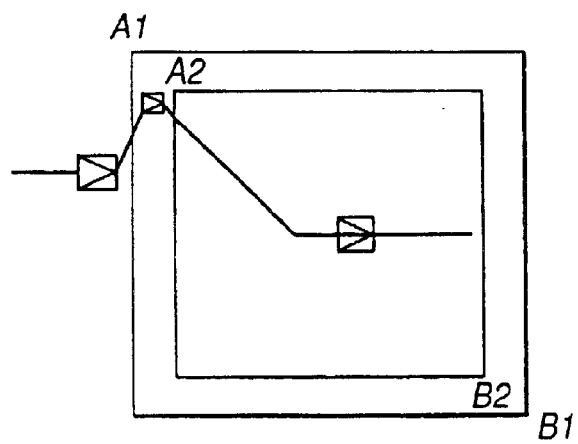

(1) Connecting Magnification Boundary Point by New Straight Line Vector:

It is possible to display the magnification boundary point readily linearly in displaying the condensed part for example. When the range of A2B2 in the system shown in FIG. 81 is largely displayed, it turns out as shown in FIG. 81b.

Then, a distribution line number contained in the display domain A2B2 to be largely displayed is taken out from the database 1 in this state. Further, equipment information belonging to the distribution line taken from the database 1 is taken out to check whether or not it is information for displaying on the outside of the A1B1 from the domain within A2B2.

When it is information for displaying on the outside of A1B1, the magnification boundary point P (Px, Py) with A2B2 is detected and the magnification boundary point Q (Qx, Qy) with A1B1 is detected.

Figure 81C:
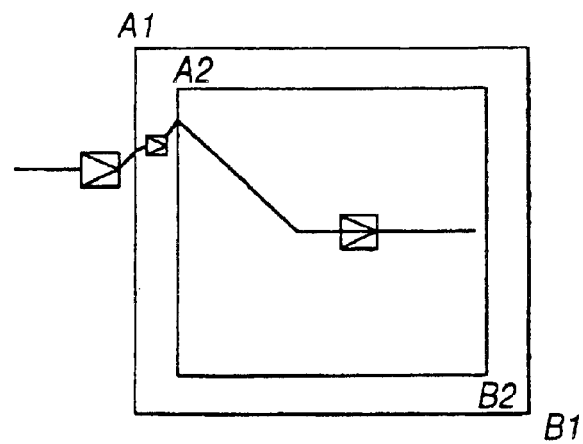

The points P and Q thus detected are replaced to linear display data. Then, the data is corrected so that the equipment symbol to be displayed between A2B2 and A1B1 rides on the replaced straight line PQ. This process is repeated by a number of distribution lines. Thereby, although all of the data has been condensedly displayed in the condensed display area, it may be displayed simply as shown in FIG. 81c, allowing to display the screen at high speed.

Figure 82A:
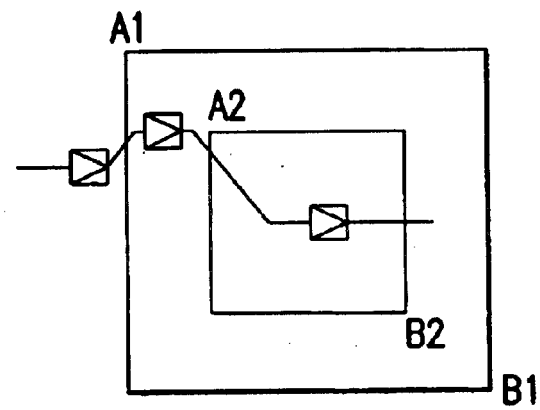
FIGS. 82a through 82c are diagrams for explaining another systematic connection for connecting a partially enlarged display part with a non-enlarged part.
Figure 82B:
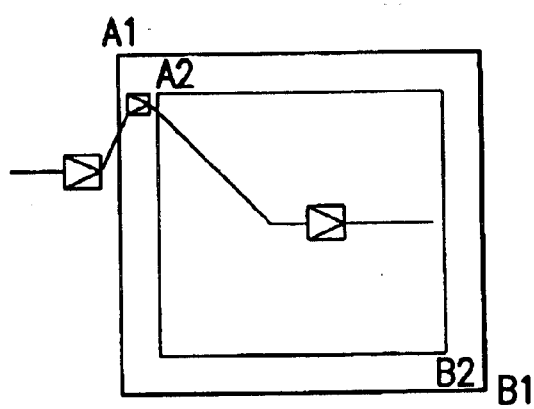

(2) Displaying Equipment in Vector by Straight Line in Straddling Magnification Boundary:

It is also readily possible to display equipment straddling the condensed part linearly. When the range of A2B2 in the system shown in FIG. 82 is now largely displayed, it turns out as shown in FIG. 82b. The equipment information contained in the display domain A2B2 to be largely displayed is taken out from the database 1 in this state.

Then, equipment information neighboring to the equipment taken from the database 1 is taken out to replace the section between the equipment with new linear display data.

Figure 82C:
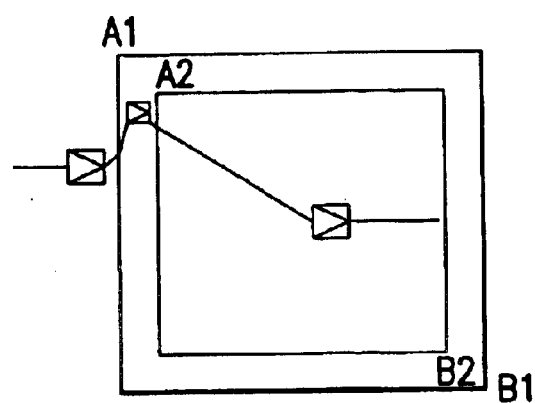

The replacement is continued until when they are put from the A1B1 area. Such process is repeated by a number of equipment contained in A2B2. Thereby, it becomes possible to display those displayed straddling the condensed display area simply as shown in FIG. 82c, thus allowing to display the screen at high speed.

(3) Changing into Set Symbol When Symbol Data Overlap Each Other

When symbols representing all of equipment are displayed in the condensed part, the symbols overlap each other. Thereby, it becomes difficult for the operator to understand the state of the system. The system may be displayed simply by collecting the overlapping symbols into one set symbol.

Figure 83A:
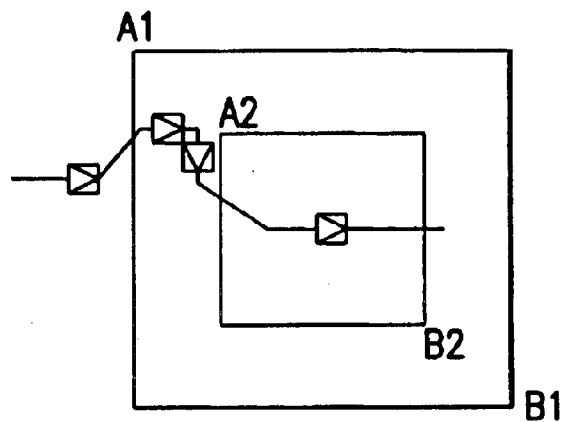
FIGS. 83a through 83c are diagrams for explaining another systematic connection for connecting a partially enlarged display part with a non-enlarged part.
Figure 83B:
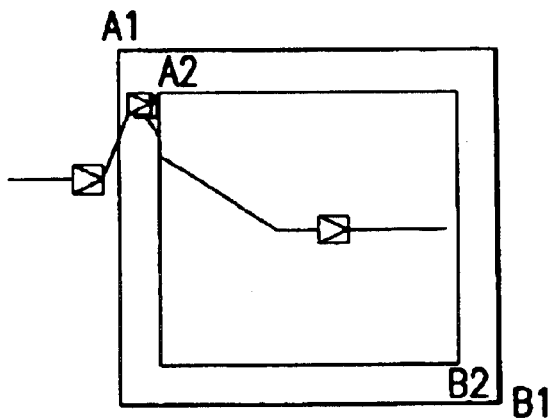

When the range of A2B2 of the system shown in FIG. 83a is now largely displayed, it turns out as shown in FIG. 83b.

In this state, distribution line numbers contained in the display domain A2B2 to be largely displayed are selected from the database 1 and equipment information belonging to the selected distribution line is selected from the database 1 to check whether or not it is information to be displayed in the condensed area from A2B2 to A1B1.

When there exist a plurality of equipment information to be displayed in the condensed area, they may be displayed simply by replacing the display symbols with the set symbol.

Figure 83C:
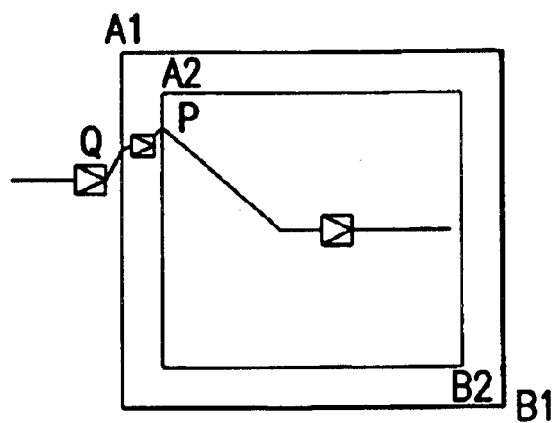

Thereby, it allows the system which has been displayed while overlapping each other in the condensed display area to be simply displayed as shown in FIG. 83c, the operator to recognize the system readily and the screen to be displayed at high speed.

(4) Allowing to Display State within Set Symbol:

When the condensed part is displayed by the set symbol, there is a case when it becomes difficult for the operator to understand the state of the system during when the system is operative in a system different from the normally operated system. It become easy to recognize the system by displaying in such a manner that the state of equipment can be understood even when they are collected as one set symbol.

Figure 84A:
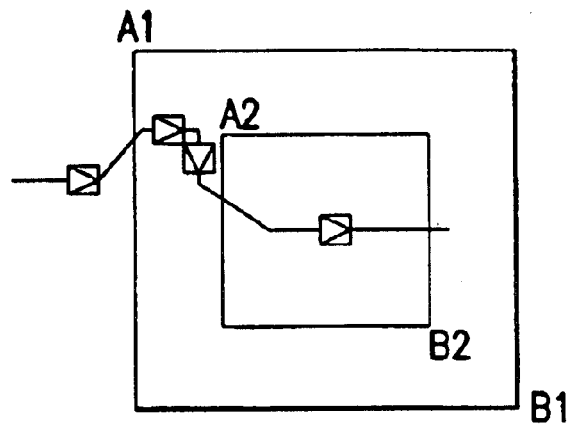
FIGS. 84a through 84c are diagrams for explaining a further systematic connection for connecting a partially enlarged display part with the non-enlarged part.
Figure 84B:
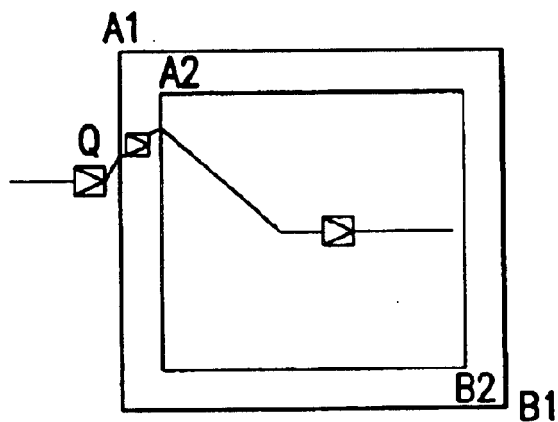
Figure 84C:
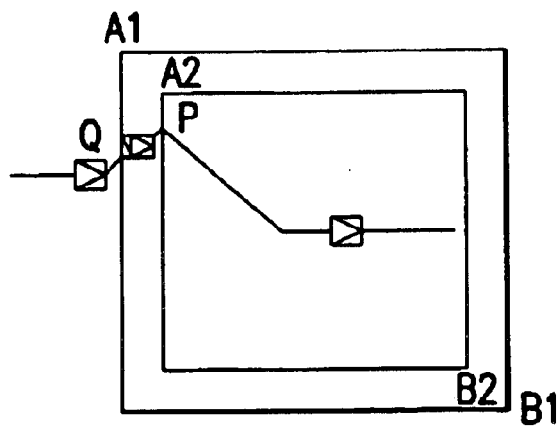

For instance, when the range of A2B2 of the system shown in FIG. 84a is largely displayed and the symbols are displayed as a set, it turns out as shown in FIG. 84b. Then, the state may be displayed collectively when the collective display symbols are formed into the globular shape by which ON/OFF can be discriminated and by arraying in the lump as shown in FIG. 84c, for example.

Accordingly, it becomes easy for the operator to recognize the system by displaying as described above.

Figure 85:
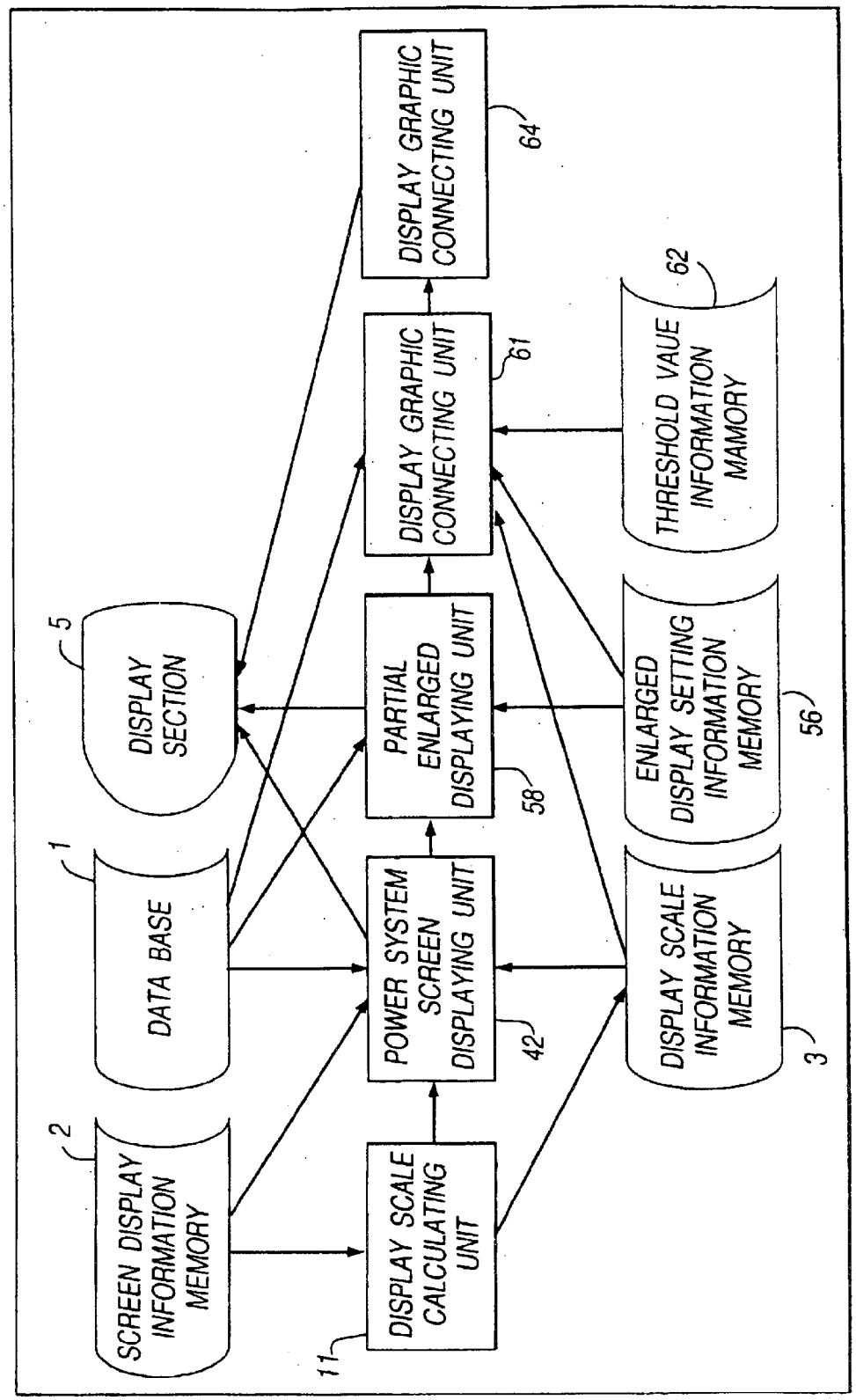
FIG. 85 is a block diagram showing a eleventh embodiment of a system display apparatus and a storing medium according to the invention.
Figure 86:
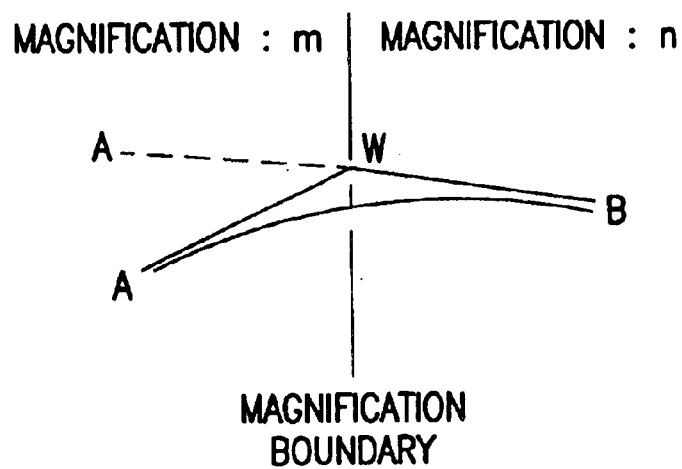
FIG. 86 is a diagram for explaining another systematic connection for connecting a partially enlarged display part with the non-enlarged part.
Figure 87:
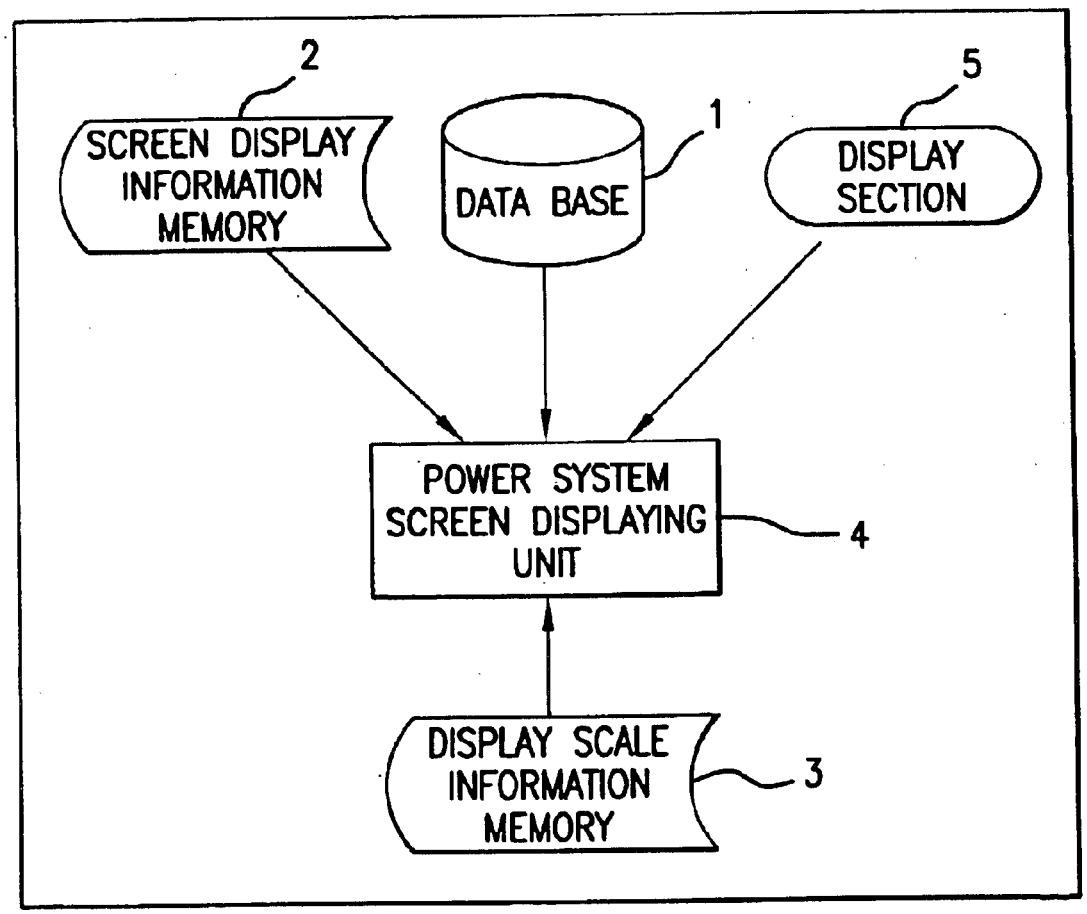
FIG. 87 is a block diagram showing a prior art system display apparatus.
Figure 91:
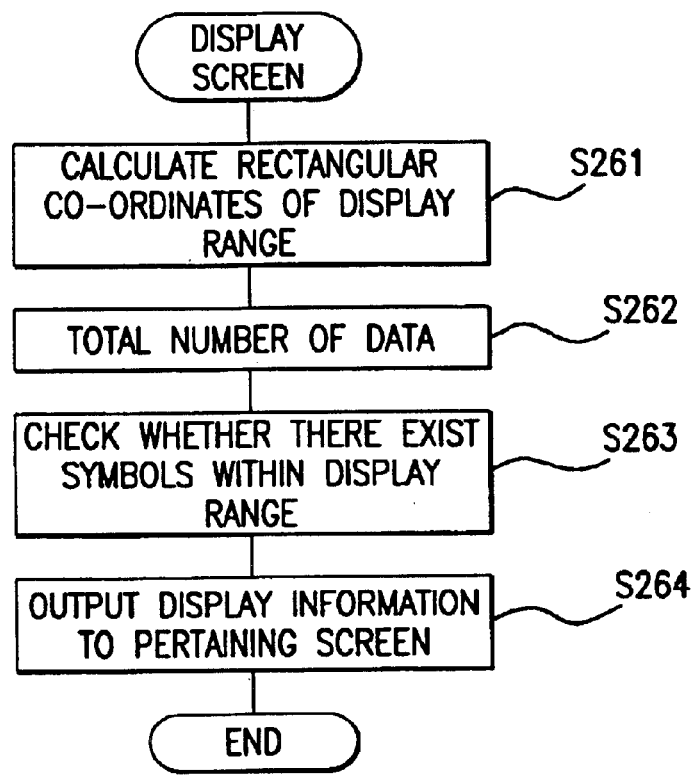
FIG. 91 is a flowchart for explaining an operation of the prior art system.
Figure 93:
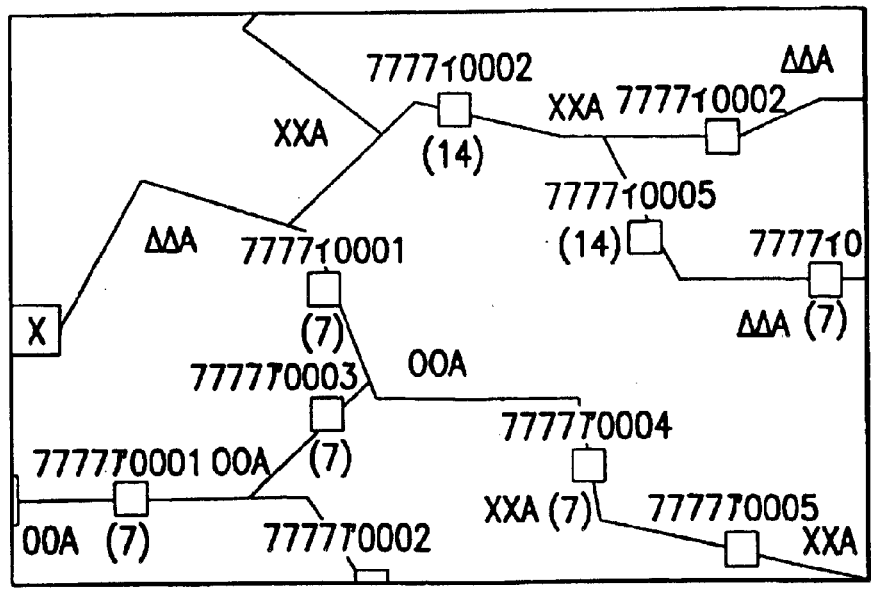
FIG. 93 is a diagram of the display screen of a system diagram in a scale of the prior art system.
Figure 92A:
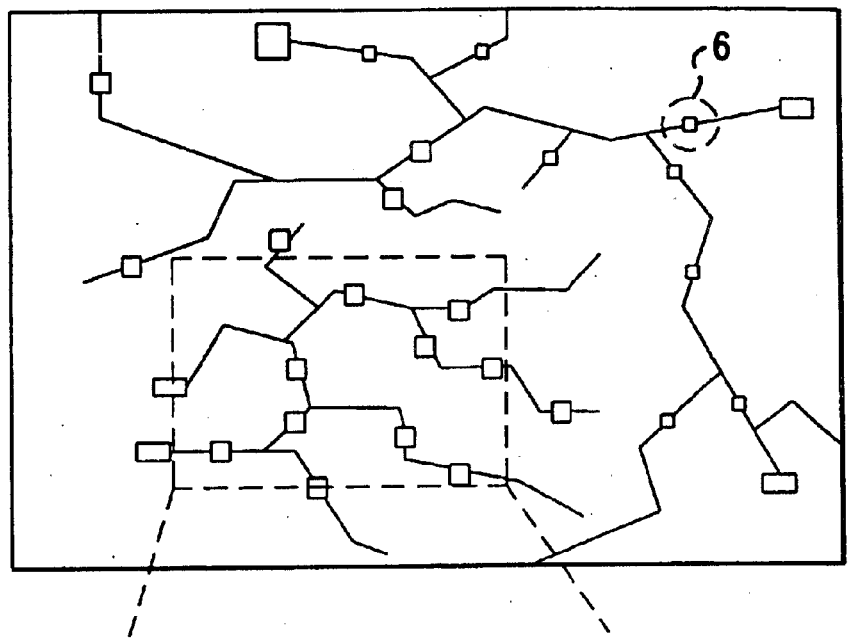
FIG. 92 is a diagram of a display screen of a system diagram in a scale of a prior art system.
Figure 92B:
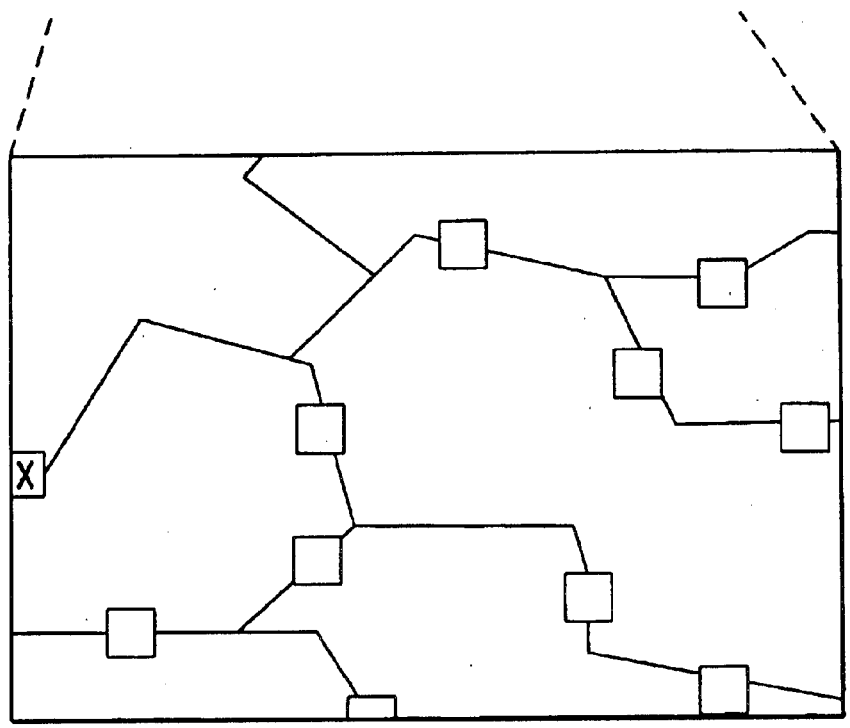

FIG. 85 is a block diagram showing an eleventh embodiment of a system display apparatus according to this invention. It is noted that the elements in the figure which are similar to those in FIG. 76 are denoted by the same reference numerals and an explanation thereof will be omitted here.

This system display apparatus has a display graphing correcting section 64 for correcting connection data refracting at the boundary where the display magnification of the enlarged display part is switched to that of the conventional display part into an approximate curve, in addition to elements shown in FIG. 76.

In displaying one graphic vector AB by dividing into two vectors AW and WB at the boundary W of the display magnification by the displayed graphic connecting section 61, this display graphic correcting section 64 connects them with a smooth curvilinear graphic by replacing the vectors AW and WB with a hyperbolic curve AB whose asymptotic lines are the vectors.

The hyperbolic curve is defined as follows by a known formula:

$$(x^2/a^2)-(y^2/b^2)=1$$

Specifically, the vector represented by vectors A'B in one and same magnification is divided into the vectors AW and WB at the magnification boundary point W by changing the display magnification on the way thereof. Therefore, it allows the smooth graphic to be obtained by replacing with the hyperbolic curve AB whose asymptotic lines are the vectors AW and WB and to be displayed to maintain AB which has been originally one graphic.

Accordingly, this embodiment allows the system diagram which will give no feeling of incompatibility to the operator to be displayed by correcting the display data refracting at the magnification boundary into the curve.

It is noted that this present invention is not confined to the respective embodiments described above.

For instance, it is possible to provide system screen displaying form specifying means, in addition to the functions of realizing each embodiment or all embodiments described above, so that the system screen display specifying means switches the connection of elements in accordance to a predetermined procedure when any one system screen displaying form is specified from the outside, to construct a desired system display apparatus and to execute the predetermined processes in accordance to the system screen displaying form.

Although these embodiments described above have been explained for the screen display of the distribution line system, they may be applied in the same manner for displaying the system regarding to a transmission line system and a plant instrumentation.

As described above, according to the invention, the visibility and controllability can be improved by displaying a system with an adequate scale and by displaying equipment at the crowded part by separately displaying each other with adequate intervals.

In addition, it is possible to store functions to execute each element in each embodiments above-described into a storing medium, such as a magnetic storage device and magneto-optical storage device, (not shown) readable by a computer. That is, by applying the storing medium into a system having similar function with each embodiment above-described, the same effect, which is mentioned in each embodiment, can be ascertained.

The invention may be embodied in other specific forms without departing from the spirit or essential characteristics thereof. The present embodiment is thereof to be considered in all respects as illustrative and not restrictive, the scope of the invention being indicated by the appended claims rather than by the forgoing description and all changes which come within the meaning and range of equivalency of the claims are therefore intended to be embraced therein.

Japanese priority Application No. PH11-174135, filed on Jun. 21, 1999, including the specification, drawings, claims and abstract, is hereby incorporated by reference.

We claim:

1. A system display apparatus configured to generate and display a system diagram based on an information related to a system, comprising:

a database configured to store a first information of an equipment related to said system;

a screen display information memory configured to store a second information related to said system, wherein said first information is different from said second information;

a display scale calculating unit configured to obtain maximum and minimum coordinates in horizontal and vertical directions of said system diagram to be displayed, said display scale calculating unit automatically calculating a display scale of said system diagram from said maximum and minimum coordinates and a size of a display screen from said first information and said second information, said display scale calculating unit comprising:

a distribution line number coincidence judging unit configured to judge whether or not a distribution line number, and said information that is displayed, stored in said screen display information memory coincides with said distribution line number, and said information related to an equipment that is stored in said data base and wherein said equipment is connected to distribution lines of said system;

an X-coordinate obtaining unit configured to obtain maximum and minimum values of an X-coordinate of said equipment which is judged to have said distribution line number coincide by said distribution line number coincidence judging unit from a coordinate data stored in said data base;

a Y-coordinate obtaining unit configured-to obtain maximum and minimum values of a Y-coordinate of said equipment which is judged to have said distribution line number coincide by said distribution line number coincidence judging unit from a coordinate data stored in said data base;

a scale calculating unit configured to automatically calculate said display scale from said maximum and minimum values of said X-coordinate and said Y-coordinate obtained from all of said equipments which are judged to have said distribution line number coincide and from a size of said display screen; and a determining unit configured to display a scale for displaying said system diagram based on a relationship of size of said display scales on said X-coordinate side and said Y-coordinate side calculated by said scale calculating unit and a relationship between said display scale on said X-coordinate side and said Y-coordinate side and a scale threshold value set; and a system screen displaying unit configured to generate and display the system diagram to be displayed based on said display scale calculated by said display scale calculating unit.

2. A system display apparatus according to claim 1, wherein said display scale calculating unit comprises:

a distribution line number coincidence judging unit configured to judge whether or not a distribution line number, and said information that is displayed, stored in said screen display information memory coincides with said distribution line number, and said information related to an equipment that is stored in said data base and wherein said equipment is connected to distribute lines of said system;

an X-coordinate obtaining unit configured to obtain maximum and minimum values of an X-coordinate of said equipment which is judged to have said distribution line number coincide by said distribution line number coincidence judging unit from a coordinate data stored in said data base;

a Y-coordinate obtaining unit configured to obtain maximum and minimum values of a Y-coordinate of said equipment which is judged to have said distribution line number coincide by said distribution line number coincidence judging unit from a coordinate data stored in said data base;

a scale calculating unit configured to automatically calculate said display scale from said maximum and minimum values of said X-coordinate and said Y-coordinate obtained from all of said equipments which are judged to have said distribution line number coincide and from a size of said display screen; and a determining unit configured to display a scale for displaying said system diagram based on one of a relationship of size of said display scales on said X-coordinate side and said Y-coordinate side calculated by said scale calculating unit and from a relationship between said display scale on said X-coordinate side and said Y-coordinate side and a scale threshold value set.

3. A system display apparatus configured to generate a system diagram based on an information related to a system, comprising:

a data base configured to store a first information of an equipment related to said system;

a screen display information memory configured to store a second information related to said system, wherein said first information is different from said second information;

a display scale calculating unit configured to obtain maximum and minimum coordinates in horizontal and vertical directions of said system diagram to be displayed, said display scale calculating unit automatically calculating a display scale of said system diagram from said maximum and minimum coordinates and a size of a display screen from said first information and said second information;

a system screen displaying unit configured to generate and display the system diagram to be displayed based on said display scale calculated by said display scale calculating unit; and a unit configured to extract and display said equipment connected to said system diagram displayed by said system screen displaying unit on a separate screen, said separate screen being embedded in a display area of said display screen.

4. A system display apparatus according to claim 3, wherein said equipment is a substation or a device related to said substation.

5. A system display apparatus according to claim 1, further comprising:

a setting unit configured to set an enlarged magnification and a display domain inputted from an input unit; and a partial enlarged displaying unit configured to detect an enlarged display part from said enlarge magnification and said display domain based on center coordinates inputted from said input unit, said partial enlarged displaying unit displaying said information on said equipment related to said system diagram within said display part in said enlarge magnification based on said enlarged magnification, said center coordinates relating to an area to be enlarged, and said equipment being provided with a system.

6. A system display apparatus according to claim 1, further comprising a connecting unit configured to condense a non-enlarged display part of said system diagram connected to said enlarged display part of said system diagram, and connecting said enlarged display part of said system diagram with the non-enlarged display part of said system diagram.

7. A system display apparatus according to claim 1, further comprising a display graphic correcting unit configured to connect said enlarged display part of said system diagram displayed with said non-enlarged display part of said system diagram by an approximate curvilinear graphics.

8. A storing medium readable by a computer, the storing medium storing instructions executable by said computer for a system display apparatus, said method comprising the steps of:
   a distribution line number coincidence judging step that judges whether or not a distribution line number, said information to be displayed that is stored in a screen display information memory and is to be displayed coincides with said distribution line number, said information related to equipment that is stored in a data base, and wherein said system diagram has distribution lines, said equipment being provided with said system;
   an X-coordinate obtaining step that obtains maximum and minimum values of an X-coordinate of said equipment which is judged to have said distribution line number coincide by said distribution line number coincidence judging step based on coordinate data stored in said data base;
   a Y-coordinate obtaining step that obtains maximum and minimum values of a Y-coordinate of said equipment which is judged to have said distribution line number coincide by said distribution line number coincidence judging unit based on a coordinate data stored in said data base;
   a scale calculating step that automatically calculates said display scale from said maximum and minimum values of said X-coordinate and said Y-coordinate obtained from all of said equipments which are judged to have said distribution line number coincide and from a size of said display screen; and
   a determining step of a display scale that displays said system diagram based on a relationship of size of said display scales on said X-coordinate side and said Y-coordinate side calculated by said scale calculating step and on a relationship between said display scale on said X-coordinate side and said Y-coordinate side and a scale threshold value set.

9. A method of calculating a display scale on a screen display in a system display apparatus that generates and displays a system diagram based on an information related to a system, said system comprising a plurality of distribution lines, comprising the steps of:
   a distribution line number coincidence judging step that judges whether or not a distribution line number, and said information to be displayed that is stored in a screen display information memory coincides with said distribution line number, and said information related to an equipment that is stored in a data base;
   an X-coordinate obtaining step that obtains maximum and minimum values of an X-coordinate of said equipment which is judged to have said distribution line number coincide by said distribution line number coincidence judging step based on coordinate data stored in said data base, and said equipment being provided with said system;
   a Y-coordinate obtaining step that obtains maximum and minimum values of a Y-coordinate of said equipment which is judged to have said distribution line number coincide by said distribution line number coincidence judging step based on a coordinate data stored in said data base;
   a scale calculating step that automatically calculates said display scale from said maximum and minimum values of said X-coordinate and said Y-coordinate obtained from all of said equipments which are judged to have said distribution line number coincide and from a size of said display screen; and
   a determining step of said display scale that displays said system diagram based on one of a relationship of size of said display scales on said X-coordinate side and said Y-coordinate side calculated by said scale calculating step and from a relationship between said display scale on said X-coordinate side and said Y-coordinate side and a scale threshold value set.

10. A system display apparatus that generates and displays a system diagram based on an information related to a system, comprising:
    a display scale calculating unit configured to obtain maximum and minimum coordinates in horizontal and -vertical directions of said system diagram to be displayed, said display scale calculating unit automatically calculating a display scale from a maximum and minimum coordinates and a size of a display screen, said display scale calculating unit setting a scale threshold value as said display scale when said display scale is smaller than said scale threshold value;
    a screen position setting unit configured to set a position of a screen on said display screen to display an equipment related to distribution lines which are excluded from said display screen when said scale threshold value is set as said display scale, said screen made on said display; and
    a system screen displaying unit configured to generate said system diagram based on said display scale calculated by said display scale calculating unit based on said information on said equipment related to said system diagram to be displayed, said system screen displaying unit displaying said equipment related to said distribution line excluded from said display screen on said screen at said display position set by said screen position setting unit.

11. A system display apparatus that generates and displays a system diagram based on an information related to a system, comprising:
    a display scale calculating unit configured to obtain maximum and minimum coordinates in horizontal and vertical directions of said system diagram to be displayed, said display scale calculating unit automatically calculating a display scale from said maximum and minimum coordinates and a size of a display screen, said display scale calculating unit setting a scale threshold value as said display scale when said display scale is smaller than said scale threshold value;
    a display range editing unit configured to divide in X- and Y-directions at a predetermined interval, said display range editing unit setting a display omitted range when there exists no equipment related to said system diagram per each divided interval when said display scale set by said display scale calculating unit exceeds said scale threshold value; and
    a system screen displaying unit configured to generate and display said system diagram based on information on said equipment related to said system diagram to be displayed except for said display omitted element set based on said display range editing unit and said display scale.

12. A system display apparatus that generates and displays a system diagram based on an information related to a system, comprising:
- a data base configured to store a display information related to said system;
- a display element number obtaining unit configured to calculate a unit display part from a screen display part of a display section and a screen dividing number, said display element number obtaining unit getting a number of a display element existing within each unit display part from said data base;
- a display scale calculating unit configured to automatically calculate a display scale of each unit display part by using a total number of said display elements and said number of display elements within each unit display part obtained by said display element number obtaining unit; and
- a system screen displaying unit configured to generate and display a system diagram based on said information of said display element related to said system diagram based on said display scale per each unit display part calculated.

13. A system display apparatus according to claim 12, further comprising:
- a display position setting unit configured to set a display position data based on a specified screen position of said screen displayed by said system screen displaying unit; and
- a magnification displaying unit configured to display said display scale calculated in a unit display part corresponding to said display position.

14. A system display apparatus that generates and displays a system diagram based on a display element related to a system, comprising:
- a data base configured to store said display element related to said system;
- a coordinate range unit configured to generate a coordinate range of said display element from a minimum and maximum values of X- and Y-coordinates related to said display element stored in said data base;
- a display element number obtaining unit configured to calculate a unit display part from said coordinate range and a screen dividing number, said display element number obtaining unit calculating a number of display elements existing within each unit display part stored in said data base;
- a scale calculating unit configured to automatically calculate a display scale of each unit display part based on all of said display elements and said display elements within each unit display part obtained by said display element number obtaining unit; and
- a display transformation unit configured to execute coordinate transformation of said display elements within said data base by using said display scale per each unit display part calculated by said scale calculating unit.

15. A system display apparatus as in claim 1, wherein said system is a portion of a network that comprises a plurality of systems.

16. A system display apparatus according to claim 1, further comprising a unit configured to extract and display said equipment connected to said system diagram displayed by said system screen displaying unit on a separate screen, said separate screen being embedded in a display area of said display screen.

* * * * *